United States Patent
Kang

(10) Patent No.: US 9,924,052 B2
(45) Date of Patent: Mar. 20, 2018

(54) METHOD OF CONTROLLING IMAGE FORMING APPARATUS THROUGH USER TERMINAL, AND IMAGE FORMING APPARATUS AND USER TERMINAL FOR PERFORMING THE METHOD

(71) Applicant: S-PRINTING SOLUTION CO., LTD., Suwon-si, Gyeonggi-do (KR)

(72) Inventor: Soo-young Kang, Suwon-si (KR)

(73) Assignee: S-PRINTING SOLUTION CO., LTD., Suwon-si (KR)

( * ) Notice: Subject to any disclaimer, the term of this patent is extended or adjusted under 35 U.S.C. 154(b) by 0 days.

(21) Appl. No.: 14/839,176

(22) Filed: Aug. 28, 2015

(65) Prior Publication Data

US 2016/0065764 A1    Mar. 3, 2016

(30) Foreign Application Priority Data

Aug. 28, 2014  (KR) .......................... 10-2014-0113344

(51) Int. Cl.
G06F 15/00       (2006.01)
H04N 1/00        (2006.01)
G06F 3/0484      (2013.01)
H04N 1/44        (2006.01)

(52) U.S. Cl.
CPC ....... *H04N 1/00472* (2013.01); *G06F 3/0484* (2013.01); *H04N 1/00* (2013.01); *H04N 1/00307* (2013.01); *H04N 1/00477* (2013.01); *H04N 1/00933* (2013.01); *H04N 1/00938* (2013.01); *H04N 1/00954* (2013.01); *H04N 1/4413* (2013.01); *H04N 1/4433* (2013.01); *H04N 2201/0074* (2013.01); *H04N 2201/0075* (2013.01)

(58) Field of Classification Search
CPC .................................................. H04N 1/00472
USPC ........................................................ 358/1.13
See application file for complete search history.

(56) References Cited

U.S. PATENT DOCUMENTS

| | | | | |
|---|---|---|---|---|
| 5,787,237 | A * | 7/1998 | Reilly ................... | G06F 3/1293 358/1.13 |
| 8,477,336 | B2 | 7/2013 | Iwai et al. | |
| 8,621,388 | B2 * | 12/2013 | Tomita .............. | H04N 1/00408 345/473 |
| 8,976,393 | B2 | 3/2015 | Park et al. | |

(Continued)

FOREIGN PATENT DOCUMENTS

| | | |
|---|---|---|
| EP | 1 445 940 A2 | 8/2004 |
| EP | 2 437 479 A1 | 4/2012 |

(Continued)

OTHER PUBLICATIONS

Extended European Search Report dated Feb. 19, 2016 in European Patent Application No. 15182820.9.

(Continued)

*Primary Examiner* — Mark Milia
(74) *Attorney, Agent, or Firm* — Staas & Halsey LLP

(57) ABSTRACT

A method of controlling an image forming apparatus using a user terminal includes displaying a popup window corresponding to an event generated in the image forming apparatus, determining whether at least one user terminal is connected to the image forming apparatus, and applying a previously set timeout to the popup window according to the connection of the user terminal.

12 Claims, 44 Drawing Sheets

(56) References Cited

U.S. PATENT DOCUMENTS

| | | | |
|---|---|---|---|
| 9,313,348 B2 | 4/2016 | Tsujimoto | |
| 2001/0040691 A1* | 11/2001 | Sakamoto | G06K 15/00 358/1.14 |
| 2005/0179944 A1 | 8/2005 | Gassho et al. | |
| 2006/0221375 A1* | 10/2006 | Nagarajan | G06F 3/1222 358/1.14 |
| 2007/0081186 A1 | 4/2007 | Numata | |
| 2007/0127054 A1 | 6/2007 | Nishizawa | |
| 2007/0139386 A1* | 6/2007 | Martin | G06F 3/04886 345/173 |
| 2008/0052710 A1 | 2/2008 | Iwai et al. | |
| 2010/0328720 A1* | 12/2010 | Suzuki | G06F 3/1204 358/1.15 |
| 2011/0055736 A1* | 3/2011 | Kang | H04N 1/00424 715/760 |
| 2012/0086965 A1 | 4/2012 | Kang et al. | |
| 2012/0127502 A1 | 5/2012 | Kim et al. | |
| 2014/0111823 A1 | 4/2014 | Park et al. | |
| 2014/0126011 A1* | 5/2014 | Park | H04N 1/00106 358/1.15 |
| 2014/0155121 A1* | 6/2014 | Haba | H04N 1/00129 455/557 |
| 2015/0146242 A1 | 5/2015 | Tsujimoto | |
| 2016/0191731 A1 | 6/2016 | Tsujimoto | |

FOREIGN PATENT DOCUMENTS

| | | |
|---|---|---|
| EP | 2 615 814 A2 | 7/2013 |
| JP | 2012-73859 | 4/2012 |
| JP | 2013-247510 | 12/2013 |
| KR | 10-2012-0054403 | 5/2012 |
| KR | 10-2014-0058282 | 5/2014 |
| WO | WO 2013/176105 A1 | 11/2013 |

OTHER PUBLICATIONS

Extended European Search Report dated Apr. 19, 2016 in European Patent Application No. 15182988.4.
Extended European Search Report dated Feb. 19, 2016 in European Patent Application No. 15182983.5.
Korean Office Action dated Sep. 19, 2016 in corresponding Korean Patent Application No. 10-2014-0113342.
Korean Office Action dated Nov. 30, 2016 in corresponding Korean Patent Application No. 10-2014-0113342.
Korean Office Action dated Sep. 19, 2016 in corresponding Korean Patent Application No. 10-2014-0113343.
Korean Office Action dated Nov. 30, 2016 in corresponding Korean Patent Application No. 10-2014-0113343.
Extended European Search Report dated Dec. 6, 2016 in corresponding European Patent Application No. 16184932.8.
Korean Office Action dated Feb. 3, 2017 in corresponding Korean Patent Application No. 10-2014-0113342.
Korean Office Action dated Jan. 9, 2017 in corresponding Korean Patent Application No. 10-2014-0113343.
Extended European Search Report dated Jan. 18, 2017 in European Patent Application No. 16184878.3.
European Office Action dated Jun. 8, 2017 in corresponding European Patent Application No. 15182820.9.
Anonymous: "Timeout (computing)," Wikipedia, the free encyclopedia, Aug. 8, 2009, pp. 1-2, XP055219587, Retrieved from the Internet: URL: https://en.wikipedia.org/w/index.php?title=Timeout_(computing)&oldid=306816802.

* cited by examiner

FIG. 41

| Category | Category | Popup Close | Send Default Value |
|---|---|---|---|
| Tray | Tray confirmation popup | O | O |
| Error | Error Message popup | X | X |
| Job Related | Paper Empty/Mismatch popup | X | X |
| | Jam Recovery popup | O | O (Cancel) |
| | Scan Another page popup | O | O (No) |
| Fax | Caller ID popup | O | X |

METHOD OF CONTROLLING IMAGE FORMING APPARATUS THROUGH USER TERMINAL, AND IMAGE FORMING APPARATUS AND USER TERMINAL FOR PERFORMING THE METHOD

CROSS-REFERENCE TO RELATED APPLICATIONS

This application claims the benefit of Korean Patent Application No. 10-2014-0113344, filed on Aug. 28, 2014, in the Korean Intellectual Property Office, the disclosure of which is incorporated herein in its entirety by reference.

BACKGROUND

1. Field

One or more embodiments of the present disclosure relate to a method of controlling an image forming apparatus through a user terminal, and an apparatus for performing the method.

2. Description of the Related Art

With the recent increase in the use of personal devices, a concept of "bring your own device" (BYOD) has been introduced. BYOD signifies using personal devices at work, for example, accessing company information, apparatuses, and systems by using personal devices such as notebook computers, smartphones, or tablets. For example, an employee may work by accessing a company network by using a personal notebook computer, rather than a desktop computer located at the company.

The establishment of a BYOD business environment may free employees from the need to carry multiple devices for both business purposes and personal purposes, thereby improving productivity and reducing the costs associated with multiple devices.

SUMMARY

One or more embodiments of the present disclosure include a method of controlling an image forming apparatus through a user terminal, and an apparatus for performing the method.

Additional aspects will be set forth in part in the description which follows and, in part, will be apparent from the description, or may be learned by practice of the presented embodiments.

According to one or more embodiments of the present disclosure, a method of controlling an image forming apparatus using a user terminal includes displaying a popup window corresponding to an event generated in the image forming apparatus, determining whether at least one user terminal is connected to the image forming apparatus, and applying a previously set timeout to the popup window according to the connection of the user terminal.

In the applying of a previously set timeout, a first timeout may be applied to the popup window when no user terminal is connected to the image forming apparatus and a second timeout may be applied to the popup window when at least one user terminal is connected to the image forming apparatus, and the second timeout may be longer than the first timeout.

BRIEF DESCRIPTION OF THE DRAWINGS

These and/or other aspects will become apparent and more readily appreciated from the following description of the embodiments, taken in conjunction with the accompanying drawings in which:

FIG. 41 is a table showing whether to apply a timeout and a default value transmitted to the image forming apparatus when a popup window closes due to expiration of a timeout, according to a category of a popup window;

DETAILED DESCRIPTION

Figure 1:
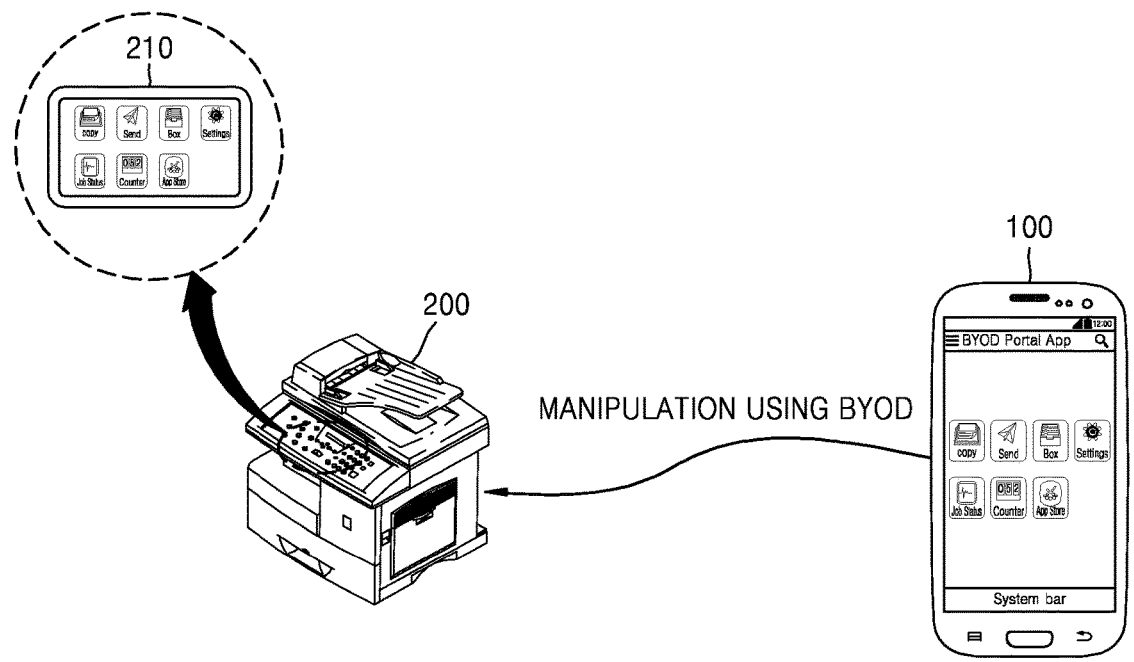
FIG. 1 illustrates a bring your own device (BYOD) environment according to an exemplary embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

FIG. 1 illustrates a "Bring your own device (BYOD)" environment according to an exemplary embodiment.

In the BYOD environment according to the present exemplary embodiment, a user may control an image forming apparatus 200 by using a BYOD service via a user terminal 100. In the present specification, the BYOD service denotes accessing a function of an image forming apparatus and sharing resources of the image forming apparatus by using a personal mobile terminal (a BYOD device). The BYOD environment denotes an environment for using the BYOD service.

To use the BYOD service according to the present exemplary embodiment, an application is installed in the user terminal 100. The application is referred to as a BYOD portal application (BYOD Portal App), which is described below in detail with reference to related drawings. When the BYOD portal application is installed in the user terminal 100, the user terminal 100 may control the operation of the image forming apparatus 200 by transmitting a command to the image forming apparatus 200. To this end, the user terminal 100 and the image forming apparatus 200 may be connected to one another through the same access point (AP) or via Wi-Fi Direct.

The image forming apparatus 200 includes a manipulation unit 210. A user may manipulate the image forming apparatus 200 through the manipulation unit 210. The manipulation unit 210 may include a display panel for displaying a graphic user interface (GUI) image, and an input button for receiving a user input.

The manipulation unit 210 and the user terminal 100 of the image forming apparatus 200 may each independently have a user interface (UI). In other words, a UI displayed on the user terminal 100 may be different from or the same as a UI displayed on the manipulation unit 210, and applications for operating the image forming apparatus 200 are independently installed in the user terminal 100. In other words, applications corresponding to various functions such as copy, scan, and box are independently installed in the BYOD portal application of the user terminal 100. When an installed application is executed, the user terminal 100 controls the image forming apparatus 200 by transmitting a command corresponding to the application to the image forming apparatus 200.

The user may perform all available operations of the manipulation unit 210 through the user terminal 100. As such, according to the present exemplary embodiment, the user may operate the image forming apparatus 200 by using user terminal 100. For example, a file stored in the user terminal 100 may be printed or a job may be performed by using an address book stored in the user terminal 100. Thus, user convenience may be improved.

To control the image forming apparatus 200 from the user terminal 100 by using the BYOD service, communication must be established between the image forming apparatus 200 and the user terminal 100, which is described below in detail.

A structure of the image forming apparatus 200 is described below prior to the communication method between the image forming apparatus 200 and the user terminal 100.

Figure 2:
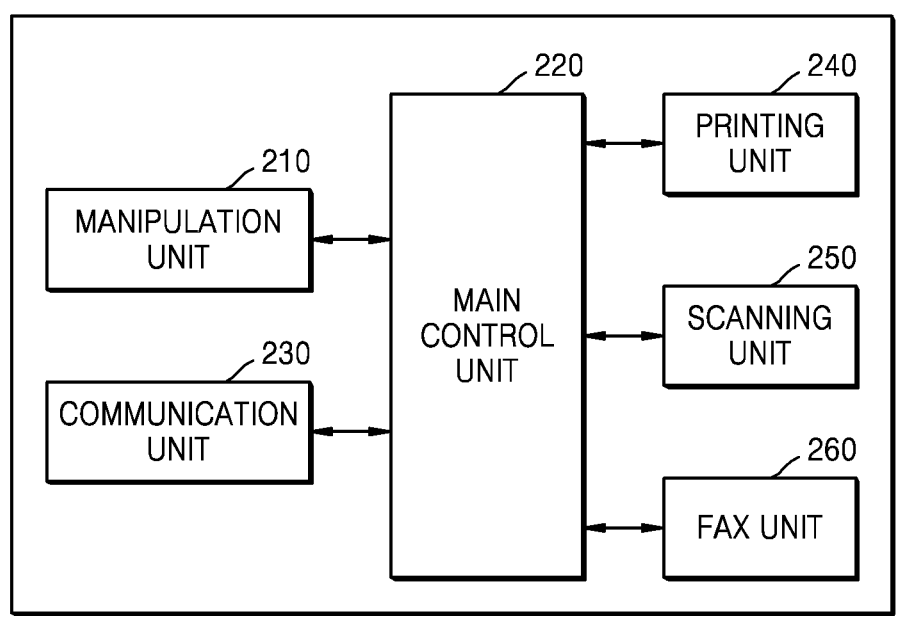
FIG. 2 is a block diagram illustrating a structure of an image forming apparatus according to an exemplary embodiment.

FIG. 2 is a block diagram illustrating a structure of an image forming apparatus according to an exemplary embodiment. Referring to FIG. 2, the image forming apparatus 200 according to the present exemplary embodiment may include the manipulation unit 210, a main control unit 220, a communication unit 230, a printing unit 240, a scanning unit 250, and a fax unit 260.

The manipulation unit 210 is used by the user to operate the image forming apparatus 200. The manipulation unit 210 may include a display panel for displaying a GUI image and an input key for receiving a user input. The manipulation unit 210 provides a GUI image to the user for operating the image forming apparatus 200) and an operation command received from the user to the main control unit 220.

The main control unit 220 may be embodied as a processor which may control operations of all components included in the image forming apparatus 200. The main control unit 220 may communicate with and exchange commands with the manipulation unit 210 for operating and controlling the image forming apparatus 200. Also, the main control unit 220 may exchange commands with the user terminal 100 connected to the image forming apparatus 200 for operating and controlling the image forming apparatus 200.

The communication unit 230 is configured to communicate with the user terminal 100. The communication unit 230 may be connected to the user terminal 100 through the same AP, or directly to the user terminal 100 via Wi-Fi Direct.

The printing unit 240 may perform a printing operation under the control of the main control unit 220. The scanning unit 250 may perform a scanning operation under the control of the main control unit 220. The fax unit 260 may perform a fax operation under the control of the main control unit 220.

In the following descriptions of additional figures, FIGS. 1 and 2 are also referred to.

Figure 3:
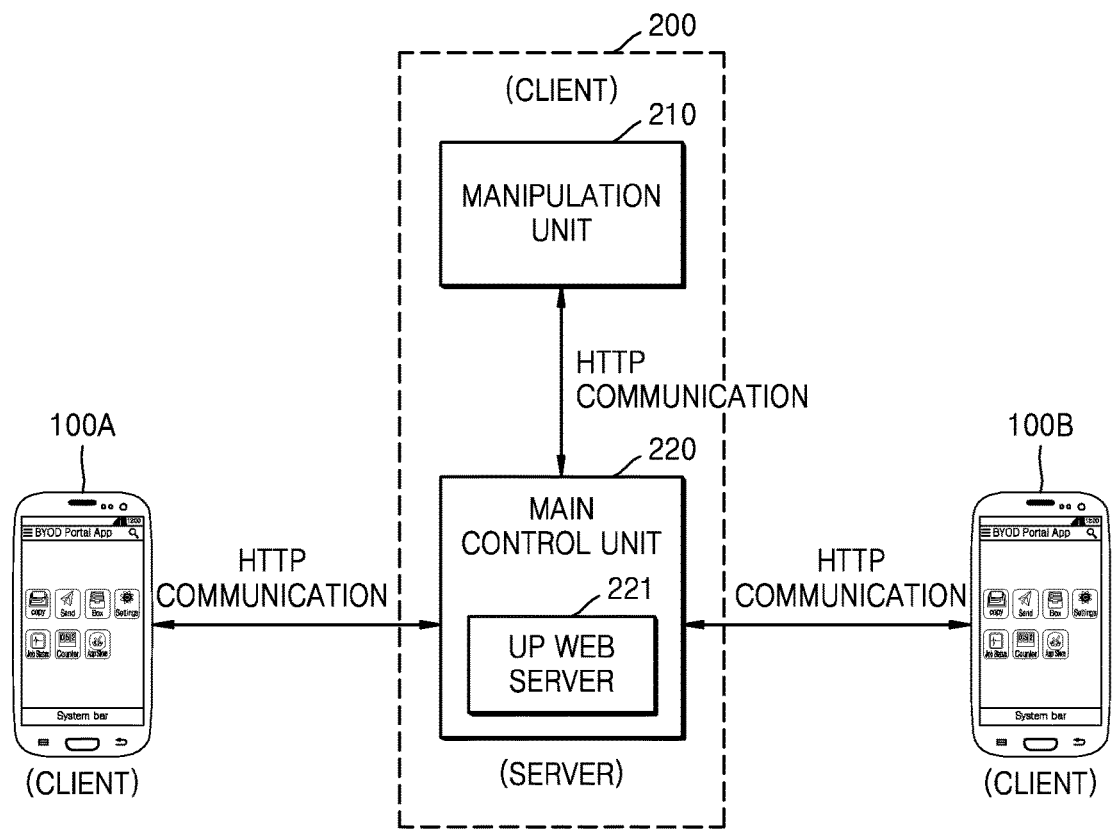
FIG. 3 is a block diagram illustrating communications between a user terminal and an image forming apparatus in the BYOD environment according to an exemplary embodiment.

FIG. 3 is a block diagram illustrating communications between a user terminal and an image forming apparatus in the BYOD environment according to an exemplary embodiment.

Referring to FIG. 3, two user terminals 100A and 100B are connected to the image forming apparatus 200. A plurality of user terminals may be simultaneously connected to the image forming apparatus 200. The image forming apparatus 200 may limit the number of user terminals that may be simultaneously connected.

In the BYOD environment according to an exemplary embodiment, the user terminals 100A and 100B and the image forming apparatus 200 communicate through a unified protocol (UP). In detail, the main control unit 220 of the image forming apparatus 200 may communicate with the user terminals 100A and 100B through UP. Also, the main control unit 220 may communicate with the manipulation unit 210 through UP. The UP is a protocol that accesses, generates, erases, and updates resources by using a hypertext transfer protocol (HTTP) as an application programming interface (API), based on a uniform resource locator (URL).

In the BYOD environment according to an exemplary embodiment, the user terminals 100A and 100B may control the operation of the image forming apparatus 200 by transmitting an UP command to the main control unit 220. The main control unit 220 may control operations of the printing unit 240, the scanning unit 250, and the fax unit 260 according to the UP command received from the manipulation unit 210 or the user terminals 100A and 100B.

When an event occurs, the main control unit 220 broadcasts occurrence of the event to the manipulation unit 210 and the user terminals 100A and 100B connected to the main control unit 220. The manipulation unit 210 and the user terminals 100A and 100B may each determine whether the received event is an event to be processed and perform an operation based on the determination. Otherwise, the received event is disregarded.

In order to establish the UP communications with the user terminals 100A and 100B, the main control unit 220 may function as a server. In other words, the main control unit 220 may include an UP web server 221. The manipulation unit 210 and the user terminals 100A and 100B connected to the main control unit 220 serve as clients. The clients request resources from the UP web server 221 and the UP web server 221 responds to the request. The UP web server 221 and the clients may use HTTP as a communication protocol. Accordingly, anyone may access the UP web server 221 by using HTTP. Furthermore, anyone may communicate with the UP web server 221 by using only a predetermined protocol, even when a platform differs.

Figure 4:
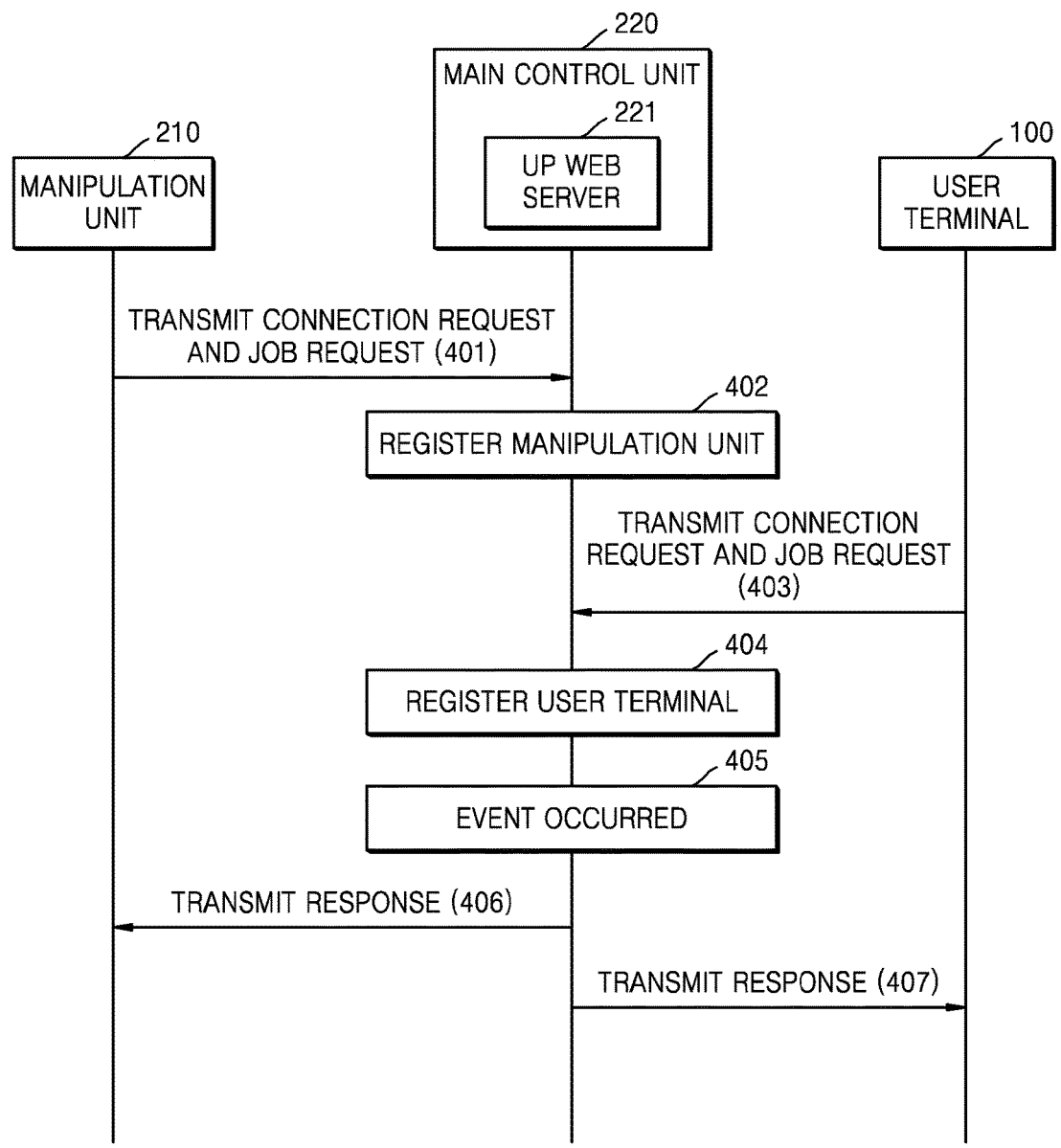
FIG. 4 illustrates operations of communicating through a unified protocol (UP) according to an exemplary embodiment.

FIG. 4 illustrates operations of communicating through UP according to an exemplary embodiment. The manipulation unit 210 and the main control unit 220 of FIG. 4 are those included in the image forming apparatus 200 of FIG. 2.

Referring to FIG. 4, in Operation 401, when the manipulation unit 210 transmits a connection request and a job request to the UP web server 221 of the main control unit 220 by using HTTP, in Operation 402, the UP web server 221 registers the manipulation unit 210. In other words, the UP web server 221 generates a session by using access information included in an HTTP request received from the manipulation unit 210.

Similarly, in Operation 403, when the user terminal 100 transmits a connection request and a job request to the UP web server 221 of the main control unit 220 by using HTTP, in Operation 404, the UP web server 221 registers the user terminal 100. In other words, the UP web server 221 generates a session by using access information included in the HTTP request received from the user terminal 100.

When an event occurs in the image forming apparatus 200 in Operation 405, the UP web server 221 transmits a response to the manipulation unit 210 and the user terminal 100, respectively, in Operation 406 and Operation 407. In the exemplary embodiment illustrated in FIG. 4, the UP web server 221 transmits a response when an event occurs, which is referred to as a long polling method, instead of instantly responding to a request from the manipulation unit 210 or the user terminal 100.

Figure 5:
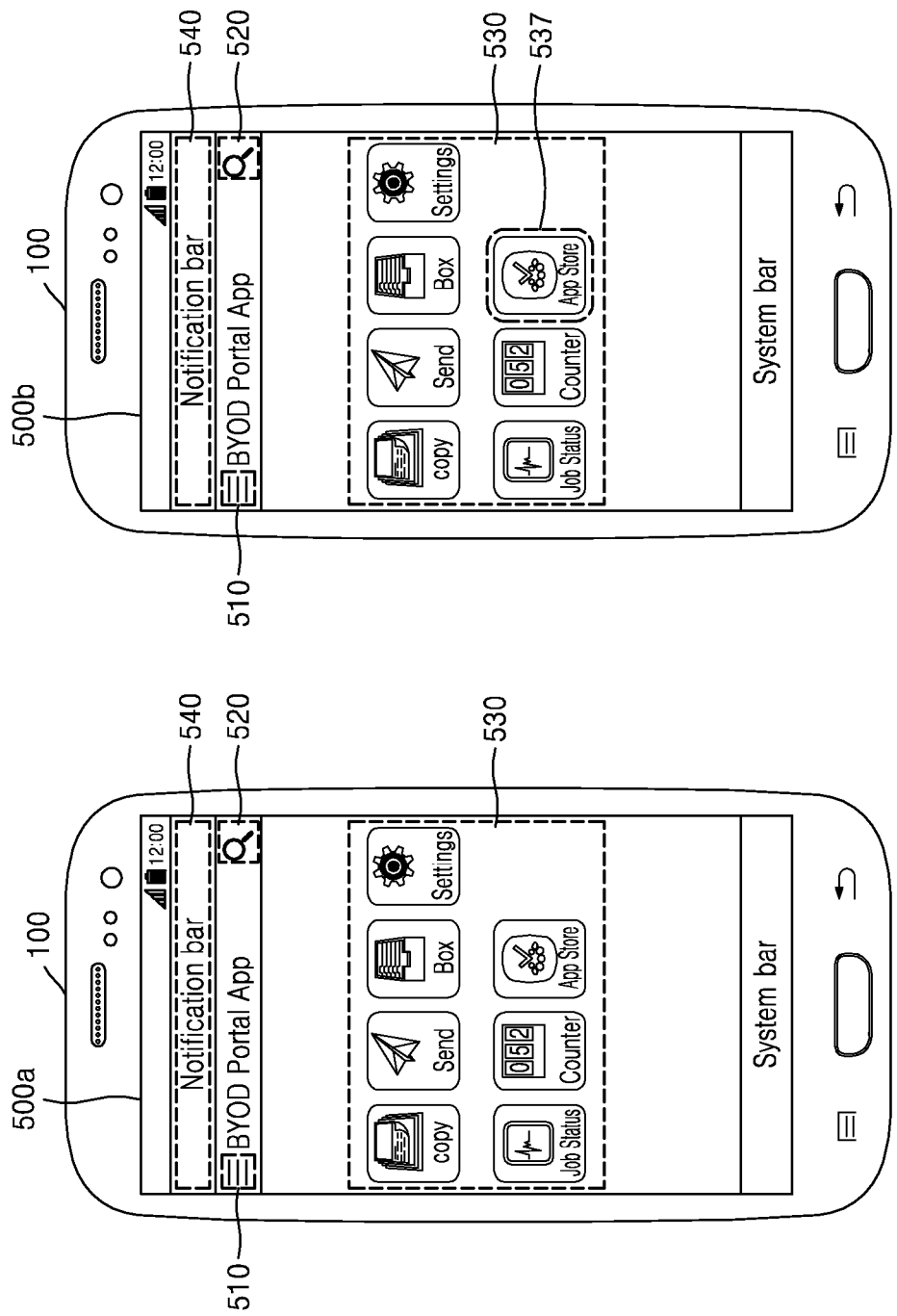
FIG. 5 illustrates a home screen of a BYOD portal application according to an exemplary embodiment.

FIG. 5 illustrates a home screen of the BYOD portal application according to an exemplary embodiment. A first screen 500a of FIG. 5 includes a quick menu 510, a device search menu 520, an application list 530, and a notification bar 540.

The quick menu 510 is used to quickly access particular menus, which is described below in detail with reference to FIGS. 6 and 7.

The device search menu 520 is used to search an image forming apparatus that the user terminal 100 connects, which is described below in detail with reference to FIGS. 8 to 12.

The application list 530 displays various applications to operate the image forming apparatus 200. The BYOD portal application serves as a portal application to use the BYOD service and detailed functions are operated by using the applications displayed in the application list 530. Accordingly, in the following description, each of the applications displayed in the application list 530 is referred to as a function application. After installing the BYOD portal application on the user terminal 100, the user may separately install each function application to use on the BYOD portal application. The separately installed function applications are embedded in the BYOD portal application. When a job request is input by using the function application, the BYOD portal application negotiates about resources, submits a job, and checks the status of the image forming apparatus 200 and the job, by communicating with the image forming apparatus 200.

A copy application, a send application, a box application, a setting application, a job status application, a counter application, and an app store application are displayed on the application list 530 of FIG. 5. Among the function applications, the other applications except for the app store application are function applications corresponding to the functions basically mounted on the image forming apparatus 200 and are referred to as out-of-box (OOB) applications.

Referring to a second screen 500b of FIG. 5, only an app store application 537 is active in the application list 530 and the other function applications are not active. An icon of any function application of the OOB applications that is not installed appears to be fuzzy. When the BYOD portal application is installed, the app store application 537 is fundamentally installed. The user may install a desired function application by executing the app store application. Alternatively, when the user selects an icon for an inactive function application that is not installed, the app store application 537 is automatically executed opening a webpage where the selected function application may be downloaded. The installation of the function application is described below in detail with reference to FIG. 13.

The notification bar 540 displays a notification related to the operation of the image forming apparatus 200. In other words, the notification bar 540 may display a notification related to a status of the image forming apparatus 200 or to a progress status of a requested job. For example, when an event is received from the main control unit 220 of the image forming apparatus 200, the notification bar 540 may display a notification of a received event. The notifications displayed on the notification bar 540 are described below in detail with reference to FIGS. 14 to 19.

Figure 6:
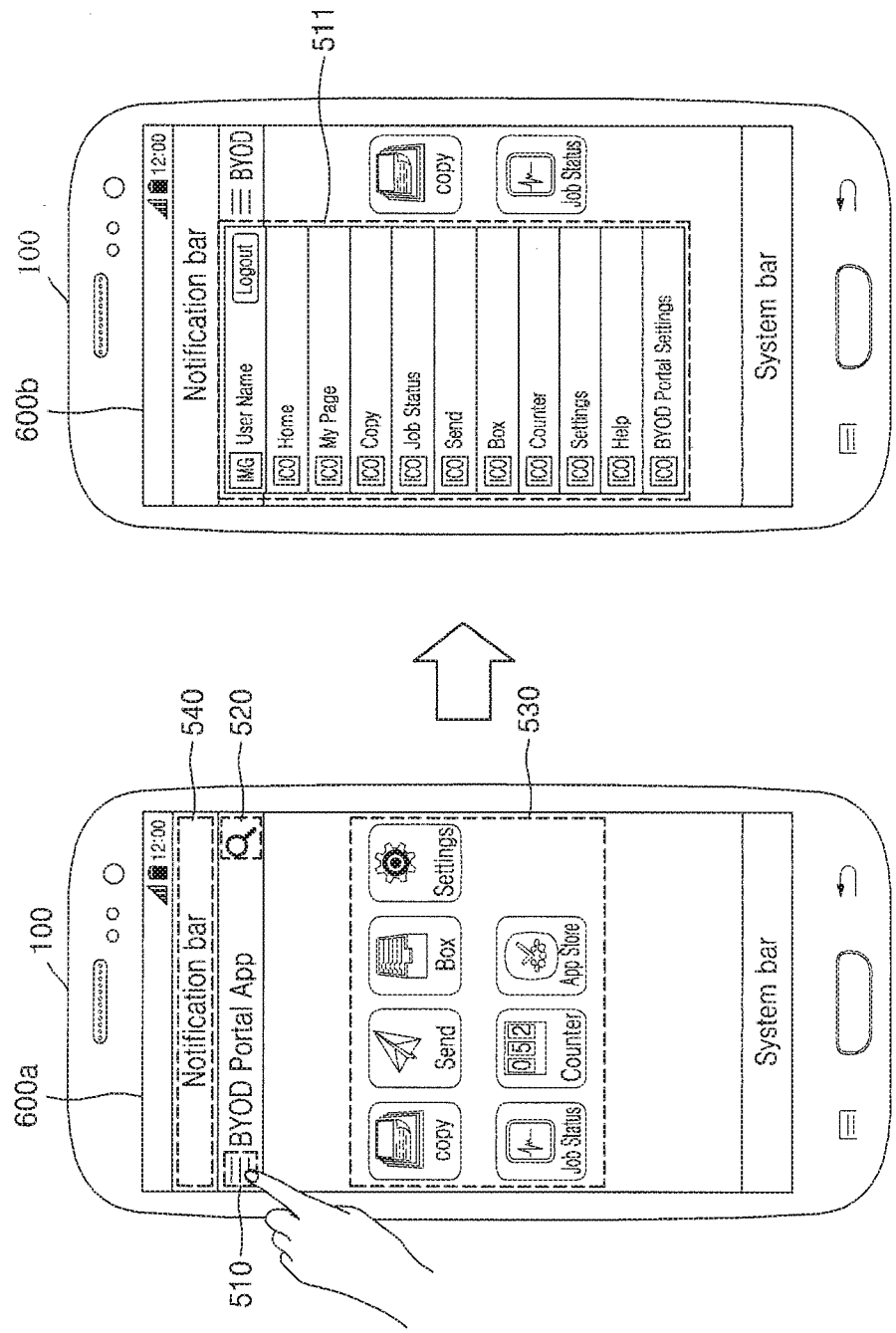
FIGS. 6 and 7 are views for explaining a quick menu function of the BYOD portal application according to an exemplary embodiment.
Figure 7:
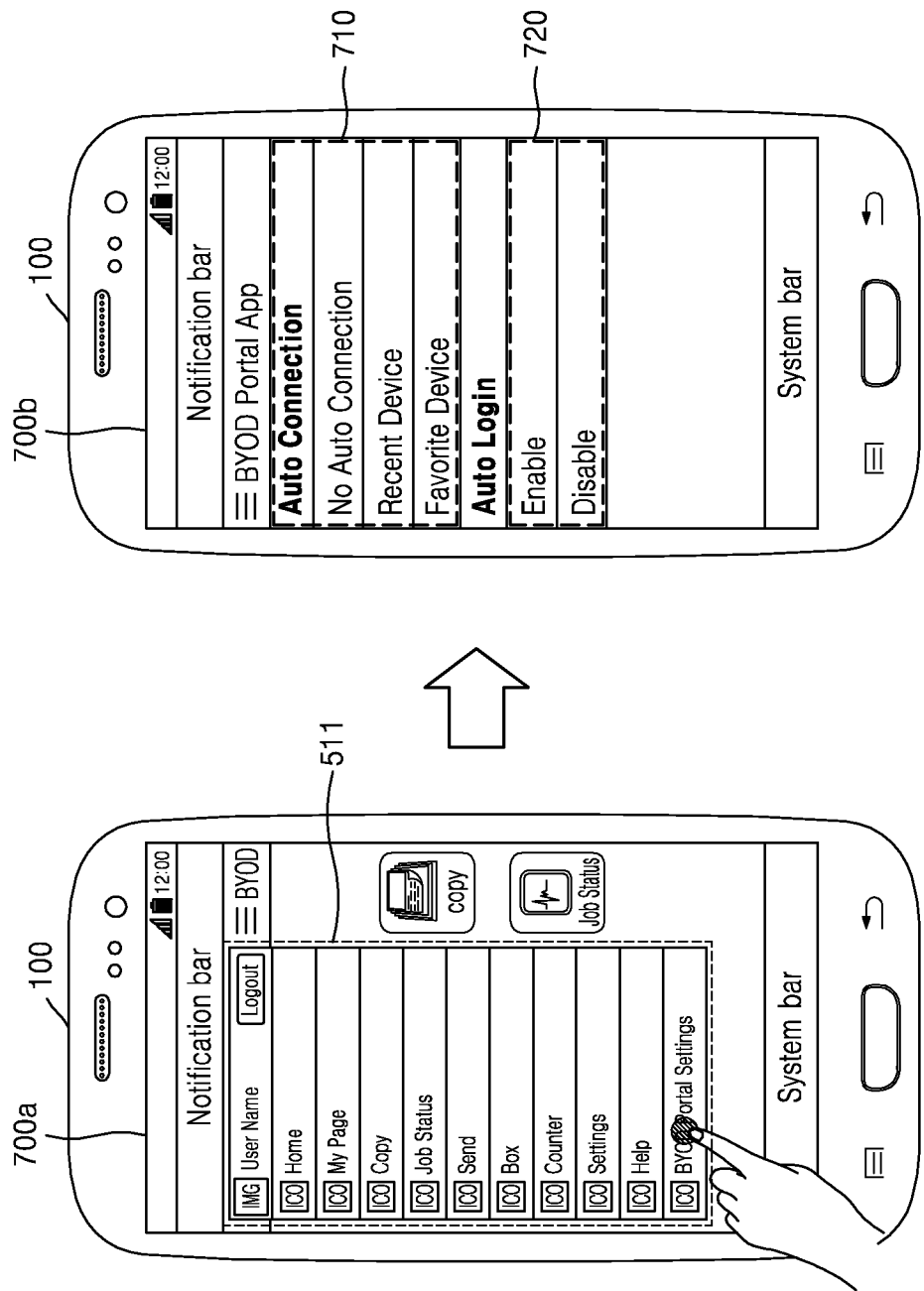

FIGS. 6 and 7 are views for explaining the quick menu function of the BYOD portal application according to an exemplary embodiment.

Referring to FIG. 6, when the user selects an icon from the quick menu 510 on the first screen 600a, a pull-down menu 511 is displayed as shown in a second screen 600b. The pull-down menu 511 may display menus such as home, my page, help, and BYOD portal settings, including the installed function applications. The user may move to a desired menu through the quick menu 510.

Referring to FIG. 7, when the user selects the BYOD portal settings among the pull-down menu 511 displayed on a first screen 700a, settable sub-options are displayed as shown in a second screen 700b. The second screen 700b displays an auto connection option and an auto login option as selectable options.

When the auto connection option is executed in a state of the user terminal 100 being connected to a network and the BYOD portal application being executed in foreground, the user terminal 100 is automatically connected to the image forming apparatus 200.

The auto login option enables automatic user login by using the credential stored in the image forming apparatus 200 when the user terminal 100 is connected to the image forming apparatus 200, if the user terminal 100 has been connected to the image forming apparatus 200 in the past.

An option list 710 of the auto connection option includes "No Auto Connection", "Recent Device", and "Favorite Device" as selectable items. When "No Auto Connection" is selected, the auto connection option becomes inactive and then the BYOD portal application does not try to perform auto connection to the image forming apparatus. When "Recent Device" is selected, the auto connection option is active and then the BYOD portal application tries to perform auto connection to the image forming apparatus that is most recently connected. When "Favorite Device" is selected, the auto connection option is active and then the BYOD portal application tries to perform auto connection to the image forming apparatus that is most favored by the user. To this end, the BYOD portal application may manage a favorite list of the image forming apparatus and may assign priority to devices included in the favorite list.

In the option list 720 of the auto login option, "Enable" and "Disable" are displayed as selectable items. When "Enable" is selected, the auto login option is active and then the BYOD portal application performs auto login after being connected to the image forming apparatus. To this end, user credential of the user terminal 100 that has been connected to the image forming apparatus may be preciously generated and stored in the image forming apparatus. However, if the stored user credential is not valid or is already expired, user login information is received and login is performed.

When "Disable" is selected in the option list 720 of the auto login option, the auto login option becomes inactive and then the BYOD portal application does not perform auto login even when the user terminal 100 is connected to the image forming apparatus.

FIGS. 8 to 12 are views for explaining a device search menu function of the BYOD portal application according to an exemplary embodiment.

Figure 8:
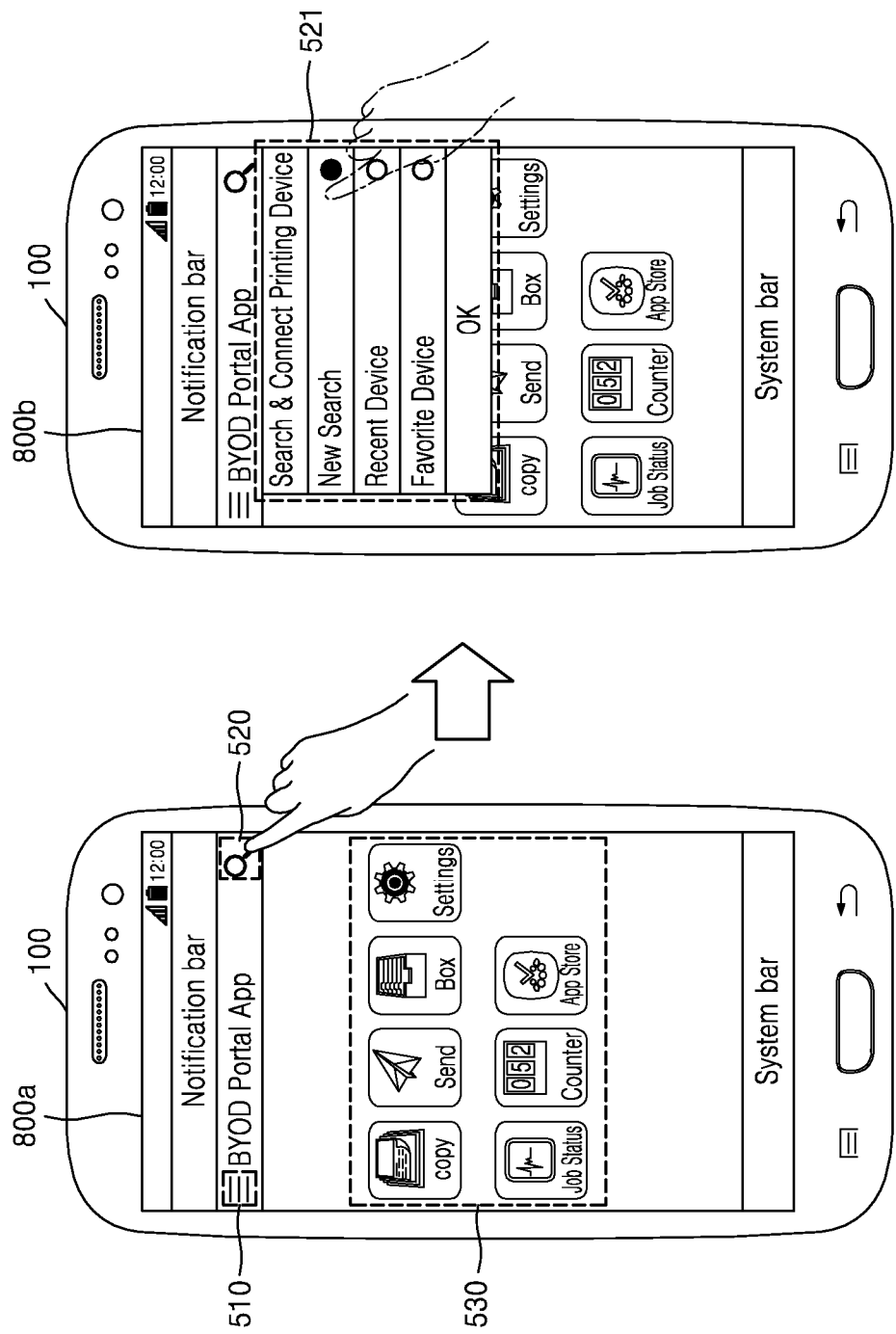
FIGS. 8 to 12 are views for explaining a device search menu function of the BYOD portal application according to an exemplary embodiment.

Referring to FIG. 8, when the user selects the device search menu 520 on a first screen 800a, a pull-down menu 521 for search and connection of a device is displayed as shown in a second screen 800b. Alternatively, in a state in which the user terminal 100 is not connected to any image forming apparatus, when a function application that requires connection to the image forming apparatus, like the copy application, is selected, the pull-down menu 521 is displayed as shown in the second screen 800b.

In the pull-down menu 521 of the second screen 800b, "New Search", "Recent Device", and "Favorite Device" are displayed as selectable items. When "New Search" is selected, the BYOD portal application searches connectable image forming apparatuses and displays the found connectable image forming apparatuses on a search list. However, when the image forming apparatus does not support the BYOD service or the BYOD connection option is inactive in the image forming apparatus, the found connectable image forming apparatuses are not displayed on the search list. Alternatively, when the user terminal 100 is not connected to Wi-Fi and "New Search" is selected in that condition, the BYOD portal application displays a message to try again after connecting to Wi-Fi on a screen.

When "Recent Device" is selected, the BYOD portal application displays the recently connected image forming apparatuses on the search list. When "Favorite Device" is selected, the BYOD portal application displays a favorite list of the image forming apparatus.

Figure 9:
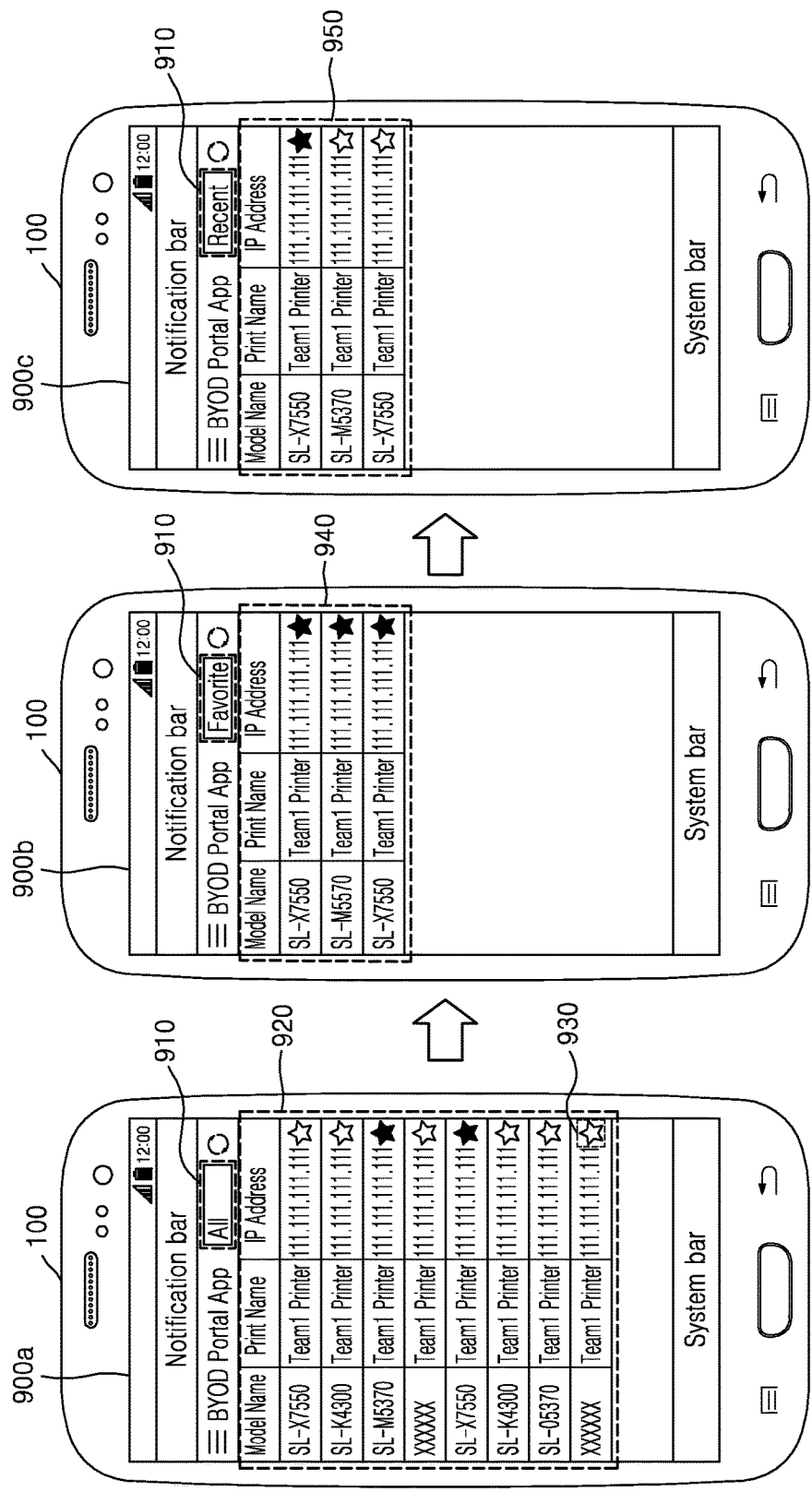

The lists of devices displayed when "New Search", "Favorite Device", and "Recent Device" are selected are respectively shown in a first screen 900a, a second screen 900b, and a third screen 900c of FIG. 9.

In the pull-down menu 521 of the second screen 800b of FIG. 8, when "New Search" is selected, a device list 920 is displayed on the screen as shown in the first screen 900a of FIG. 9. A region 910 displays the type of a currently displayed device list. Since the device list 920 of the first screen 900a includes all found devices, the region 910 displays "All". Alternatively, in the first screen 900a, a region 930 indicates whether a device is included in the favorite list. When the display of the region 930 is active, it means that the device is included in the favorite list. The user may conveniently add a device to the favorite list or remove a device from the favorite list by touching the region 930.

In the pull-down menu 521 of the second screen 800b of FIG. 8, when "Favorite Device" is selected, a device list 940 registered in the favorite list is displayed on the screen as shown in the second screen 900b of FIG. 9. Accordingly, the region 910 displays "Favorite".

In the pull-down menu 521 of a second screen 800c of FIG. 8, when "Recent Device" is selected, a third screen 900c of FIG. 9 displays a list 950 including the recently connected devices. Accordingly, the region 910 displays "Recent".

In the following description, processes of connection between the user terminal 100 and the image forming apparatus 200, login through authentication, and disconnection are described below with reference to FIGS. 10 to 12.

A BYOD connection option and an authentication option that are settable in the image forming apparatus 200 are described, prior to the above-described processes.

A manager may set the BYOD connection option in the image forming apparatus 200. The BYOD connection option is an option to determine whether the image forming apparatus 200 allows connection for use of the BYOD service. In other words, in order for the user terminal 100 to use the BYOD service by being connected to the image forming apparatus 200, the BYOD connection option is active in the image forming apparatus 200. If the BYOD connection option is inactive in the image forming apparatus 200, the image forming apparatus 200 does not allow the connection of the user terminal 100 for the user of a BYOD service. Also, as described above, the image forming apparatus with an inactive BYOD connection option is not searched from the BYOD portal application of the user terminal 100.

Alternatively, the manager may set an authentication option when the BYOD connection option is active in the image forming apparatus 200. The authentication option is an option to determine whether a login process through authentication has to be performed to use the BYOD service as the user terminal 100 is connected to the image forming apparatus 200. The manager may activate the authentication option by setting a password. When the authentication option is active, the image forming apparatus 200 performs authentication by using a user ID and a password received from the user terminal 100 that requests connection and accepts the connection request of the user terminal 100 only when the authentication is successful. Alternatively, if the user terminal 100 has been connected in the past, the image forming apparatus 200 may perform authentication in a method of checking whether previously generated and stored user credential is valid.

Figure 10:
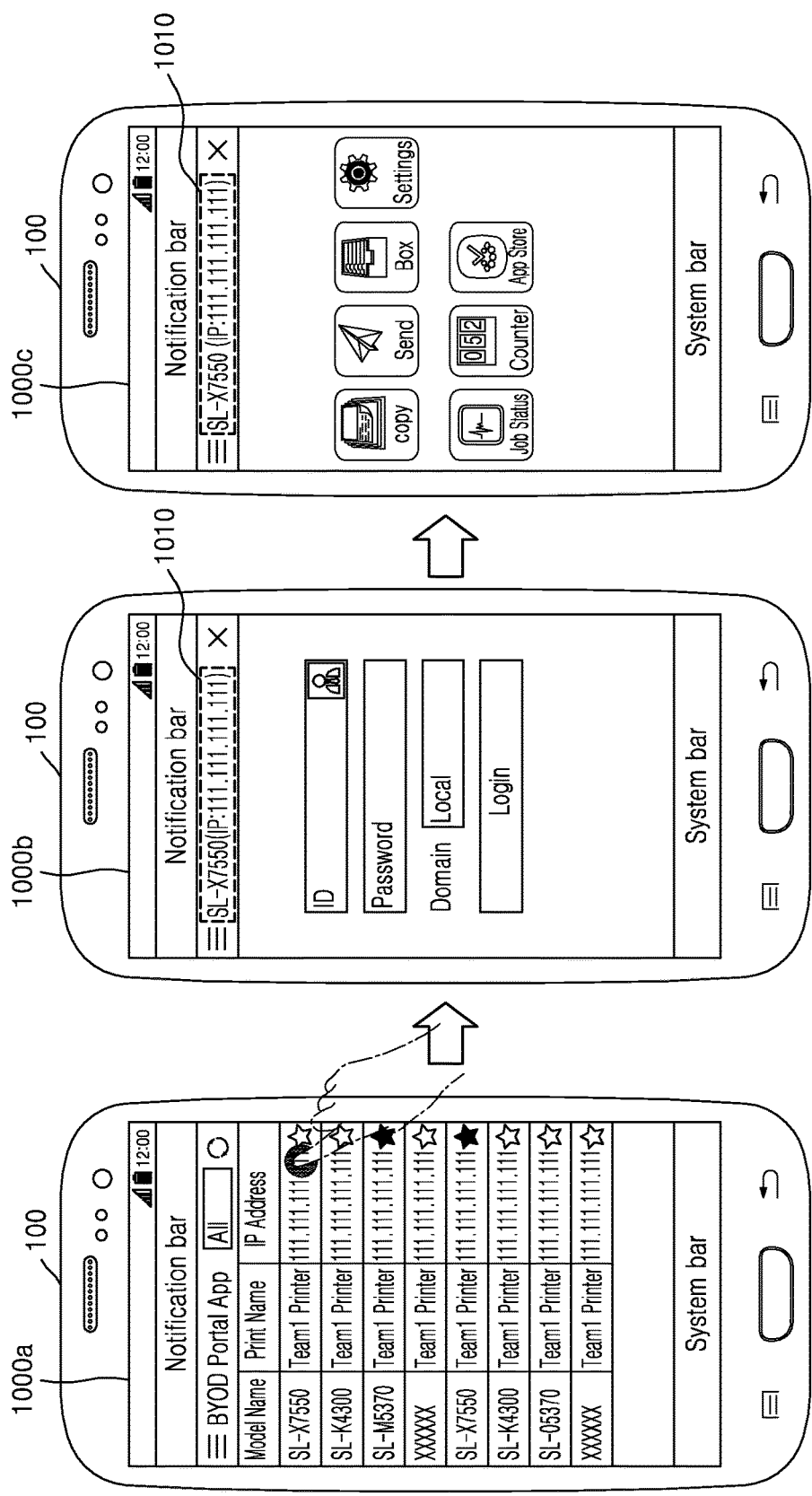

FIG. 10 illustrates UI screens of the BYOD portal application in the connection process of the user terminal 100.

A first screen 1000a of FIG. 10 displays a list of image forming apparatuses found by performing the "New Search" of the device search menu. When any one image forming apparatus is selected from the list displayed on the first screen 1000a, the user terminal 100 tries to connect to the selected image forming apparatus. When the authentication option is active in the image forming apparatus, the user terminal 100 displays a screen for input authentication information like a second screen 1000b. A model name and IP address of the image forming apparatus that the user terminal 100 currently tries to connect in a region 1010 of the second screen 1000b.

When the user inputs a user ID and a password on the second screen 1000b, the user terminal 100 transmits the input user ID and password to the image forming apparatus and requests authentication. However, when the auto login option is active in the BYOD portal application of the user terminal 100, the second screen 1000b for input authentication information is not displayed and the user terminal 100 automatically transmits the image forming apparatus.

When the authentication is successful, the user terminal 100 displays a third screen 1000c. The model name and IP address of the currently connected image forming apparatus are displayed in a region 1010 of the third screen 1000c.

Alternatively, when the auto connection option and the auto login option are active in the BYOD portal application of the user terminal 100, and the BYOD portal application is executed in the user terminal 100, connection and authentication are automatically performed without the processes of selecting an image forming apparatus and inputting login information. Accordingly, in this case the third screen 1000c may be directly displayed without displaying the first screen 1000a and the second screen 1000b of FIG. 10.

Figure 11:
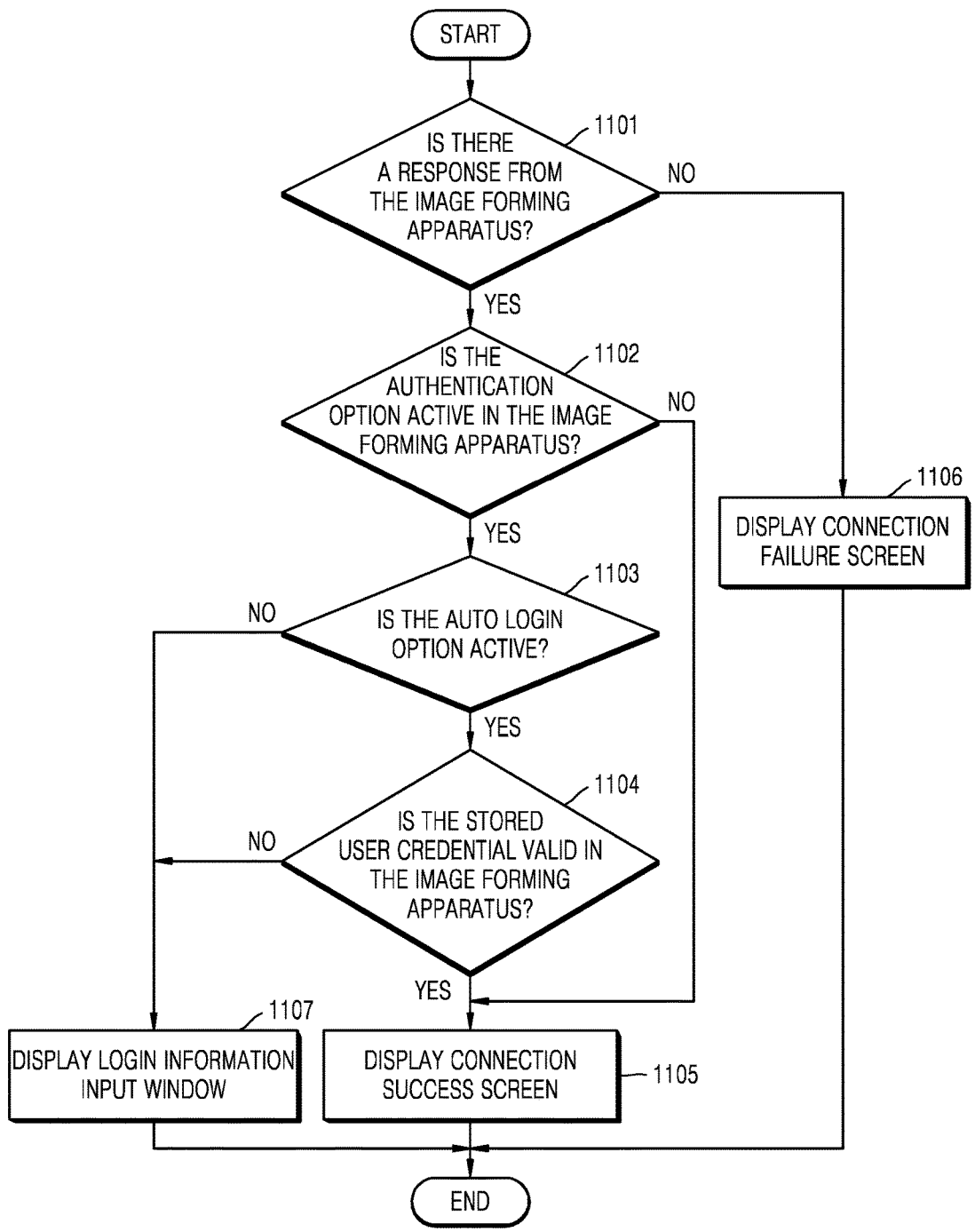

FIG. 11 is a flowchart for explaining a process of the user terminal 100 connecting to the image forming apparatus 200 in the BYOD environment according to an exemplary embodiment.

Referring to FIG. 11, after the user terminal 100 makes a connection request upon the image forming apparatus 200, it is determined in Operation 1101 whether there is a response from the image forming apparatus 200. If there is no response as a result of the determination, Operation 1106 is performed and thus a connection failure screen is displayed on the user terminal 100. In contrast, when there is a response, Operation 1102 is performed and thus it is determined whether the authentication option is active in the image forming apparatus 200.

If the authentication option is inactive as a result of the determination in Operation 1102, the user terminal 100 is connected to the image forming apparatus 200 without the authentication process, Operation 1105 is performed and thus a connection success screen is displayed on the user terminal 100. The connection success screen displayed on the user terminal 100 is the same as the third screen 1000c of FIG. 10. In contrast, if the authentication option is active, Operation 1103 is performed and thus it is determined whether the auto login option is active in the BYOD portal application installed in the user terminal 100.

If the auto login option is inactive as a result of the determination in Operation 1103, Operation 1107 is performed and thus a login information input window is displayed on the user terminal 100. The login information input window displayed on the user terminal 100 is the same as the second screen 1000b of FIG. 10. In contrast, if the auto login option is active, the user terminal 100 tries auto login with respect to the image forming apparatus 200, Operation 1104 is performed and thus it is determined whether the user credential stored in the image forming apparatus 200 is valid. The user credential stored in the image forming apparatus 200 is generated and stored when the user terminal 100 is previously connected to the image forming apparatus 200 through the authentication process, the user credential may include the user ID and password.

If the user credential is valid as a result of the determined in Operation 1104, the user terminal 100 is successfully connected to the image forming apparatus 200, Operation 1105 is performed and thus a connection success screen is displayed on the user terminal 100. In contrast, if the user credential is determined to be invalid as the manager changes the password or the term of validity of the stored user credential expires, Operation 1107 is performed and thus the login information input window is displayed on the user terminal 100.

Alternatively, although not illustrated in FIG. 11, it is determined whether the maximum number of accessible users allowed by the image forming apparatus 200 has reached and, if so, the connection to the user terminal 100 may not be allowed.

Figure 12:
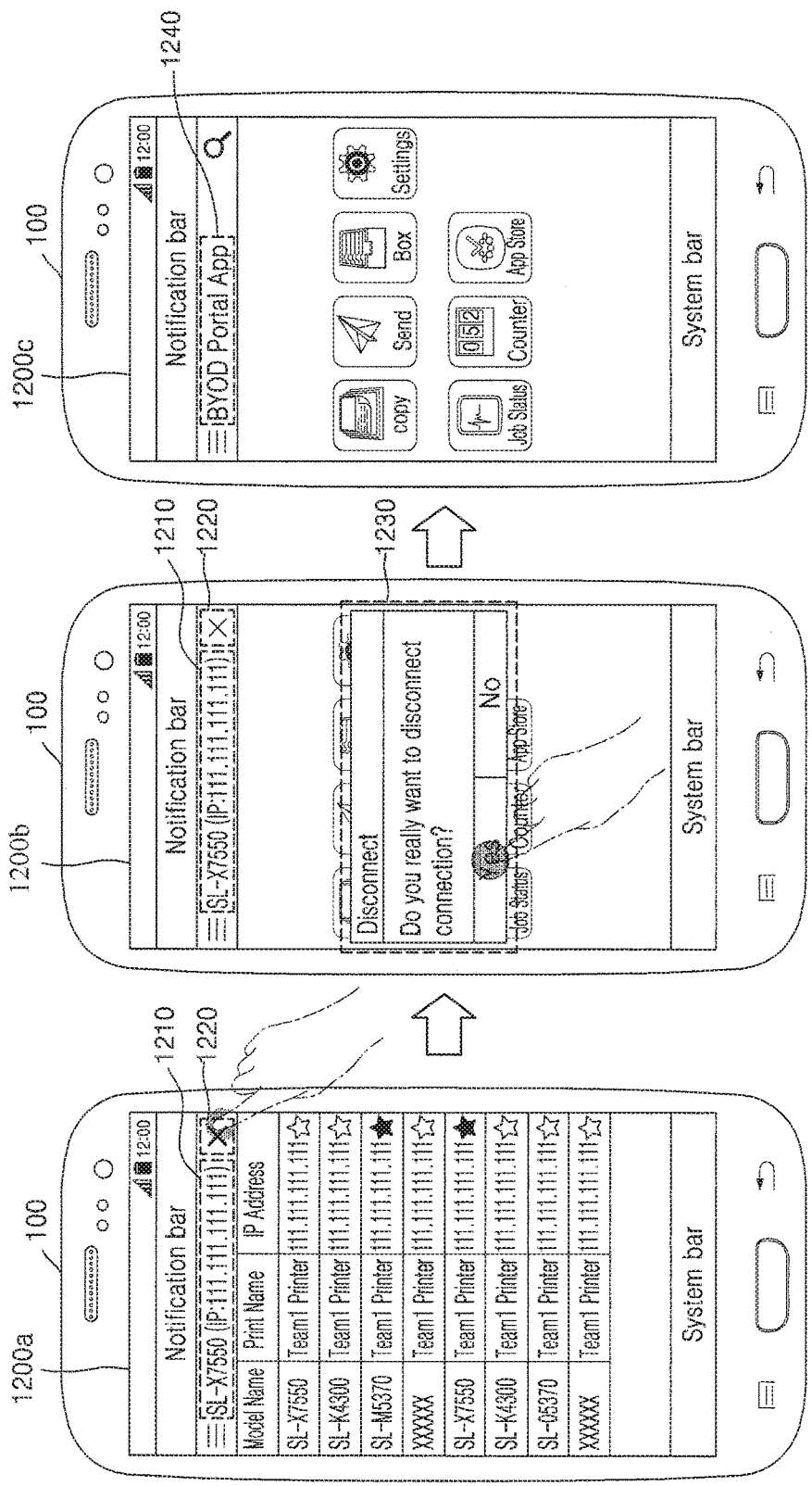

FIG. 12 illustrates UI screens displayed in a process of disconnecting from the image forming apparatus at the user terminal. The connection between the user terminal 100 and the image forming apparatus 200 may be disconnected due to unstable communication state or may be intentionally disconnected by the user using the BYOD portal application.

In a first screen 1200a of FIG. 12, the model name and IP address of the image forming apparatus 200 that is currently connected is displayed in a region 1210 showing that the user terminal 100 is currently connected to the image forming apparatus 200. When the user clicks a disconnection icon in the region 1220 on the first screen 1200a, a popup window 1230 asking whether to perform disconnection is displayed as shown in a second screen 1200b. When the user selects "Yes" in the popup window 1230 displayed on the second screen 1200b, the connection between the user terminal 100 and the image forming apparatus 200 is disconnected and a third screen 1200c is displayed. When the connection is disconnected, an application name is displayed in the region 1240 of the third screen 1200c, instead of the model name and IP address of the image forming apparatus 200.

Figure 13:
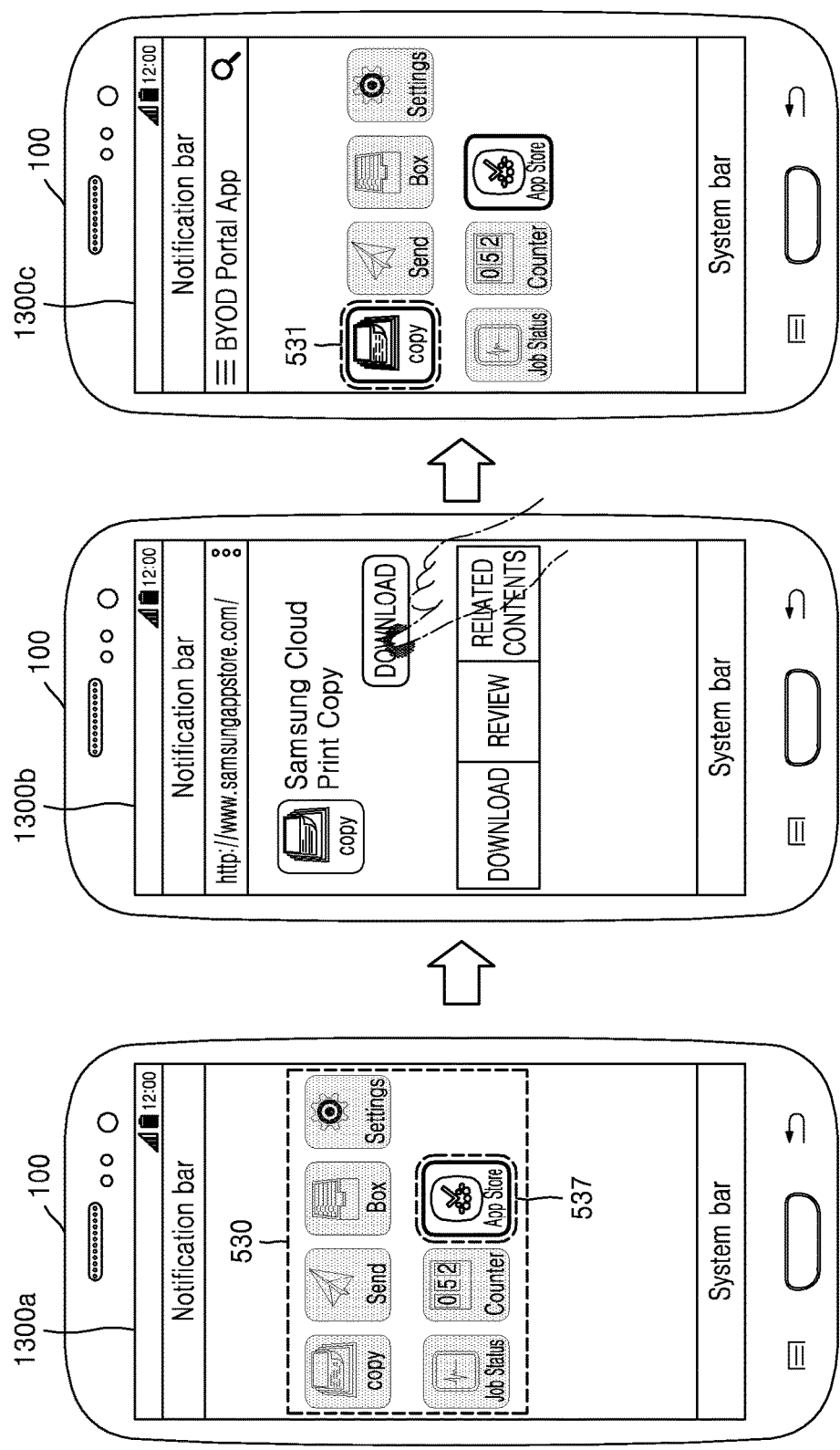
FIG. 13 illustrates user interface (UI) images displayed in a process of installing function applications in the BYOD portal application according to an exemplary embodiment.

FIG. 13 illustrates UI screens displayed in a process of installing a function application in the BYOD portal application according to an exemplary embodiment.

Referring to FIG. 13, only an app store application 537 is active in the application list 530 of a first screen 1300a and the other function applications appear to be inactive. In other words, the function applications other than the app store application 537 are not yet installed. When the user selects a copy application among the uninstalled function applications on the first screen 1300a, the app store application 537 is automatically executed and a webpage where the copy application may be downloaded is displayed as shown in a second screen 1300b.

When the user selects "Download" on the second screen 1300b, the copy application is downloaded and installed. When the installation of the copy application is completed, the copy application 531 becomes active as shown in a third screen 1300c.

Alternatively, the user may directly select the app store application 537 from the first screen 1300a to execute the app store application 537 and thus the webpage where the copy application may be downloaded is displayed.

FIGS. 14 to 19 illustrate examples of displaying a notification related to a job on a notification bar in the BYOD portal application according to an exemplary embodiment.

The BYOD portal application of the user terminal 100 requests a job from the image forming apparatus 200. In this state, when the image forming apparatus 200 is in the middle of performing another job, a notification is displayed on the user terminal 100 to indicate that the user terminal 100 is currently on another job.

Figure 14:
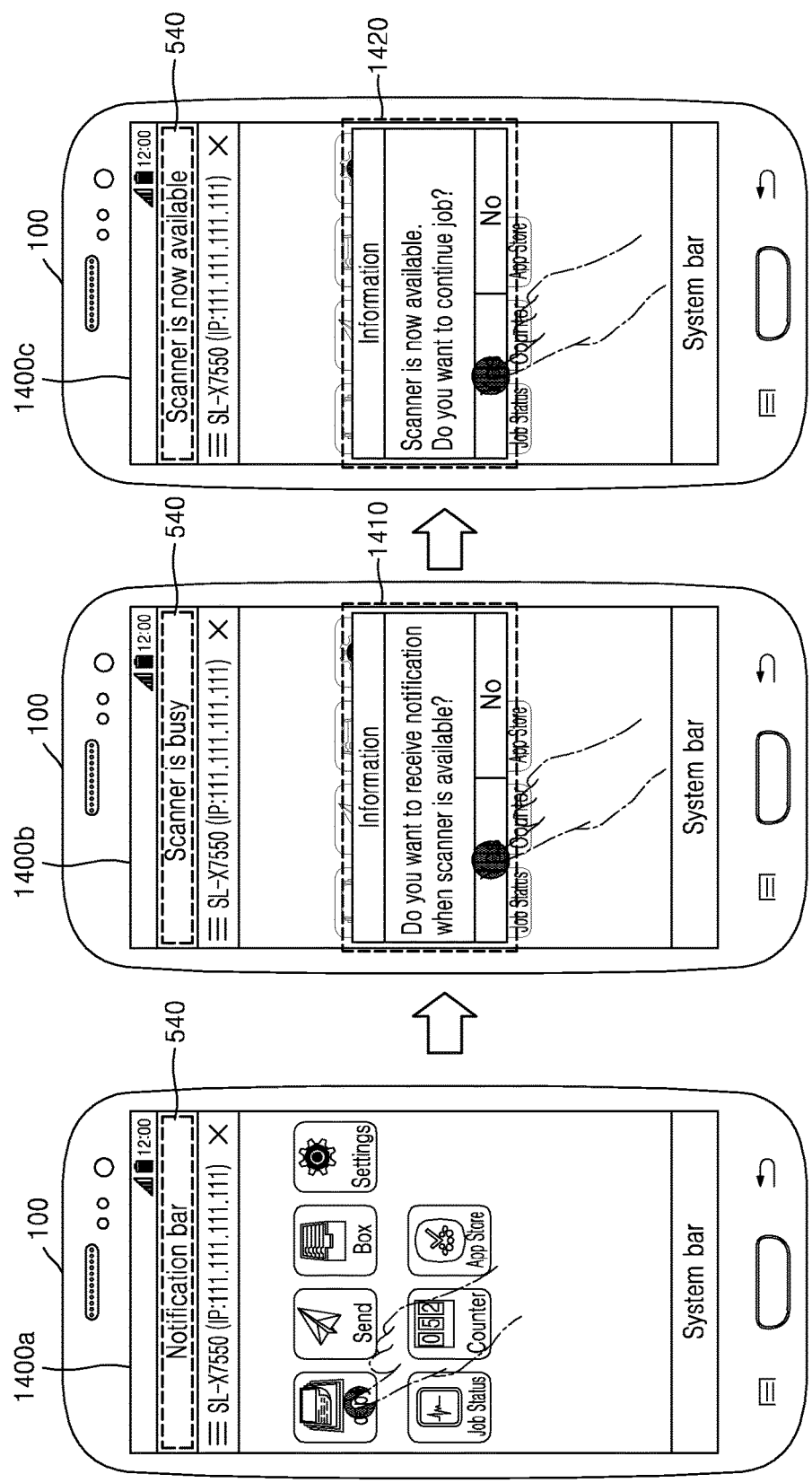
FIGS. 14 to 19 illustrate examples of displaying a notification related to a job on a notification bar in the BYOD portal application according to an exemplary embodiment.

Referring to FIG. 14, when the user selects the copy application on a first screen 1400a, the user terminal 100 requests a document copy job from the image forming apparatus 200. When the image forming apparatus 200 receives a copy job request from the user terminal 100, the image forming apparatus 200 checks whether the scanning unit 250 is in use and, if the scanning unit 250 is found to be in use, the image forming apparatus 200 transmits a notification to the user terminal 100.

In a second screen 1400b of FIG. 14, a notification "Scanner is busy" indicating that the scanning unit 250 is currently in use is displayed on the notification bar 540. The notification is displayed only on the user terminal 100 that requested the job, but not on the manipulation unit 210 of the image forming apparatus 200 or other wireless terminals connected to the image forming apparatus 200.

A popup window 1410 asking whether to receive a notification when the scanning unit 250 becomes available is displayed on the second screen 1400b of FIG. 14. When "Yes" is selected in the popup window 1410, the image forming apparatus 200 transmits a notification to the user terminal 100 when the scanning unit 250 becomes available.

When the user terminal 100 receives from the image forming apparatus 200 a notification that the scanning unit 250 is available, as shown in a third screen 1400c of FIG. 14, a notification "Scanner is now available" is displayed on the notification bar 540. Also, a popup window 1420 asking whether to perform the previously requested job is displayed on the third screen 1400c. When "Yes" is selected in the popup window 1420, the image forming apparatus 200 performs the job requested through the selection of the copy application on the first screen 1400a.

Alternatively, when the image forming apparatus 200 completes the job, a notification is transmitted to the user terminal 100 and the user terminal 100 may display a received notification on the notification bar 540 of the BYOD portal application.

Figure 15:
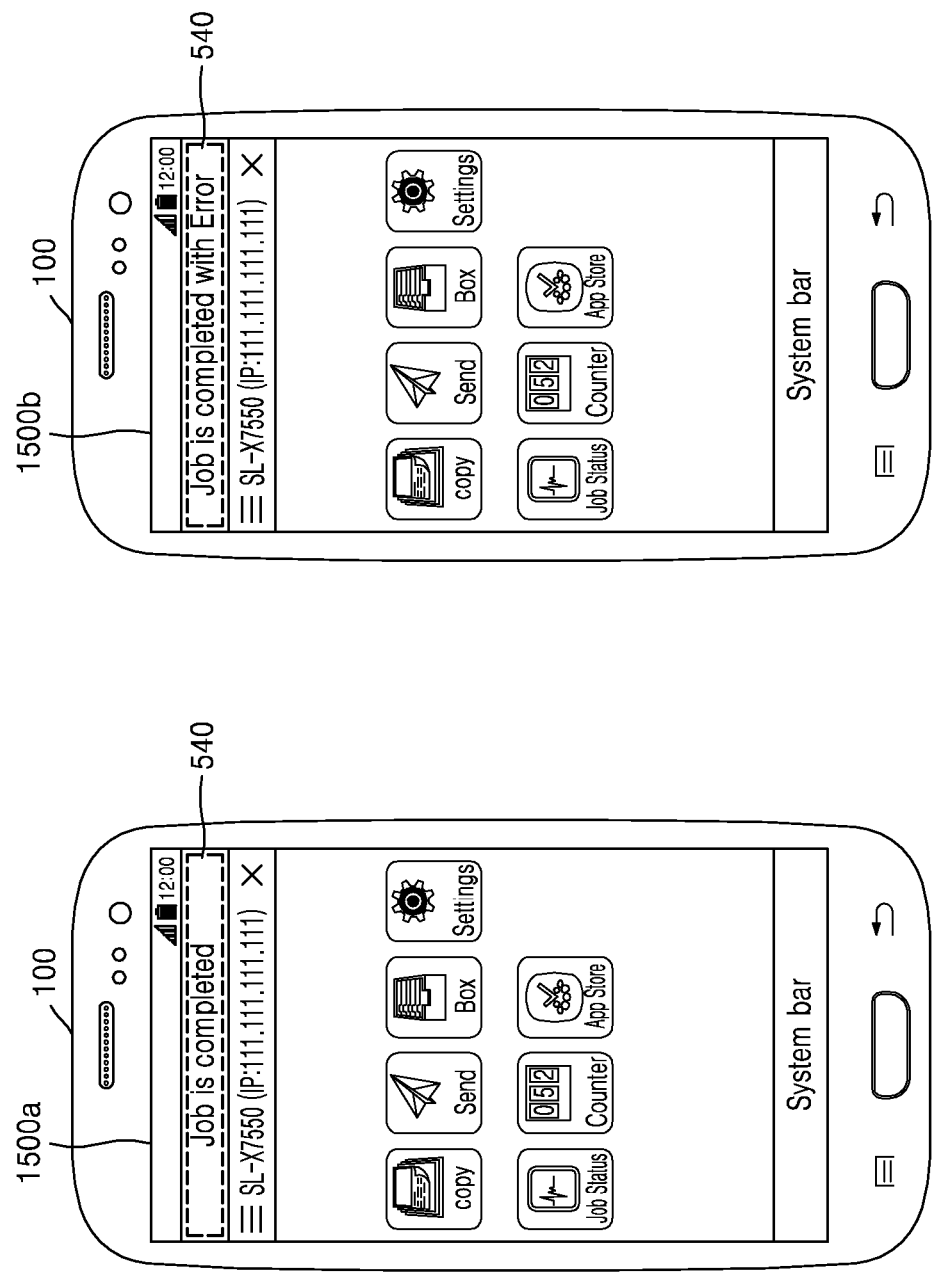

When the job is successfully completed, as shown in a first screen 1500a of FIG. 15, a notification "Job is completed" is displayed on the notification bar 540. However, when an error occurs, as shown in a second screen 1500b of FIG. 15, a notification "Job is completed with Error" is displayed on the notification bar 540.

The notification indicating the completion of a job is basically displayed only on the user terminal that requested the job. In other words, when a plurality of user terminals are connected to the image forming apparatus 200 through the BYOD portal application, the notification is displayed only on the user terminal that requested a job among the connected user terminals. However, when a single user logs on a plurality of user terminals through the BYOD portal application, the notification may be displayed on all user terminals on which the user logged.

Figure 16:
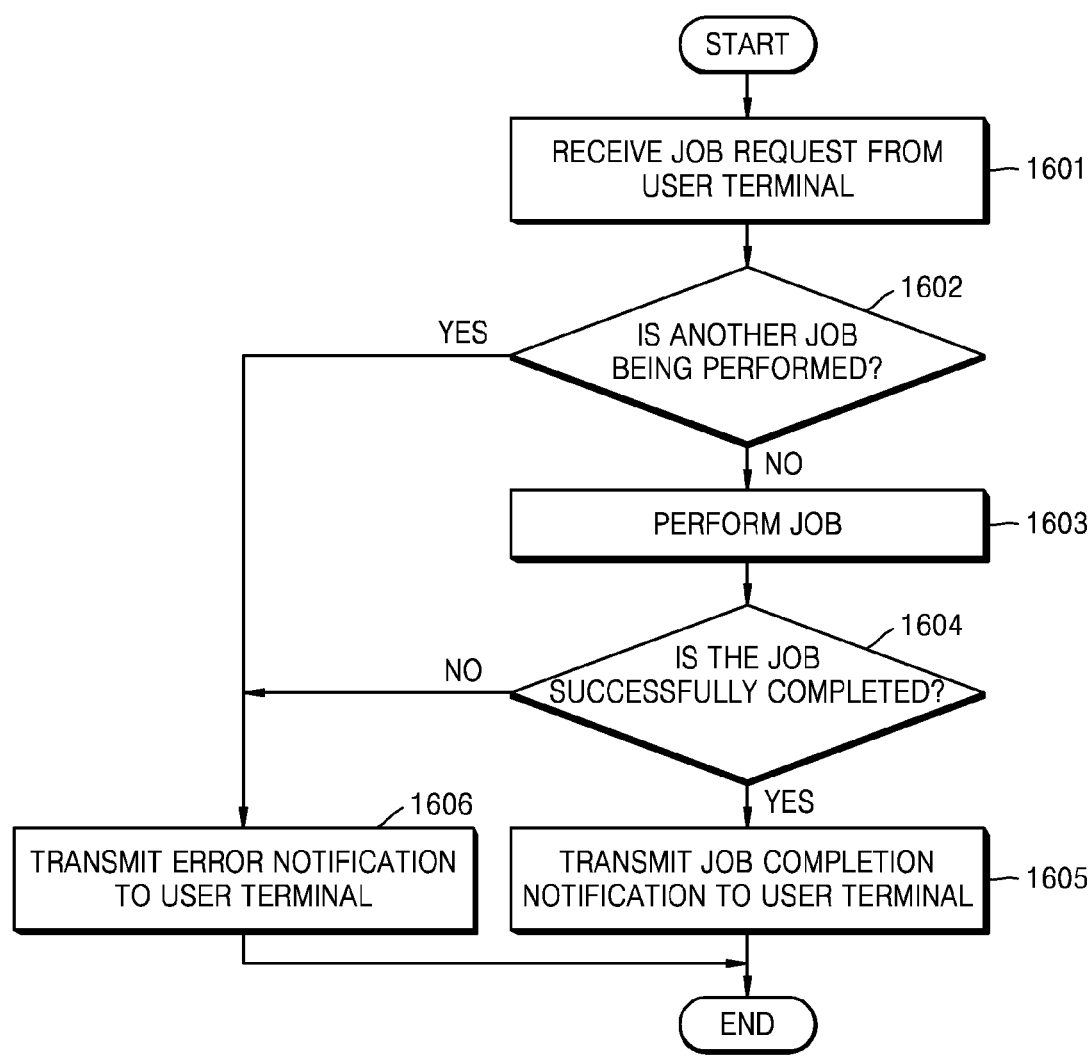
Figure 17:
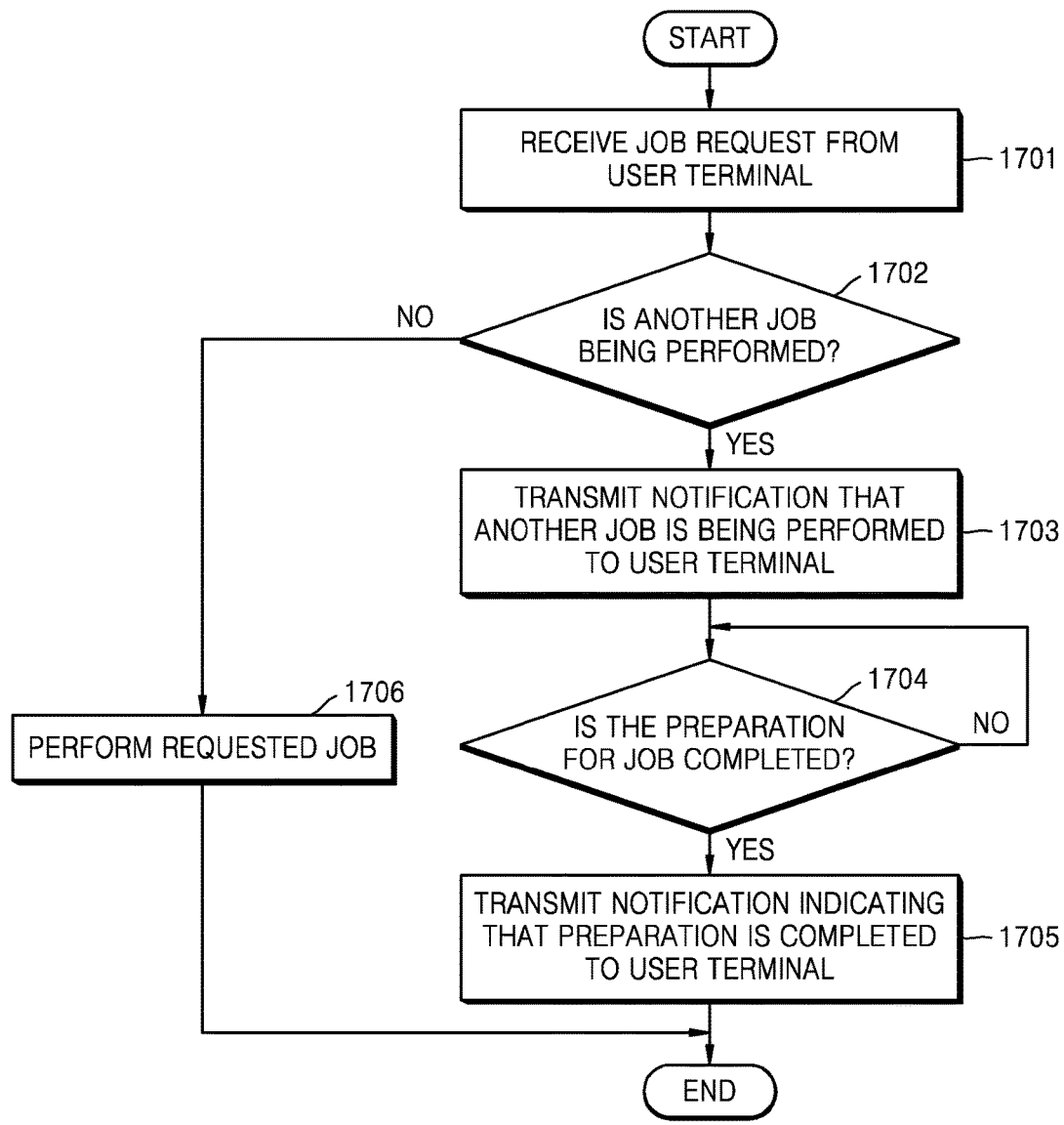

FIGS. 16 and 17 are flowcharts for describing a process of transmitting a notification to a user terminal according to the existence of another job when the image forming apparatus 200 receives a job request, according to an exemplary embodiment.

Referring to FIG. 16, in Operation 1601, the image forming apparatus 200 receives a job request from the user terminal 100. In detail, the image forming apparatus 200 receives a request for a job such as copying or scanning through the BYOD portal application installed on the user terminal 100.

In Operation 1602, the image forming apparatus 200 determines whether another job is being performed. In detail, the main control unit 220 of the image forming apparatus 200 determines whether a necessary structure for the requested job is currently in use. For example, when the requested job is a copy job, the main control unit 220 determines whether the printing unit 240 and the scanning unit 250 are currently in use.

If another job is being performed as a result of the determination in Operation 1602, Operation 1606 is performed and thus the image forming apparatus 200 transmits an error notification to the user terminal 100.

In contrast, if no other job is being performed as the result of the determination in Operation 1602, Operation 1603 is performed and thus the image forming apparatus 200 performs the requested job.

In Operation 1604, the image forming apparatus 200 determines whether the requested job is successfully completed.

If the job is not successfully completed as a result of the determination in Operation 1604, Operation 1606 is performed and thus the image forming apparatus 200 transmits an error notification to the user terminal 100.

In contrast, if the job is successfully completed as the result of the determination in Operation 1604, Operation 1605 is performed and thus the image forming apparatus 200 transmits a job completion notification to the user terminal 100.

Referring to FIG. 17, in Operation 1701, the image forming apparatus 200 receives a job request from the user terminal 100. In detail, the image forming apparatus 200 receives a request for a job such as copying or scanning through the BYOD portal application installed on the user terminal 100.

In Operation 1702, the image forming apparatus 200 determines whether another job is being performed. In detail, the main control unit 220 of the image forming apparatus 200 determines whether a necessary structure for performing the requested job is currently in use. For example, when the requested job is a copy job, the main control unit 220 determines whether the printing unit 240 and the scanning unit 250 are in use.

If no other job is being performed as a result of the determination in Operation 1702, Operation 1706 is performed and thus the image forming apparatus 200 performs the requested job.

In contrast, as the result of determination in Operation 1702, when another job is being performed, Operation 1703 is performed and thus the image forming apparatus 200 transmits a notification that another job is being performed, to the user terminal 100.

Next, in Operation 1704, the image forming apparatus 200 determines whether preparation for the job is completed. In other words, the image forming apparatus 200 determines whether the other job is completed and thus the job requested in Operation 1701 is ready to be performed.

If the preparation for the job is not completed as a result of the determination in Operation 1704, Operation 1704 is performed again.

In contrast, if the preparation for the job is completed as the result of the determination in Operation 1704, Operation 1705 is performed and thus the image forming apparatus 200 transmits a notification indicating that the preparation is completed, to the user terminal 100.

Alternatively, when a job performance notification option becomes active in the BYOD portal application, the user terminal 100 may receive a notification about the progress of the job from the image forming apparatus 200.

Figure 18:
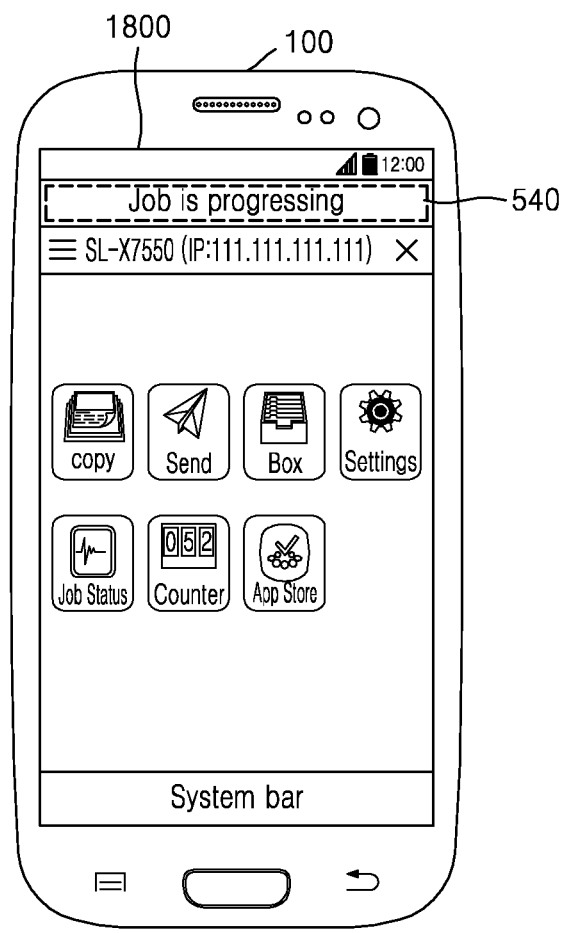

Referring to a screen 1800 illustrated in FIG. 18, the user terminal 100 receives a notification indicating that the requested job is currently performed, from the image forming apparatus 200, a notification "Job is progressing" is displayed on the notification bar 540.

Figure 19:
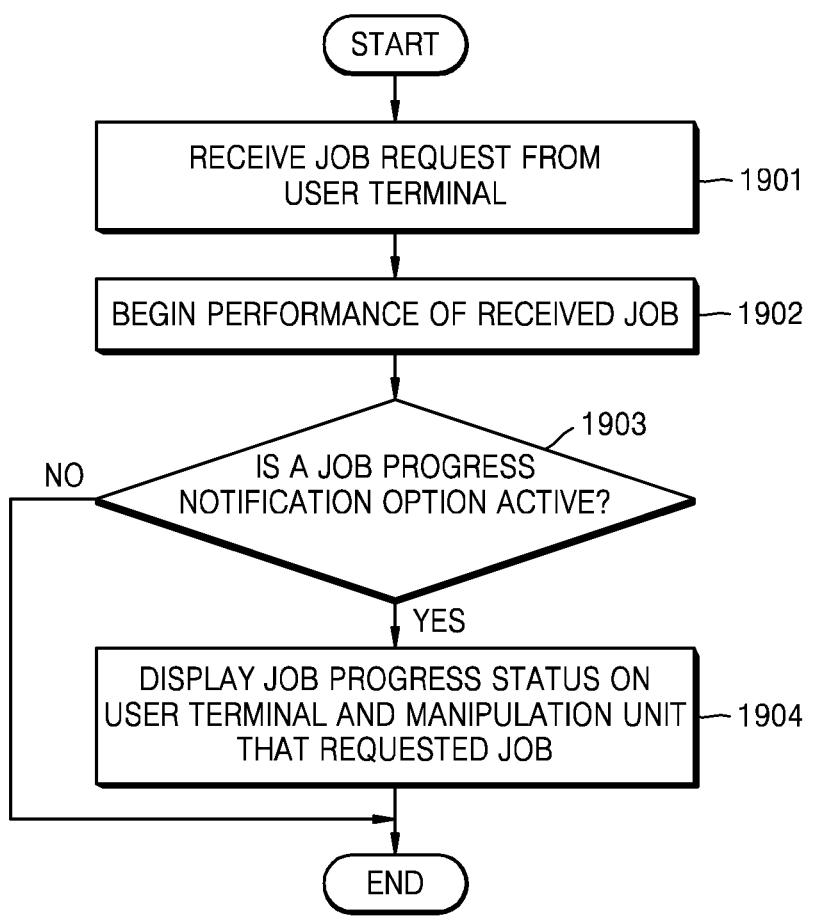

FIG. 19 is a flowchart for describing a process in which the user terminal 100 receives a job performance notification indicating from the image forming apparatus 200.

Referring to FIG. 19, in Operation 1901, the image forming apparatus 200 receives a job request from the user terminal 100. In detail, the image forming apparatus 200 receives a request of a job such as copying or scanning through the BYOD portal application installed on the user terminal 100.

In Operation 1902, the image forming apparatus 200 starts the requested job.

In Operation 1903, the image forming apparatus 200 determines whether a job progress notification option is active in the BYOD portal application installed on the user terminal 100.

If the job progress notification option is active as a result of the determination in Operation 1903, Operation 1904 is performed and thus the image forming apparatus 200 transmits a notification about a job progress status to the user terminal 100 and the manipulation unit 210 that requested the job. Then, a notification indicating that the image forming apparatus 200 is currently performing the job is displayed on the screen of the user terminal 100 and the manipulation unit 210 that received the notification.

The notification about a job progress status is basically displayed only on the user terminal that requested the job only job progress status. However, progress status notifications with respect to all jobs may be displayed on the manipulation unit of the image forming apparatus.

In the process of operating the image forming apparatus 200 through the BYOD portal application installed on the user terminal 100, various event popup windows may be displayed on the screens of the user terminal 100 and the manipulation unit 210 of the image forming apparatus 200.

Figure 20:
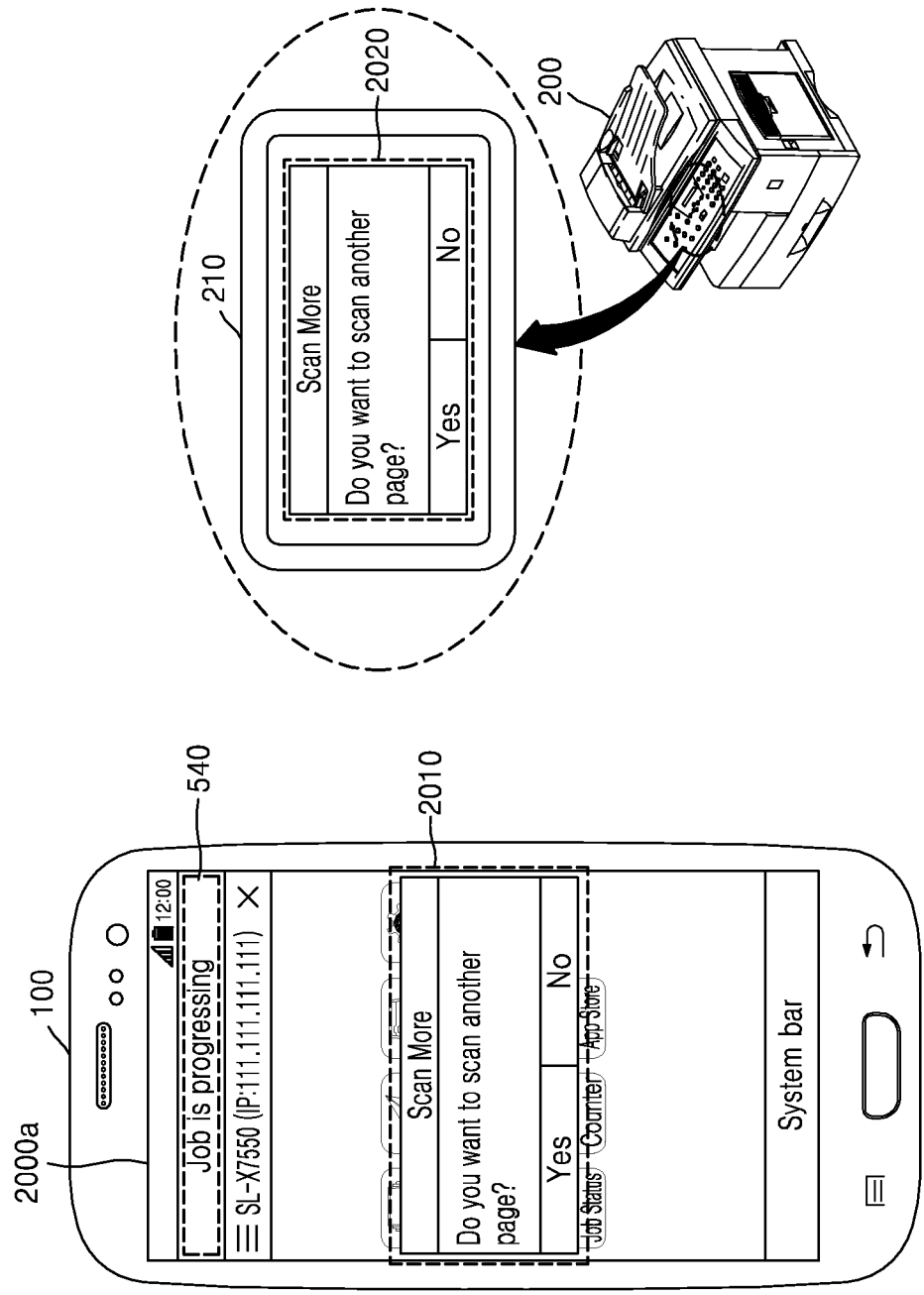
FIGS. 20 to 22 illustrate event popup windows displayed on the user terminal and the image forming apparatus, in a process of operating an image forming apparatus through the BYOD portal application according to an exemplary embodiment.
Figure 21:
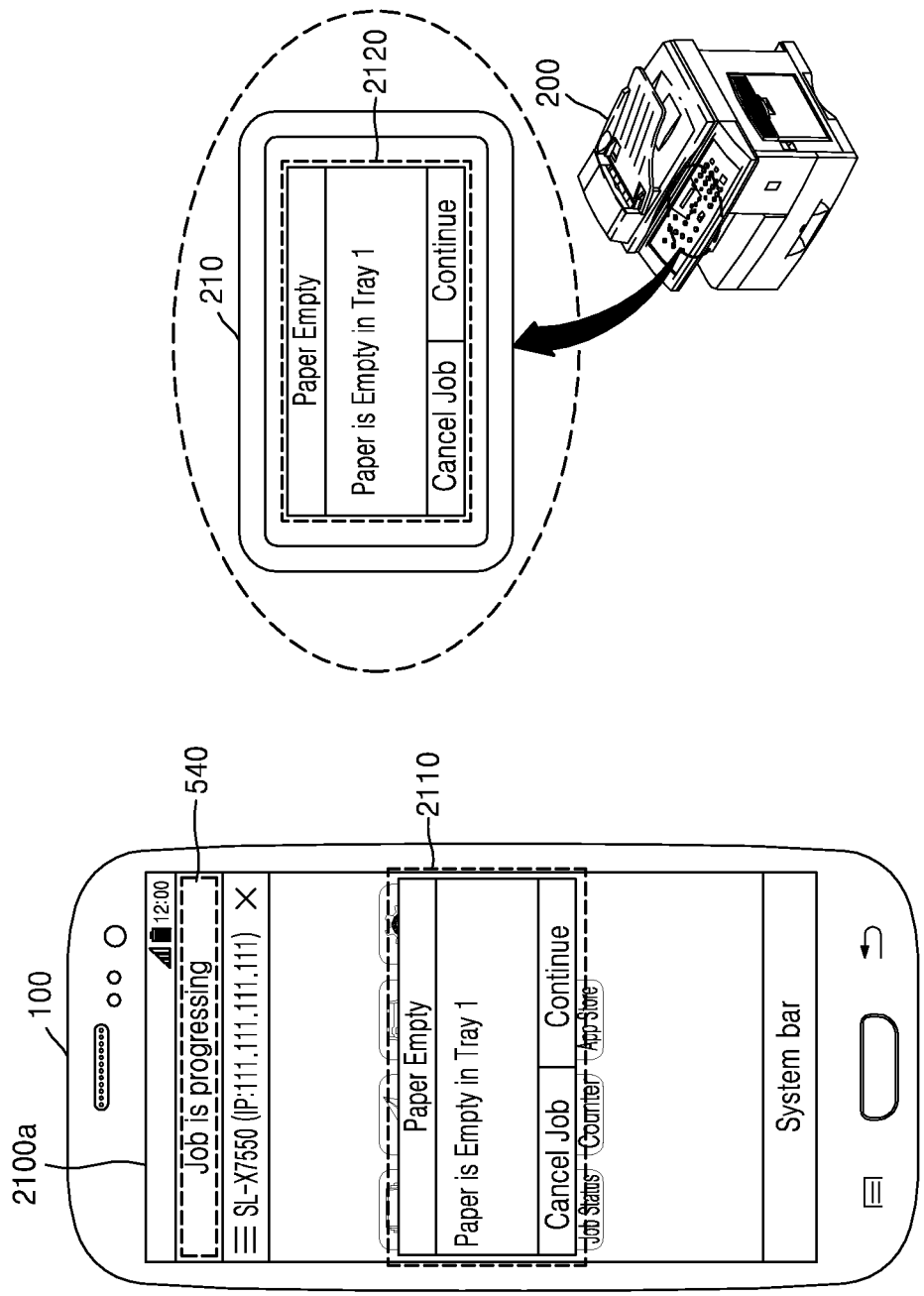
Figure 22:
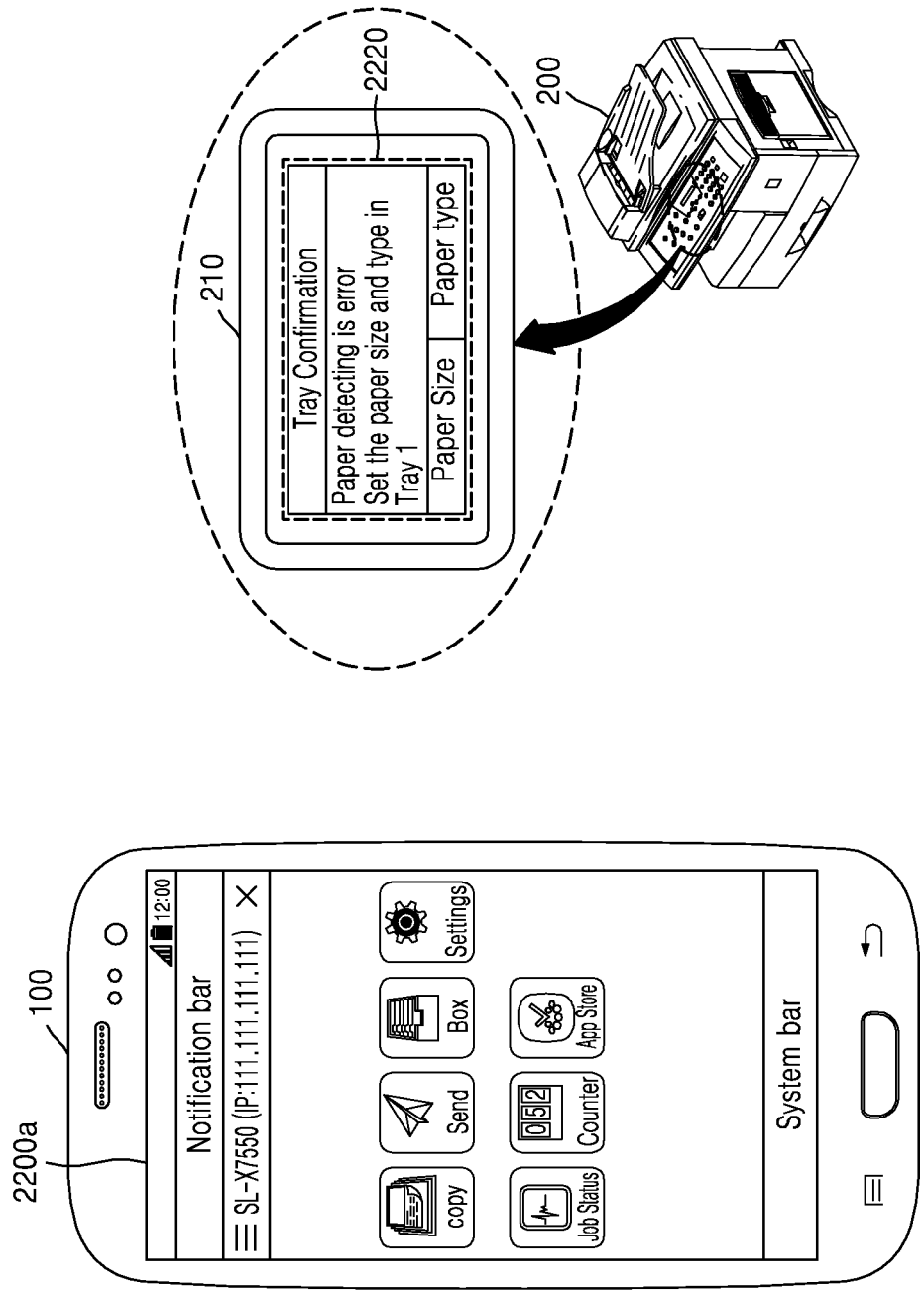

FIGS. 20 to 22 illustrate event popup windows displayed on the user terminal and the image forming apparatus, in a process of operating an image forming apparatus through the BYOD portal application according to an exemplary embodiment.

Referring to FIG. 20, when the user terminal 100 requests a scan job from the image forming apparatus 200 through the BYOD portal application, after scanning of one page is completed, the image forming apparatus 200 may request displaying a popup window asking whether to scan another page, from the user terminal 100 and the manipulation unit 210.

In FIG. 20, on a first screen 2000a displayed on the user terminal 100, a notification indicating that the image forming apparatus 200 is currently performing the job is displayed on the notification bar 540 with a popup window 2010 asking whether to scan another page. Also, a popup window 2020 asking whether to scan another page is displayed on a screen of the manipulation unit 210 of the image forming apparatus 200.

Accordingly, the user may request scanning another page by operating any one of a popup window 2010 displayed on the user terminal 100 and a popup window 2020 displayed on the screen of the manipulation unit 210. When any one of the popup window 2010 displayed on the user terminal 100 and the popup window 2020 displayed on the screen of the manipulation unit 210 receives a user's input, the other popup window automatically disappears.

Referring to FIG. 21, when no paper is left in the image forming apparatus 200 although the user terminal 100 requests a print job from the image forming apparatus 200 through the BYOD portal application, the image forming apparatus 200 may stop the job that is currently performed and request displaying a popup request indicating that paper is empty in a tray, from the user terminal 100 and the manipulation unit 210.

In FIG. 21, on a first screen 2100a displayed on the user terminal 100, a notification indicating that the image forming apparatus 200 is currently performing the job is displayed on the notification bar 540 with a popup window 2110 indicating that paper is empty in the tray. Also, a popup window 2120 indicating that paper is empty in the tray is displayed on the screen of the manipulation unit 210 of the image forming apparatus 200.

After supplying paper to the image forming apparatus 200, the user may request resumption of the job paused due to a lack of paper by selecting "Continue" from any one of the popup window 2110 displayed on the user terminal 100 and the popup window 2120 displayed on the screen of the manipulation unit 210. Alternatively, the user may cancel the requested job by selecting "Cancel Job" from any one of the two popup windows 2110 and 2120.

Event popup windows related to the job progress illustrated in FIGS. 20 and 21 are displayed only on the screen of the manipulation unit 210 and the screen of the user terminal 100 that requested the job. In other words, even when a plurality of user terminals are connected to the image forming apparatus 200 through the BYOD portal application, the popup window is displayed only on the user terminal that requested the job among the user terminals.

Alternatively, according to the characteristic of an event popup window, the event popup window may be displayed not on the user terminal 100 that is connected to the image forming apparatus 200 but only on the manipulation unit 210 of the image forming apparatus 200.

Referring to FIG. 22, a popup window 2220 requesting checking a tray is displayed on the manipulation unit 210 of the image forming apparatus 200. The popup window 2220 displays a message that "Paper detecting is error. Set the paper size and type in Tray 1."

In order to solve the problem indicated by the above popup window, the user needs to directly access the image forming apparatus 200 and perform necessary operations. Thus, the popup window is not displayed on a first screen 2200a displayed on the user terminal 100. However, when another job may not be performed due to occurrence of an error, a popup window indicating that, since an error occurred, the user needs to directly check the image forming apparatus 200, may be displayed on the user terminal 100.

Figure 23:
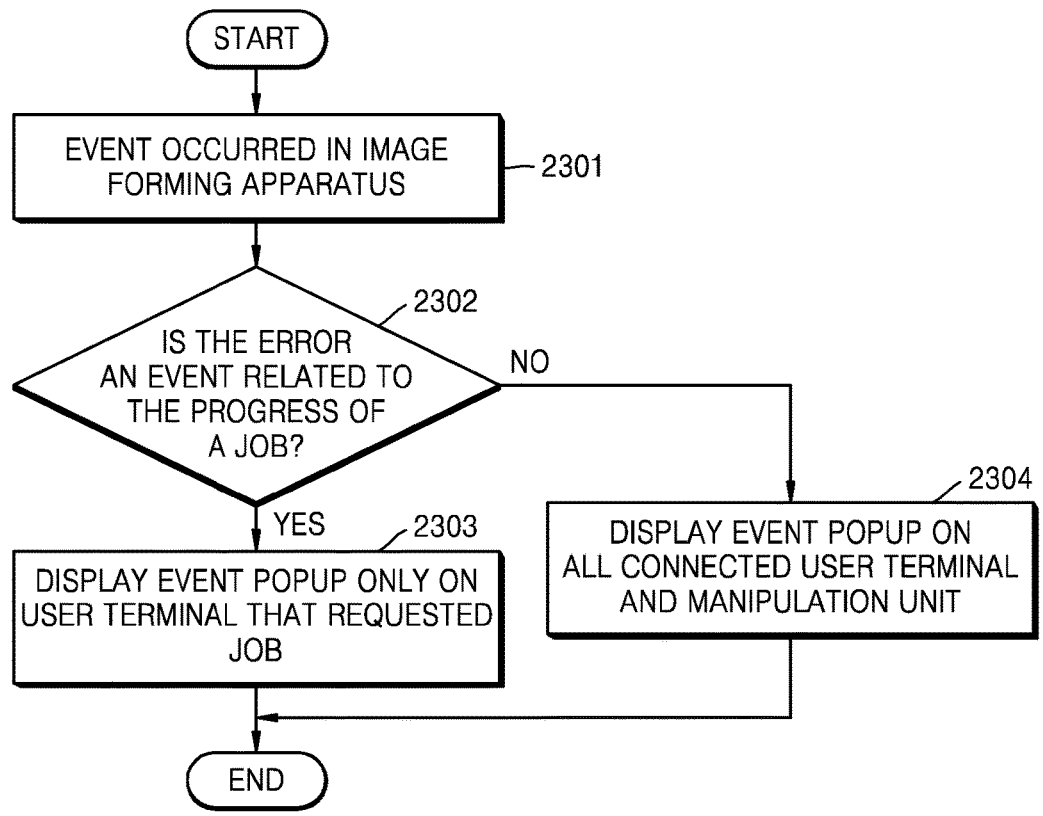
FIG. 23 is a flowchart for explaining a process of displaying an event popup window on the user terminal and the image forming apparatus, in the process of operating the image forming apparatus through the BYOD portal application according to an exemplary embodiment.

FIG. 23 is a flowchart for explaining a process of displaying an event popup window on the user terminal and the image forming apparatus, in the process of operating the image forming apparatus through the BYOD portal application according to an exemplary embodiment.

Referring to FIG. 23, in Operation 2301, an event occurs in the image forming apparatus 200. In this state, the event that occurred may be one of, for example, completion of scanning one document or paper being empty in the tray. In addition, there may be various types of events, for example, a change in the state of the image forming apparatus 200, which the user needs to be notified of.

In Operation 2302, the main control unit 220 of the image forming apparatus 200 determines whether the event that occurred is related to the job progress. In other words, it is determined that the event that occurred is related to the performance of the job requested by the user terminal 100 through the BYOD portal application. For example, if an error occurs in the image forming apparatus 200 and the error occurs during the performance of the job requested by the user terminal 100, the occurrence of the error is determined as an event related to the progress of the job requested by the user terminal 100. However, even when an error occurs in the image forming apparatus 200, the error is not determined to be an event related to the progress of a job if the error does not occur during performance of a particular job.

If the error is not an event related to the progress of a job as a result of the determination of Operation 2302, Operation 2304 is performed and thud the main control unit 220 requests displaying of an event popup window on all user terminals connected to the image forming apparatus 200, and on the manipulation unit 210.

If the error is an event related to the progress of a job as the result of the determination of Operation 2302, Operation 2303 is performed and thus the main control unit 220 requests displaying of an event popup window only on the user terminal that requested the job among the user terminals connected to the image forming apparatus 200, and on the manipulation unit 210.

Figure 24:
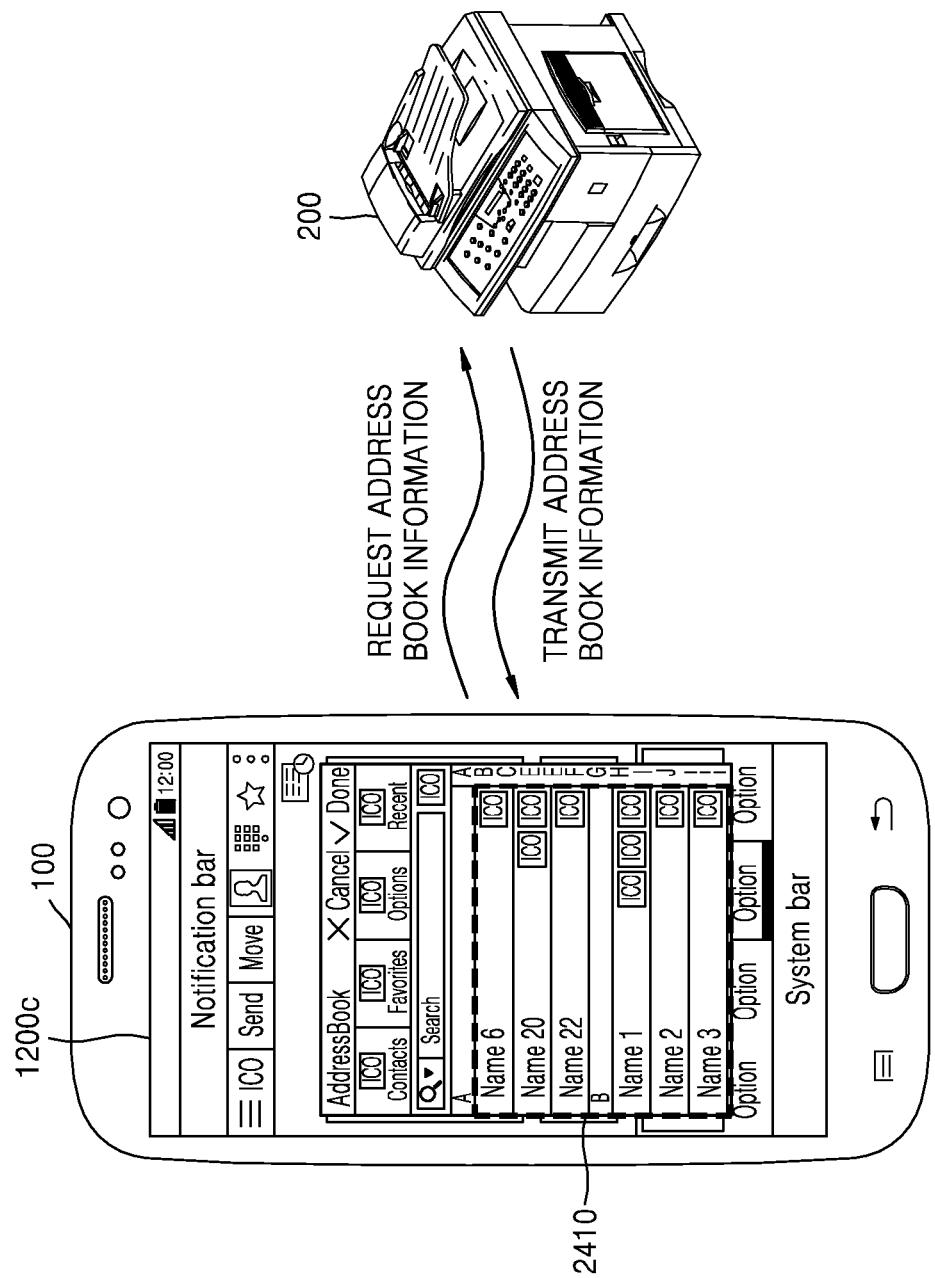
FIGS. 24 and 25 are views for explaining a method of sharing an address book, in the process of operating the image forming apparatus through the BYOD portal application according to an exemplary embodiment.
Figure 25:
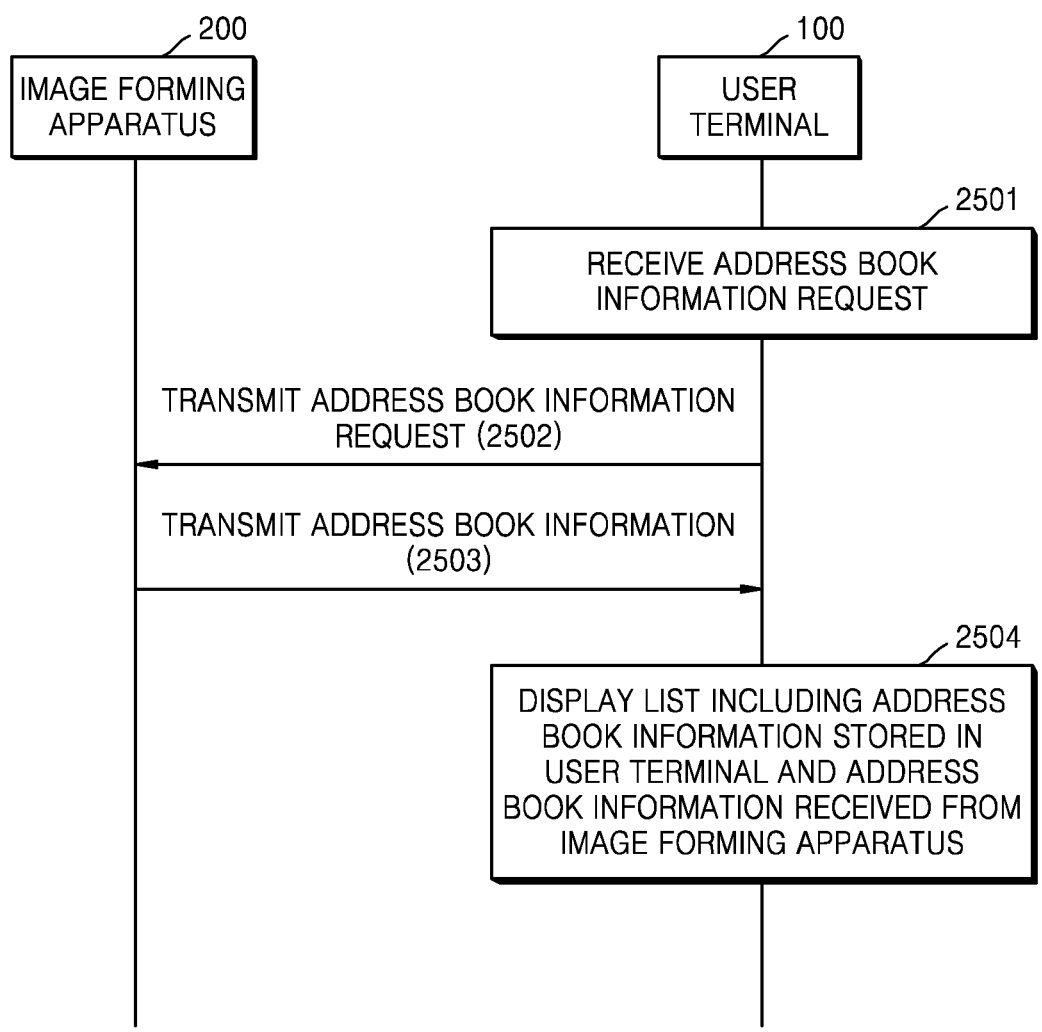

FIGS. 24 and 25 are views for explaining a method of sharing an address book, in the process of operating the image forming apparatus through the BYOD portal application according to an exemplary embodiment.

The user may share an address book stored in the user terminal 100 and an address book stored in the image forming apparatus 200 through the BYOD portal application. In other words, when operating the image forming apparatus 200 through the BYOD portal application installed on the user terminal 100, the user may use the address book stored in the user terminal 100 and the address book stored in the image forming apparatus 200 for all jobs.

For example, when a scan-to-email job is required, the user may select an email address, to which a scan file is to be transmitted, from the address book stored in the user terminal 100 and the address book stored in the image forming apparatus 200. To this end, all the address books stored in the user terminal 100 and the image forming apparatus 200 may be displayed on the BYOD portal application of the user terminal 100.

Referring to FIG. 24, when an address book needs to be displayed on the BYOD portal application, the user terminal 100 requests address book information from the image forming apparatus 200 and the image forming apparatus 200 receiving the address book information transmits the address book information to the user terminal 100. The user terminal 100 may display an address book list 2410 on the screen by incorporating the address book information stored in the user terminal 100 and the address book information received from the image forming apparatus 200. In this state, addresses included in the address book list 2410 may be displayed differently according to a storage location. For example, colors or icons of addresses stored in the user terminal 100 and addresses stored in the image forming apparatus 200 may be made to be different from each other or regions of the addresses stored in the user terminal 100 and the addresses stored in the image forming apparatus 200 may be separately displayed.

FIG. 25 illustrates a process of sharing an address book. Referring to FIG. 25, in Operation 2501, when the user terminal 100 receives an address book inquiry request through the BYOD portal application, in Operation 2502, the user terminal 100 transmits the address book inquiry request to the image forming apparatus 200.

In Operation 2503, when the image forming apparatus 200 transmits the address book information to the user terminal 100, in Operation 2504, the user terminal 100 displays on the screen an address book list including all the address book information stored in the user terminal 100 and the address book information received from the image forming apparatus 200.

FIGS. 26 to 32 are views for explaining a method of sharing a file system, in the process of operating the image forming apparatus through the BYOD portal application according to an exemplary embodiment.

The user may share a file system of the user terminal 100 and a file system of the image forming apparatus 200 through the BYOD portal application. In other words, when operating the image forming apparatus 200 through the BYOD portal application installed on the user terminal 100, the user may perform the job by accessing both of the file system of the user terminal 100 and the file system of the image forming apparatus 200.

For example, when a scan-to-box job is requested, the user may select any one of storage folders of the user terminal 100 and storage folders of the image forming apparatus 200, as a location of storing a scan image.

Figure 26:
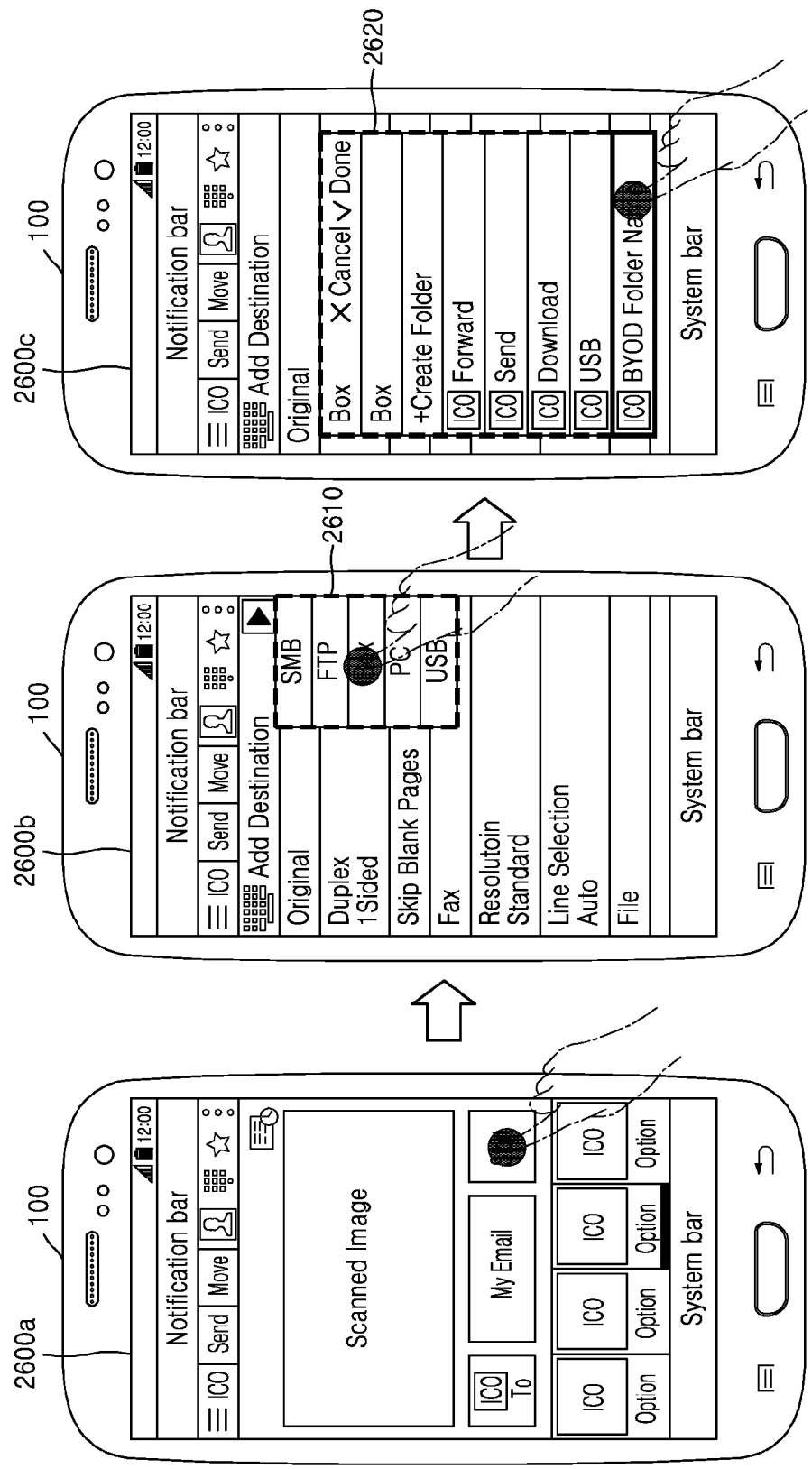
FIGS. 26 to 28 are views for explaining a method of sharing a file system, in the process of operating the image forming apparatus through the BYOD portal application according to an exemplary embodiment.

Referring to FIG. 26, when the user checks the scan image scanned in the image forming apparatus 200 on a first screen 2600a of the user terminal 100 and selects a transmission start button, a second screen 2600b is displayed.

A list for selecting a destination to transmit the scan image is displayed on the second screen 2600b in the form of a pull-down menu 2610. When "Box" is selected from the pull-down menu 2610, the image forming apparatus 200 executes an application and a third screen 2600c is displayed on the user terminal 100.

A popup window 2620 for selecting a location where the scan image is to be stored is displayed on the third screen 2600c through the box application. A storage fold of the user terminal 100 is displayed as "BYOD Folder Name" with the file system of the image forming apparatus 200 in the displayed popup window 2620. When "BYOD Folder Name" is selected in the popup window 2620 of the third screen 2600c, sub-storage folders of the user terminal 100 are displayed on the screen and then the user may select a folder to store the scan image among the displayed sub-storage folders.

Figure 27:
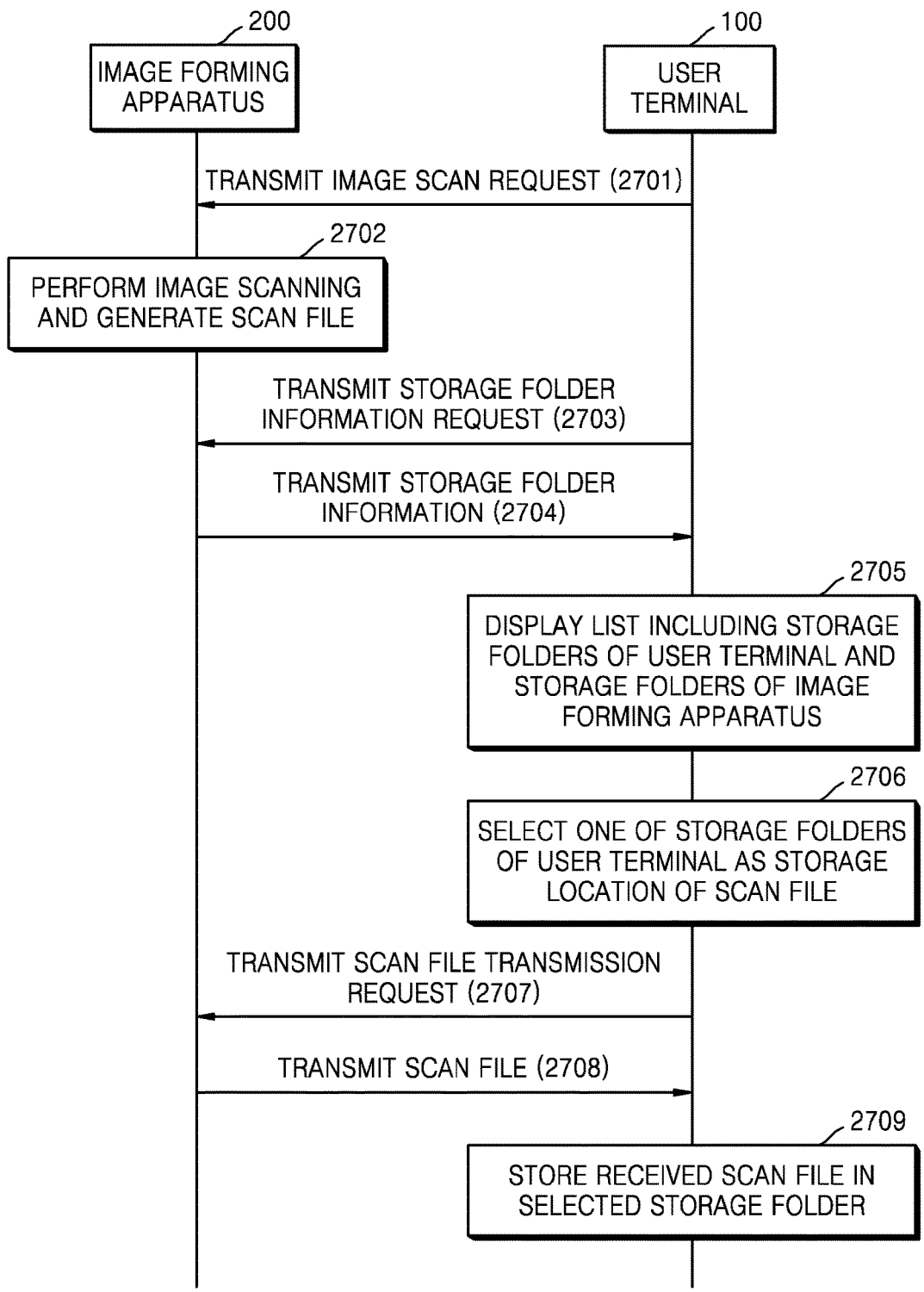

Referring to FIG. 27 which illustrates a process of sharing a file system, in Operation 2701, when the user terminal 100 transmits an image scan request to the image forming apparatus 200 through the BYOD portal application, in Operation 2702, the image forming apparatus 200 scans an image to generate a scan file.

In Operation 2703, the user terminal 100 transmits a storage folder information request to store the scan file to the image forming apparatus 200. In response thereto, in Operation 2704, the image forming apparatus 200 transmits storage folder information to the user terminal 100.

In Operation 2705, the user terminal 100 displays on the screen a list including all of the storage folders of the user terminal 100 and the storage folders of the image forming apparatus 200. Accordingly, the user may check all of the storage folders of the user terminal 100 and the storage folders of the image forming apparatus 200 from the list displayed on the screen of the user terminal 100, and may select one of the storage folders as a storage location of the scan file.

In Operation 2706, when one of the storage folders of the user terminal 100 is selected as a storage location of the scan file, in Operation 2707, the user terminal 100 transmits a scan file transmission request to the image forming apparatus 200. In response thereto, in Operation 2708, the image forming apparatus 200 transmits the scan file to the user terminal 100.

In Operation 2709, the user terminal 100 stores a received scan file in the storage folder of the user terminal 100 selected in Operation 2706.

As such, the user may store the scan image scanned in the image forming apparatus 200 in the user terminal 100.

Alternatively, the user may access the file stored in the storage folder of the user terminal 100 and perform a job using the file, by executing the box application in the BYOD portal application of the user terminal 100.

Figure 28:
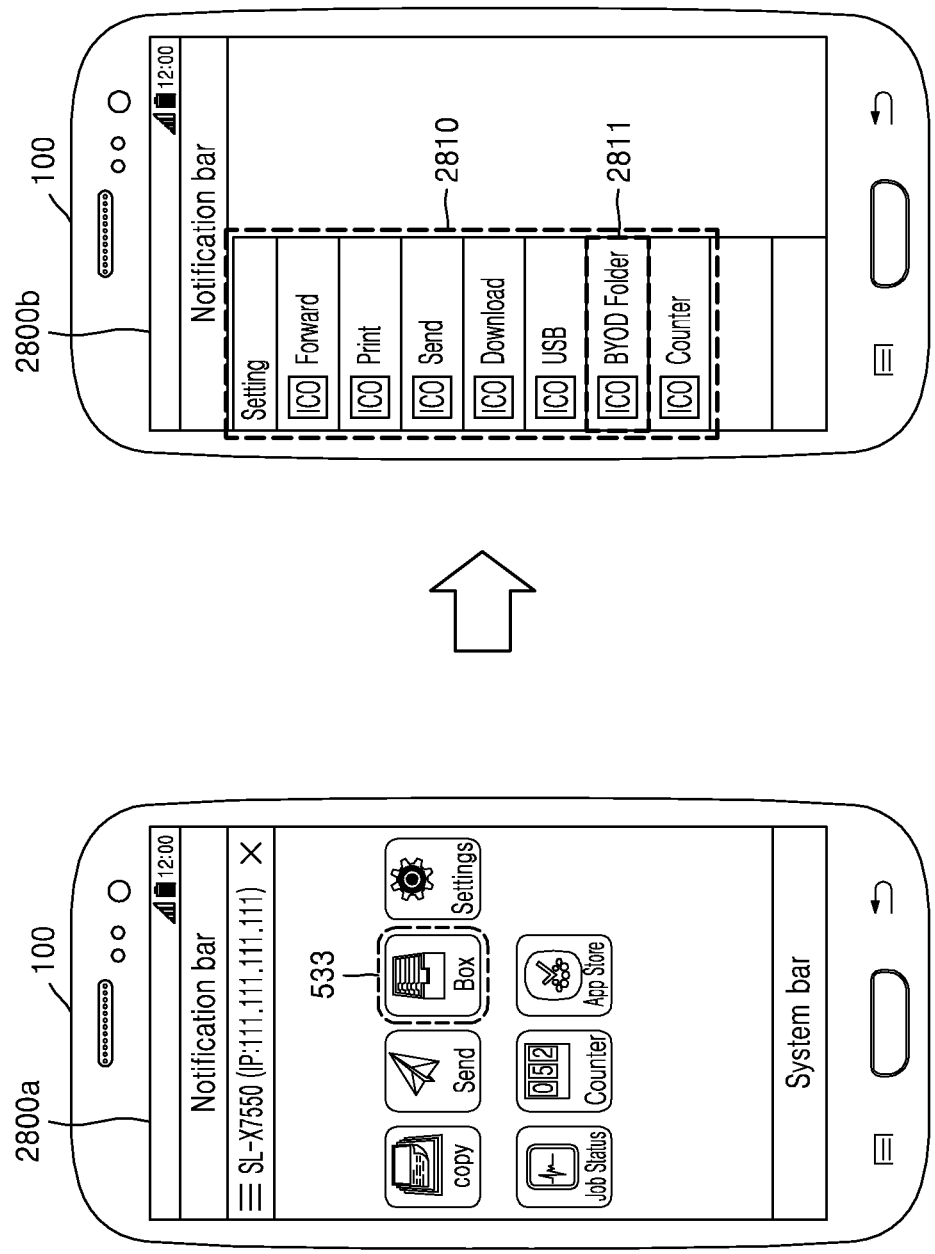

Referring to FIG. 28, when a box application 533 is selected on a first screen 2800a, a storage folder list 2810 is displayed as shown in a second screen 2800b. The storage folder list 2810 includes all of the storage folders of the user terminal 100 and the storage folders of the image forming apparatus 200. When "BYOD Folder" 2811 is selected from the storage folder list 2810, sub-storage folders of the user terminal 100 are displayed on the screen. Accordingly, the user may access a desired storage file by selecting any one of the sub-storage folders of the user terminal 100 displayed on the screen, and may perform a job using the file.

FIGS. 29 to 32 are views for explaining a method of sharing a selected file using the BYOD portal application during the performance of other applications, according to an exemplary embodiment.

Sharing a file using the box application is described with reference to FIGS. 29 and 30.

Figure 29:
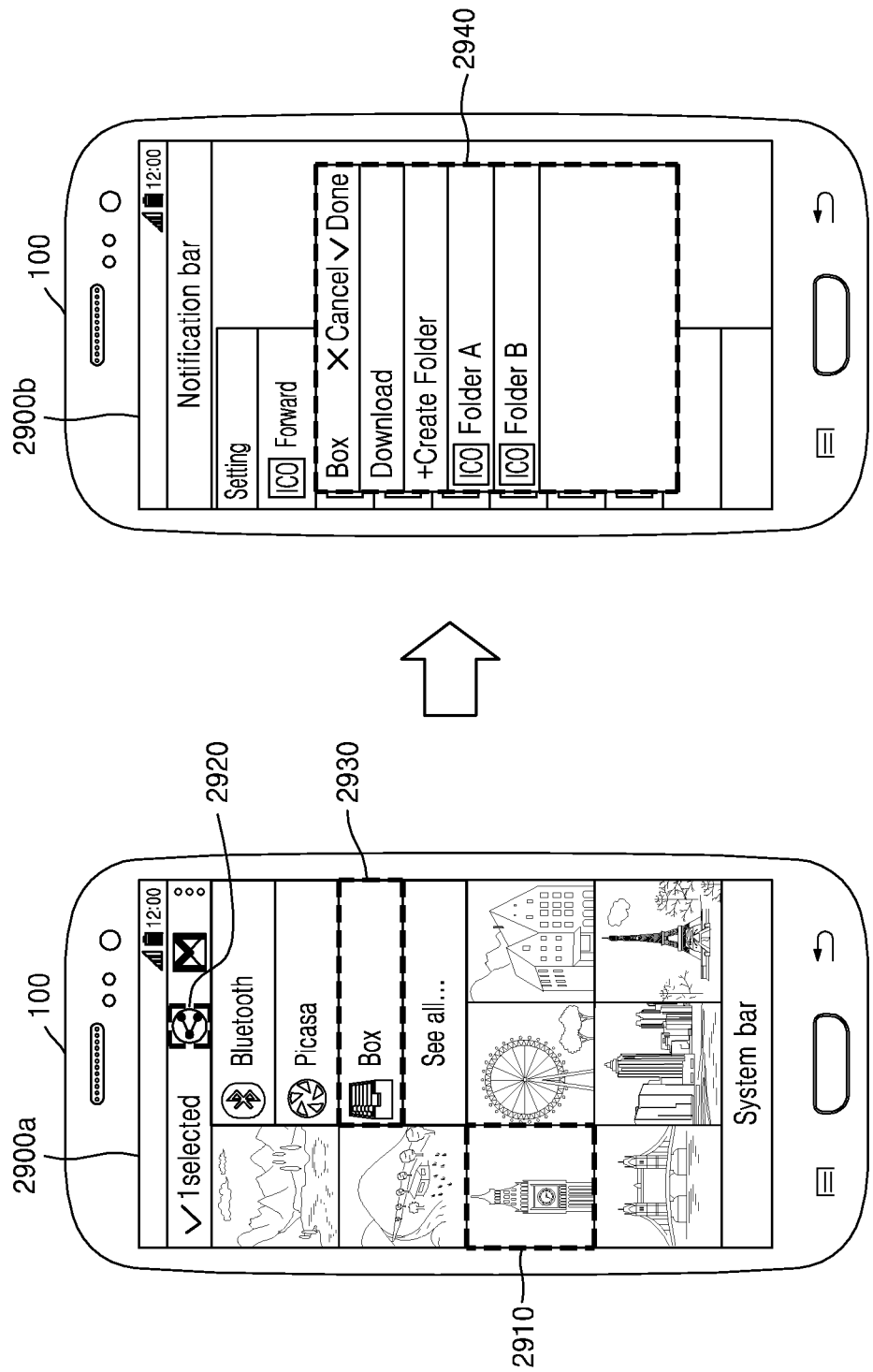
FIGS. 29 to 32 are views for explaining a method of sharing a selected file using the BYOD portal application during the performance of other applications, according to an exemplary embodiment.

Referring to FIG. 29, a first screen 2900a displays a gallery application for storing and managing pictures, which is executed in the user terminal 100. When any one picture 2910 is selected from a plurality of pictures displayed on the first screen 2900a and then a share button 2920 is selected, a list of methods or applications to share the selected picture 2910 is displayed in the form of a pull-down menu. When a box application 2930 is selected from the list, the BYOD portal application is automatically executed and a second screen 2900b to select a storage location is displayed.

When any one is selected from a storage location list 2940 displayed on the second screen 2900b, the picture 2910 selected from the first screen 2900a is stored at the selected location. Since the storage location list 2940 includes the storage folders of the image forming apparatus 200, the user may store the picture stored in the user terminal 100 in one of the storage folders of the image forming apparatus 200 using the BYOD portal application.

Figure 30:
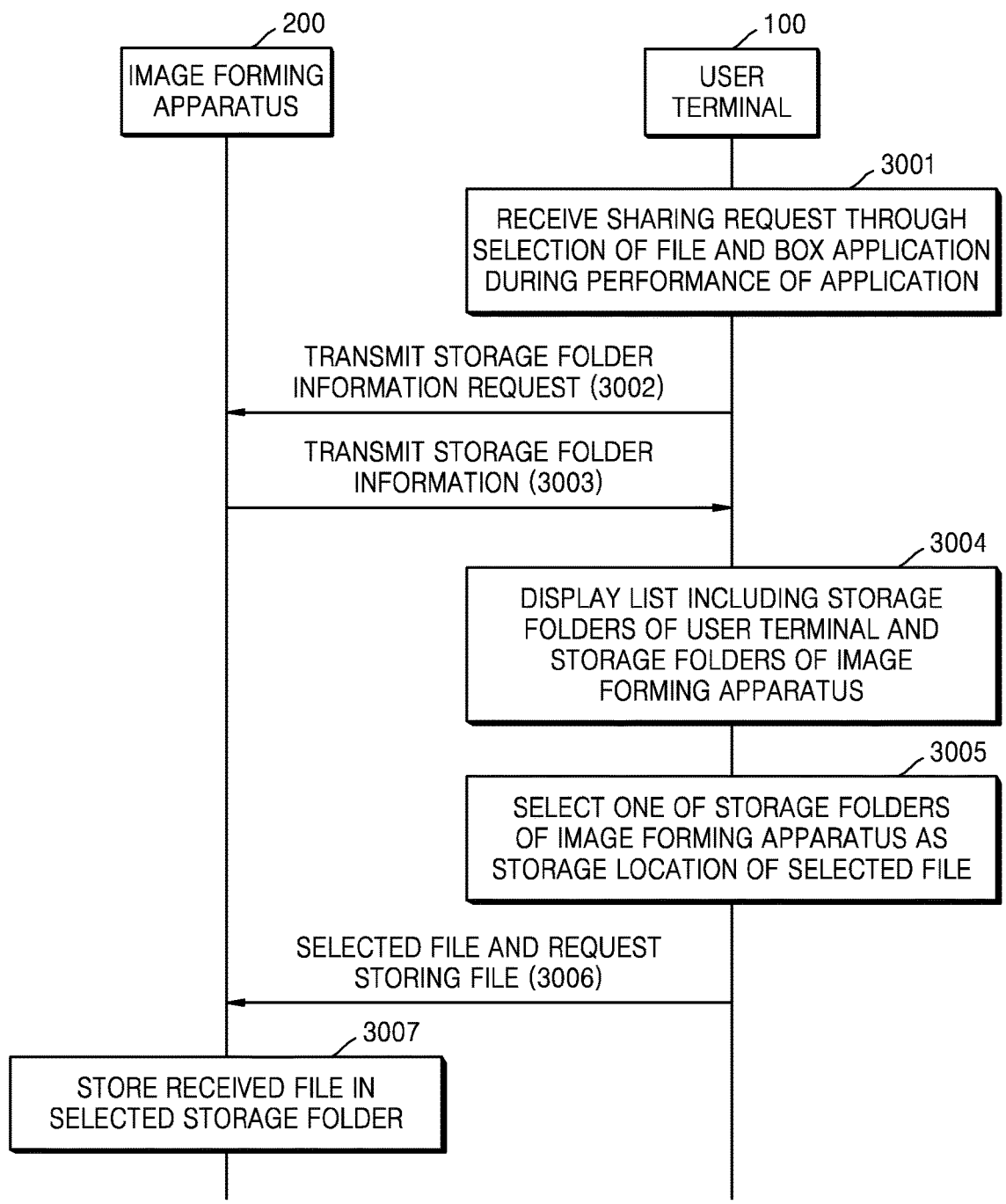

Referring to FIG. 30 which illustrates a process of sharing a file using the box application, in Operation 3001, the user terminal 100 receives a sharing request through the selection of a file and the box application during the performance of another application other than the BYOD portal application.

In Operation 3002, the user terminal 100 transmits a storage folder information request to the image forming apparatus 200. In response thereto, in Operation 3003, the image forming apparatus 200 transmits storage folder information to the user terminal 100.

In Operation 3004, the user terminal 100 displays on the screen a list including all the storage folders of the user terminal 100 and the storage folders of the image forming apparatus 200 which are received. Accordingly, the user may check all of the storage folders of the user terminal 100 and the storage folders of the image forming apparatus 200 from the list displayed on the screen of the user terminal 100, and may select one of the storage folders as a storage location of the selected file.

In Operation 3005, when one of the storage folders of the image forming apparatus 200 is selected as the storage location of the selected file, in Operation 3006, the user terminal 100 transmits the selected file to the image forming apparatus 200 and requests storing of the file.

In Operation 3007, the image forming apparatus 200 stores a received file in the selected storage folder.

Sharing a file using the send application is described with reference to FIGS. 31 and 32.

Figure 31:
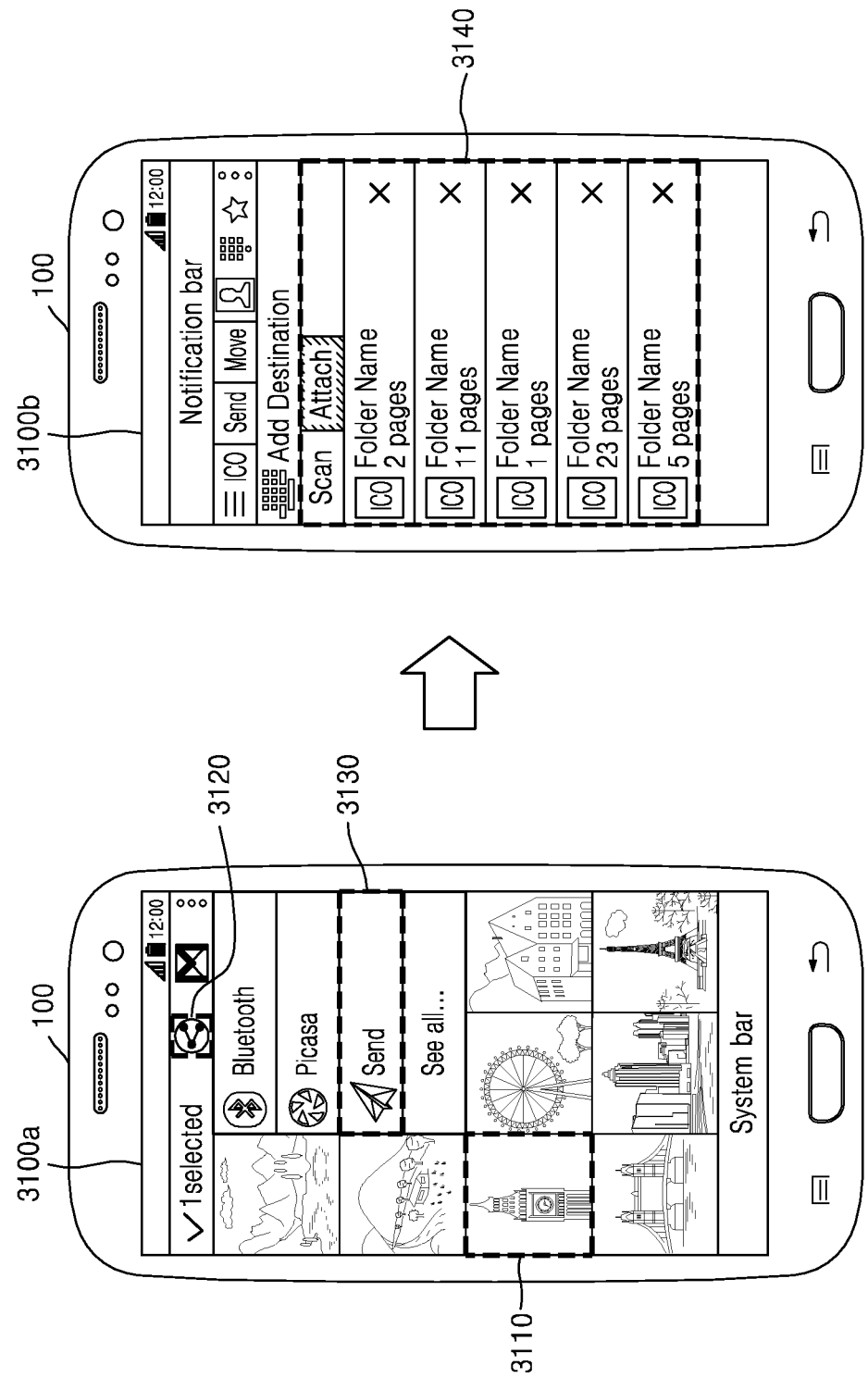

Referring to FIG. 31, a first screen 3100a displays the gallery application for storing and managing pictures, which is executed in the user terminal 100. When any one picture 3110 is selected from a plurality of pictures displayed on the first screen 3100a and then a share button 3120 is selected, a list of methods or applications to share the selected picture 3110 is displayed in the form of a pull-down menu. When a send application 3130 is selected from the list, the BYOD portal application is automatically executed and a second screen 3100b including an attachment list 3140 of the send application is displayed.

The selected picture 3110 selected from the first screen 3100a is added to the attachment list 3140 of the send application displayed on the second screen 3100b. The files attached to the attachment list 3140 of the send application are transmitted to a destination set by the image forming apparatus 200. Accordingly, the files stored in the user terminal 100 may be transmitted to an email server, a file transfer protocol (FTP) server, or a server message block (SMB) server, to which the image forming apparatus 200 supports transmission.

Figure 32:
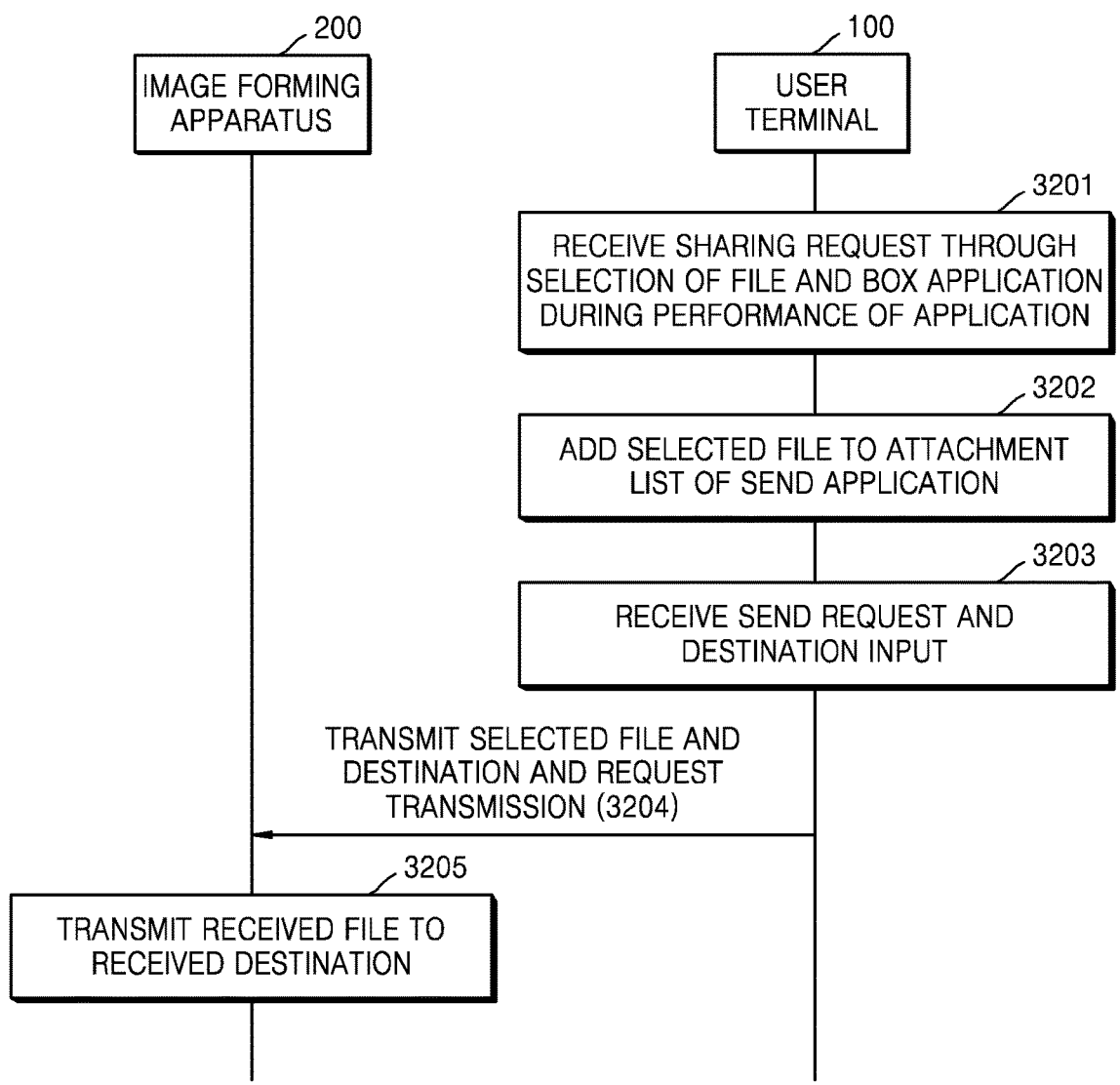

Referring to FIG. 32 which illustrates a process of sharing a file using the send application, in Operation 3201, when the user terminal 100 receives a sharing request through the selection of a file and the send application during the performance of another application other than the BYOD portal application, in Operation 3202, the user terminal 100 adds the selected file to the attachment list of the send application.

In Operation 3203, when the user terminal 100 receives a send request and a destination input from the user, in Operation 3204, the user terminal 100 transmits the selected file and destination to the image forming apparatus 200 and requests the image forming apparatus 200 to transmit the selected file to the destination.

In Operation 3205, the image forming apparatus 200 transmits a received file to a received destination.

Alternatively, when the user tries to request a job from the image forming apparatus 200, if the image forming apparatus 200 is in the middle of performing another job, the user may inconveniently stand by until the current job ends in order to request a job. To address the inconvenience, a job reservation method using the BYOD portal application is provided according to the present disclosure.

Figure 33:
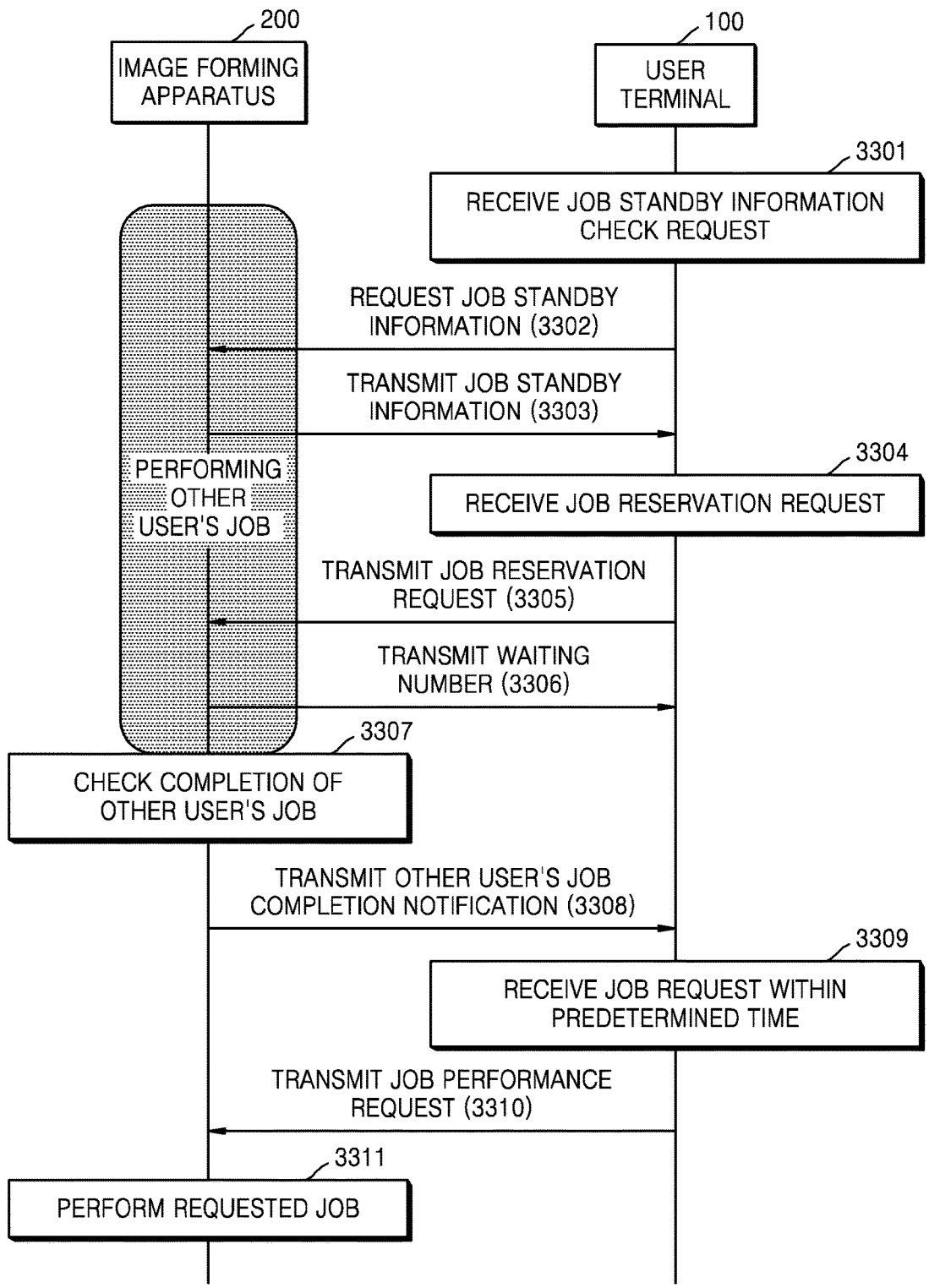
FIGS. 33 to 35 are views for explaining a job reservation method using a BYOD portal application according to an exemplary embodiment.
Figure 34:
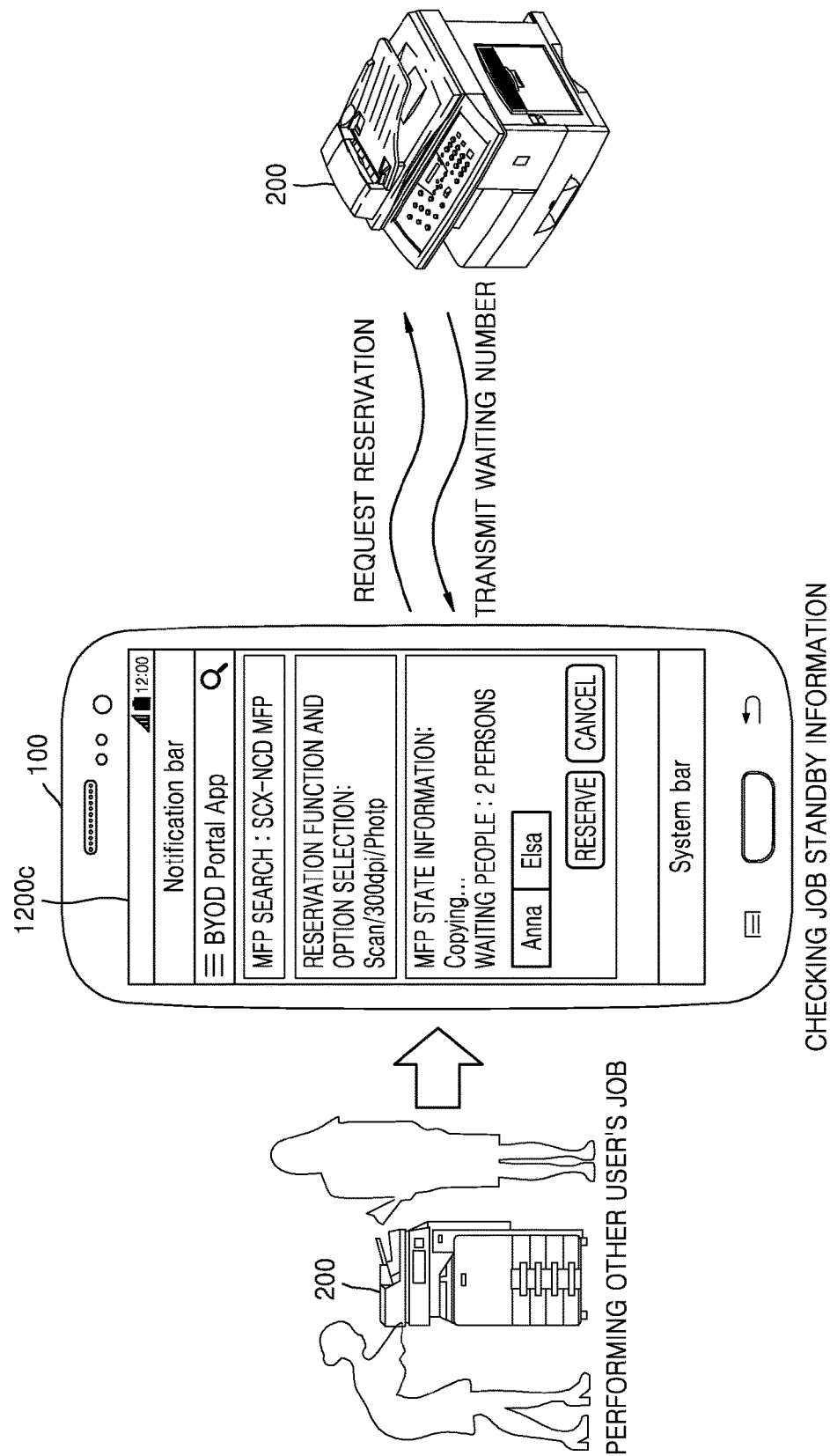
Figure 35:
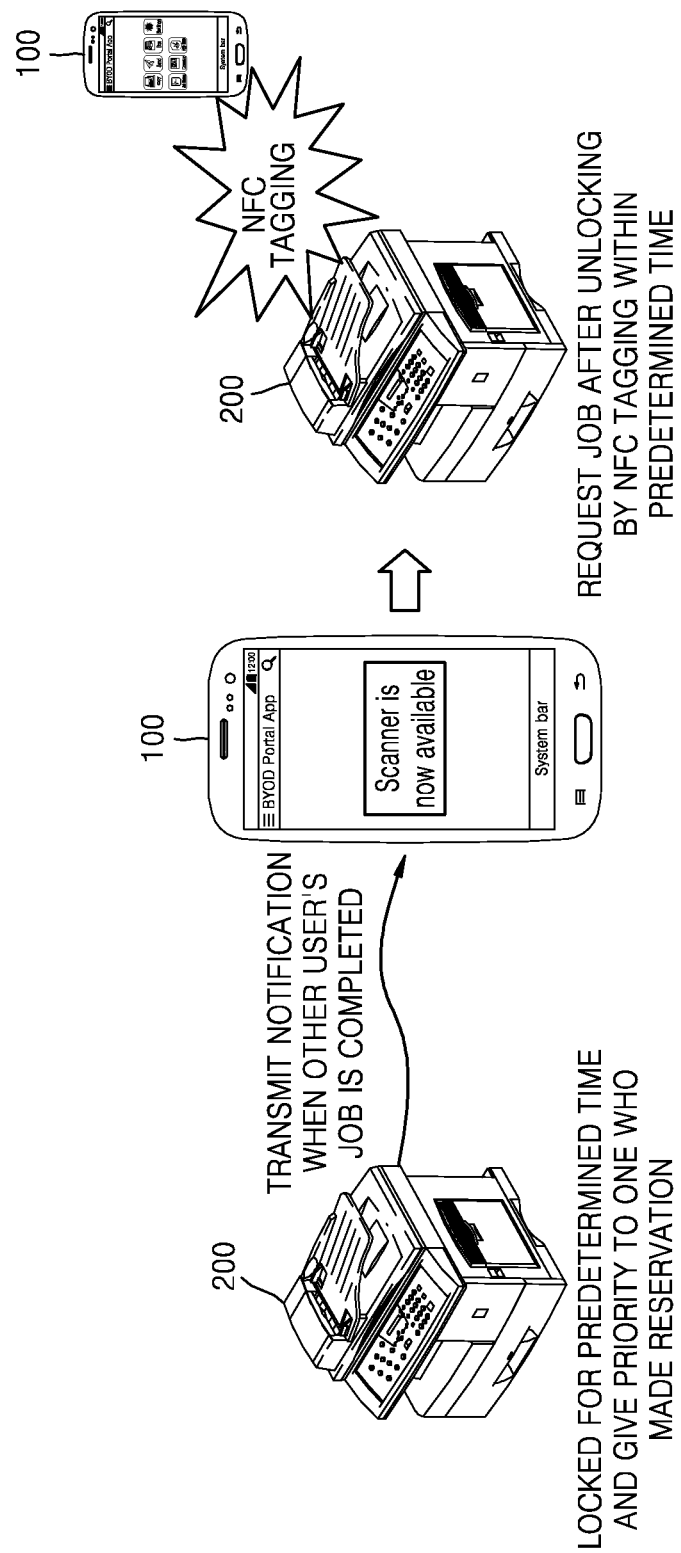

FIGS. 33 to 35 are views for explaining a job reservation method using the BYOD portal application according to an exemplary embodiment.

Referring to FIG. 33, in Operation 3301, the user terminal 100 receives a job standby information check request from the user. In other words, the user may request checking whether to stand by because the image forming apparatus 200 is currently performing another job, from the BYOD portal application of the user terminal 100.

In Operation 3302, the user terminal 100 requests job standby information from the image forming apparatus 200, and the image forming apparatus 200 transmits the job standby information to the user terminal 100 in Operation 3303. In this state, when the image forming apparatus 200 is performing a job requested by another user, the image forming apparatus 200 may transmit to the user terminal 100 job standby information including a current status of the image forming apparatus 200 and the number of other users who requested jobs and currently on standby.

In Operation 3304, when receiving a job reservation request from the user, in Operation 3305, the user terminal 100 transmits the job reservation request to the image forming apparatus 200.

In Operation 3306, the image forming apparatus 200 that received the job reservation request transmits a waiting number to the user terminal 100.

When checking the completion of other user's job in Operation 3307, the image forming apparatus 200 transmits other user's job completion notification to the user terminal 100 in Operation 3308. Accordingly, a notification that other user's job is completed is displayed on the screen of the BYOD portal application of the user terminal 100.

A priority is given to a user who reserves a job for a predetermined period after the user terminal 100 receives the job completion notification. Accordingly, during the predetermined period, the image forming apparatus 200 stands by without performing a job even when receiving a job request from another user other than the user who reserved the job. However, if the user who reserved the job does not request a job within a predetermined time after receiving the job completion notification, the priority given to the user who made reservation expires.

In Operation 3309, if the user terminal 100 receives a job request from the user within a predetermined time after the job completion notification is received, in Operation 3310, the user terminal 100 transmits a job performance request to the image forming apparatus 200. In Operation 3311, the image forming apparatus 200 performs a requested job.

FIGS. 34 and 35 illustrate in detail a process of performing a job reservation method using the BYOD portal application.

Referring to FIG. 34, when other user's job is being performed in the image forming apparatus 200, the user may check job standby information through the BYOD portal application of the user terminal 100. As illustrated in FIGS. 34 and 35, the job standby information may include information that the image forming apparatus 200 is currently performing a copy job and two other users reserved jobs.

When the user selects "Reservation" on the screen displayed on the user terminal 100, the user terminal 100 transmits a reservation request to the image forming apparatus 200. In response thereto, the image forming apparatus 200 transmits a waiting number to the user terminal 100.

Referring to FIG. 35, when other user's job is completed, the image forming apparatus 200 transmits a notification to the user terminal 100. A notification indicating the image forming apparatus 200 is currently available, for example, "Scanner is now available", is displayed on the screen of the user terminal 100.

When the notification is transmitted to the user terminal 100, the image forming apparatus 200 is locked for a predetermined time after the notification is transmitted, and priority is given to one who made reservation. If the user requests a job in a method of, for example, NFC tagging the user terminal 100 with respect to the image forming apparatus 200 within a predetermined time, the image forming apparatus 200 is unlocked and thus the image forming apparatus 200 performs a requested job.

In the following description, a method of controlling a popup window displayed on the user terminal 100 and the image forming apparatus 200 in a process of operating the image forming apparatus 200 through the BYOD portal application according to an exemplary embodiment is described with reference to FIGS. 36 to 44.

In detail, when a popup window about an event occurred in the image forming apparatus 200 is displayed in the user terminal 100 connected to the image forming apparatus 200, a method of controlling a timeout of the popup window is described.

Also, a process of simultaneously displaying a popup window in the image forming apparatus 200 and the user terminal 100 and making a user input with respect to any one of the popup windows is described below.

Also, a process in which a timeout expires without a user input according to the type of a popup window is described below.

Figure 36:
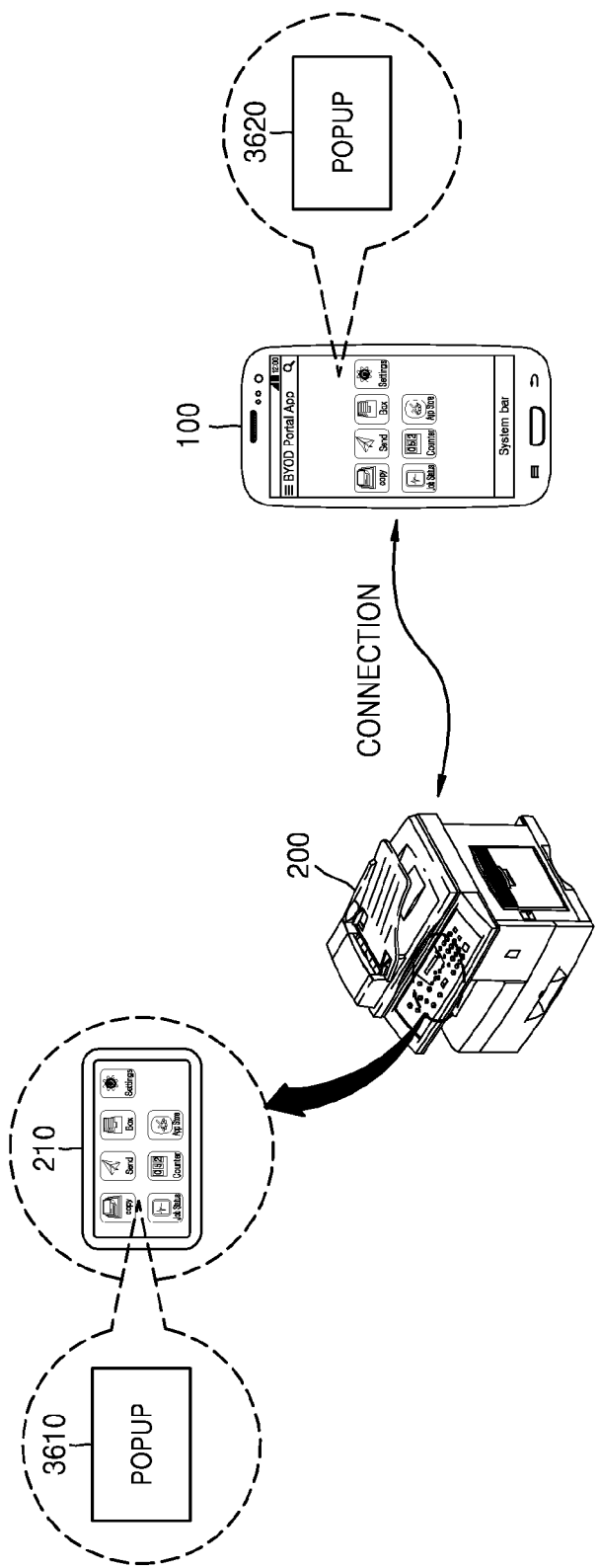
FIG. 36 illustrates an example of displaying a popup window on the image forming apparatus and the user terminal which are connected through the BYOD portal application according to an exemplary embodiment.

FIG. 36 illustrates an example of displaying a popup window on the image forming apparatus and the user terminal which are connected through the BYOD portal application according to an exemplary embodiment.

Referring to FIG. 36, the user terminal 100 is connected to the image forming apparatus 200 through the BYOD portal application. When an event occurs in the image forming apparatus 200, the main control unit 220 of the image forming apparatus 200 transmits a popup window display request to the manipulation unit 210 and the user terminal 100. In response to the request, a popup window 3610 is displayed on the screen of the manipulation unit 210 and a popup window 3620 is displayed on the screen of the user terminal 100.

Basically, if the user terminal 100 is not connected to the image forming apparatus 200, a system timeout of the image forming apparatus 200 is applied to the popup window displayed on the manipulation unit 210 of the image forming apparatus 200. In other words, if no user input is received during the system timeout of the image forming apparatus 200 after the popup window is displayed, the popup window is closed.

However, it may be inappropriate to apply the system time out of the image forming apparatus 200 to the popup window displayed on the user terminal 100. Since any action such as executing other application or receiving a call may be performed after the popup window is displayed on the user terminal 100 such as smartphones or tablets, if the system timeout of the image forming apparatus 200 is applied to the user terminal 100, the user may not be able to handle the popup window due to a short timeout. Accordingly, there is a demand for applying a timeout longer than the system timeout of the image forming apparatus 200 to the popup window 3620 displayed on the user terminal 100.

In the following description, when the user terminal 100 is connected to the image forming apparatus 200, instead of the system timeout of the image forming apparatus 200, a mobile system timeout longer than the system timeout of the image forming apparatus 200 is applied to the popup window on the user terminal 100. The mobile system timeout signifies a timeout set to be longer than the system timeout of the image forming apparatus 200 for the control of a popup window in the user terminal 100. A detailed exemplary embodiment is described below with reference to FIGS. 37 to 42.

Figure 37:
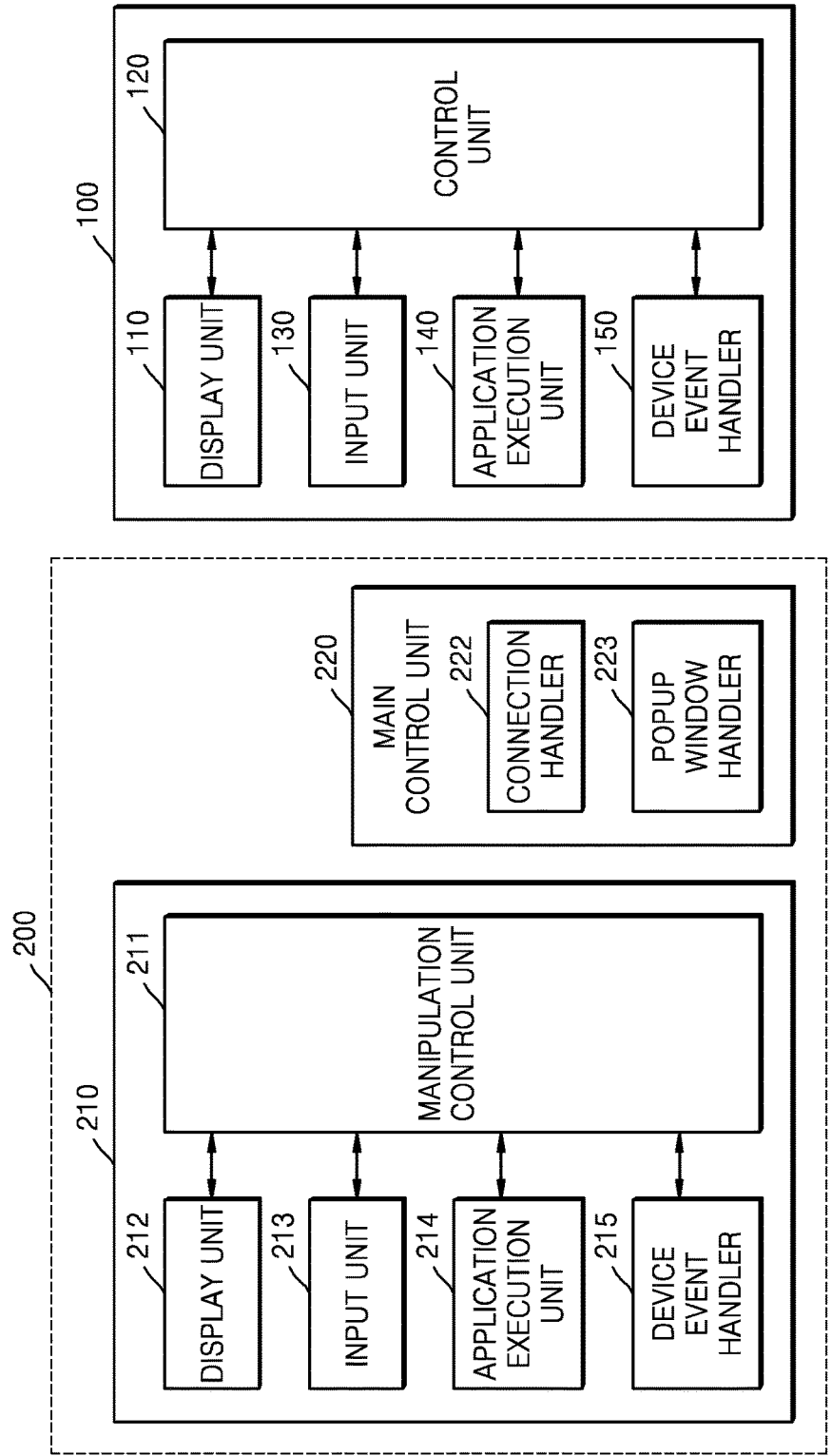
FIG. 37 illustrates structures of the image forming apparatus and the user terminal for the control of a timeout of a popup window according to an exemplary embodiment.

FIG. 37 illustrates structures of the image forming apparatus and the user terminal for the control of a timeout of a popup window according to an exemplary embodiment.

Referring to FIG. 37, the image forming apparatus 200 includes the manipulation unit 210 and the main control unit 220. Although FIG. 37 does not illustrate other components of the image forming apparatus 200, except for the structure for the control of a timeout of a popup window, as illustrated in FIG. 2, the image forming apparatus 200 may further include the communication unit 230, the printing unit 240, the scanning unit 250, and the fax unit 260.

The manipulation unit 210 may include an operation control unit 211, a display unit 212, an input unit 213, an application execution unit 214, and a device event handler 215. Also, the main control unit 220 may include a connection handler 222 and a popup window handler 223.

Alternatively, the user terminal 100 may include a display unit 110, a control unit 120, an input unit 130, an application execution unit 140, and a device event handler 150.

The detailed structure of the main control unit 220 is described below.

The connection handler 222 manages user terminals connected to the image forming apparatus 200. In particular, when a user terminal is connected to the image forming apparatus 200, the connection handler 222 informs the manipulation unit 210 of the connection of a user terminal through the BYOD portal application.

When an event occurs in the image forming apparatus 200, the popup window handler 223 transmits a popup window display request to the manipulation unit 210 and the user terminal 100 connected to the image forming apparatus 200.

A detailed structure of the manipulation unit 210 is described below.

The device event handler 215 performed in background processes the popup window request and manages a popup window that is not processed in foreground. Also, if the timeout expires because no input has been made on the popup window for a predetermined time, the device event handler 215 closes the popup window.

In detail, when the popup window display request is received from the popup window handler 223, the device event handler 215 requests the operation control unit 211 to display a popup window on the display unit 212. The device event handler 215 applies a timeout from the time when the popup window is displayed. When a user input with respect to the popup window is received through the input unit 213 before the timeout expires, the operation control unit 211 transmits the received user input to the main control unit 220. However, when the timeout expires without any user input to the popup window, the device event handler 215 requests the operation control unit 211 to close the popup window displayed on the display unit 212. Alternatively, the application execution unit 214 executes a function application such as a copy application, a send application, etc.

In particular, the device event handler 215 varies the timeout applied to the popup window according to whether the user terminal 100 is connected to the image forming apparatus 200. When the user terminal 100 is connected to the image forming apparatus 200 through the BYOD portal application, the connection handler 222 of the main control unit 220 informs the manipulation unit 210 of the connection of the user terminal 100 to the image forming apparatus 200. Accordingly, the device event handler 215 changes the timeout applied to the popup window from the system timeout of the image forming apparatus 200 to the mobile system timeout.

In other words, when at least one user terminal is connected to the image forming apparatus 200, the device event handler 215 applies the mobile system timeout to the popup window. When no user terminal is connected to the image forming apparatus 200, the device event handler 215 applies the system timeout of the image forming apparatus 200 to the popup window.

Figure 44:
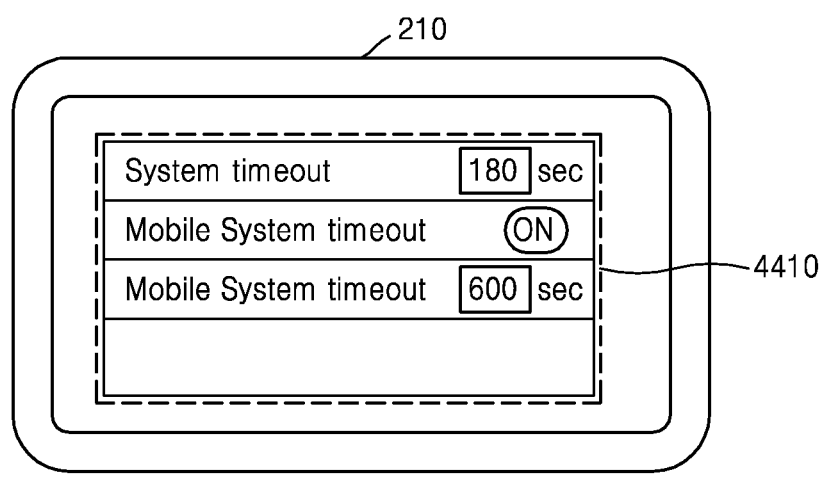
FIG. 44 illustrates a UI screen for setting a timeout of a mobile system according to an exemplary embodiment.

The mobile system timeout may be previously set and stored. FIG. 44 illustrates a UI screen for setting the mobile system timeout.

Referring to FIG. 44, a popup window 4410 for setting the mobile system timeout is displayed on the screen of the manipulation unit 210. The popup window 4410 displays a set value for the system timeout of the image forming apparatus 200, activation of a mobile system timeout option, and a set value of the mobile system timeout. Referring to FIG. 44, it may be seen that the mobile system timeout is set to 600 seconds, which is longer than 180 seconds that is the system timeout of the image forming apparatus 200.

Alternatively, since in FIG. 44 the mobile system timeout option is set to be "on" and becomes active, when the user terminal 100 is connected to the image forming apparatus 200, the mobile system timeout is applied to the popup window, instead of the system timeout of the image forming apparatus 200. However, if the mobile system timeout option is set to be "off" and becomes inactive, even when the user terminal 100 is connected to the image forming apparatus 200, the system timeout of the image forming apparatus 200 is applied to the popup window.

A detailed structure of the user terminal 100 is described below.

Similar to the device event handler 21 of the image forming apparatus 200, the device event handler 150 performed in background processes the popup window request and control displaying and closing of the popup window by applying a timeout to the popup window.

In detail, when receiving the popup window display request from the popup window handler 223, the device event handler 150 requests the control unit 120 to display a popup window on the display unit 110. The device event handler 150 applies a timeout from the time when the popup window is displayed. When a user input to the popup window is received through the input unit 130 before the timeout expires, the control unit 120 transmits the received user input to the main control unit 220 of the image forming apparatus 200. However, when the timeout expires without any user input to the popup window, the device event handler 150 requests the control unit 120 to close the popup window displayed on the display unit 110. Alternatively, the application execution unit 140 executes the BYOD portal application and the function applications such as a copy application, a send application, etc.

In particular, the device event handler 150 applies to the popup window the mobile system timeout set through the UI screen illustrated in FIG. 44 on the image forming apparatus 200. In other words, since the mobile system timeout set to be longer than the system timeout of the image forming apparatus 200 is applied to the popup window displayed on the user terminal 100, the user may process the popup window with a sufficient time.

However, if the mobile system timeout option is inactive, the device event handler 150 may applied the system timeout of the image forming apparatus 200 to the popup window.

Figure 38:
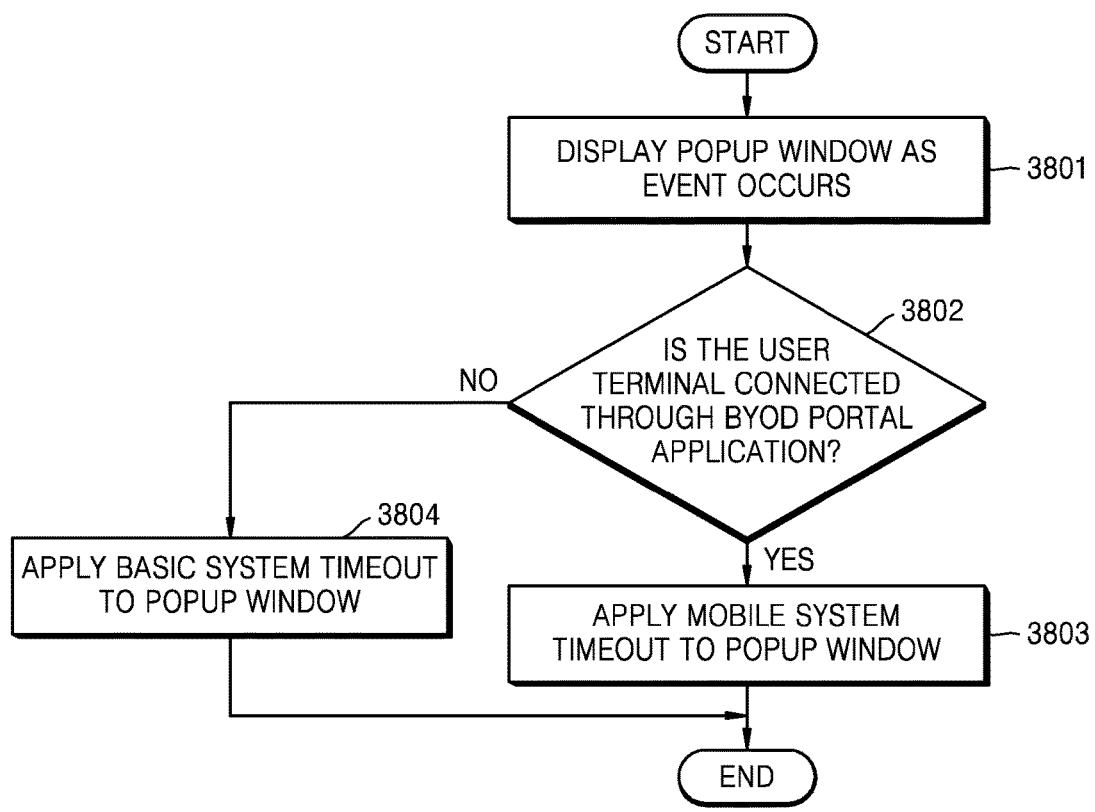
FIG. 38 is a flowchart for explaining a method of controlling a timeout of a popup window according to an exemplary embodiment.

FIG. 38 is a flowchart for explaining a method of controlling a timeout of a popup window according to an exemplary embodiment.

Referring to FIG. 38, in Operation 3801, when an event occurs in the image forming apparatus 200, a popup window is displayed on the screens of the image forming apparatus 200 and the user terminal 100.

In Operation 3802, the image forming apparatus 200 determines whether there is any connected user terminal through the BYOD portal application.

If a connected user terminal exists as a result of the determination, Operation 3803 is performed and thus the mobile system timeout is applied to the displayed popup window. However, if there is no connected user terminal, Operation 3804 is performed and thus the system timeout of the image forming apparatus 200 is applied to the popup window.

Figure 39:
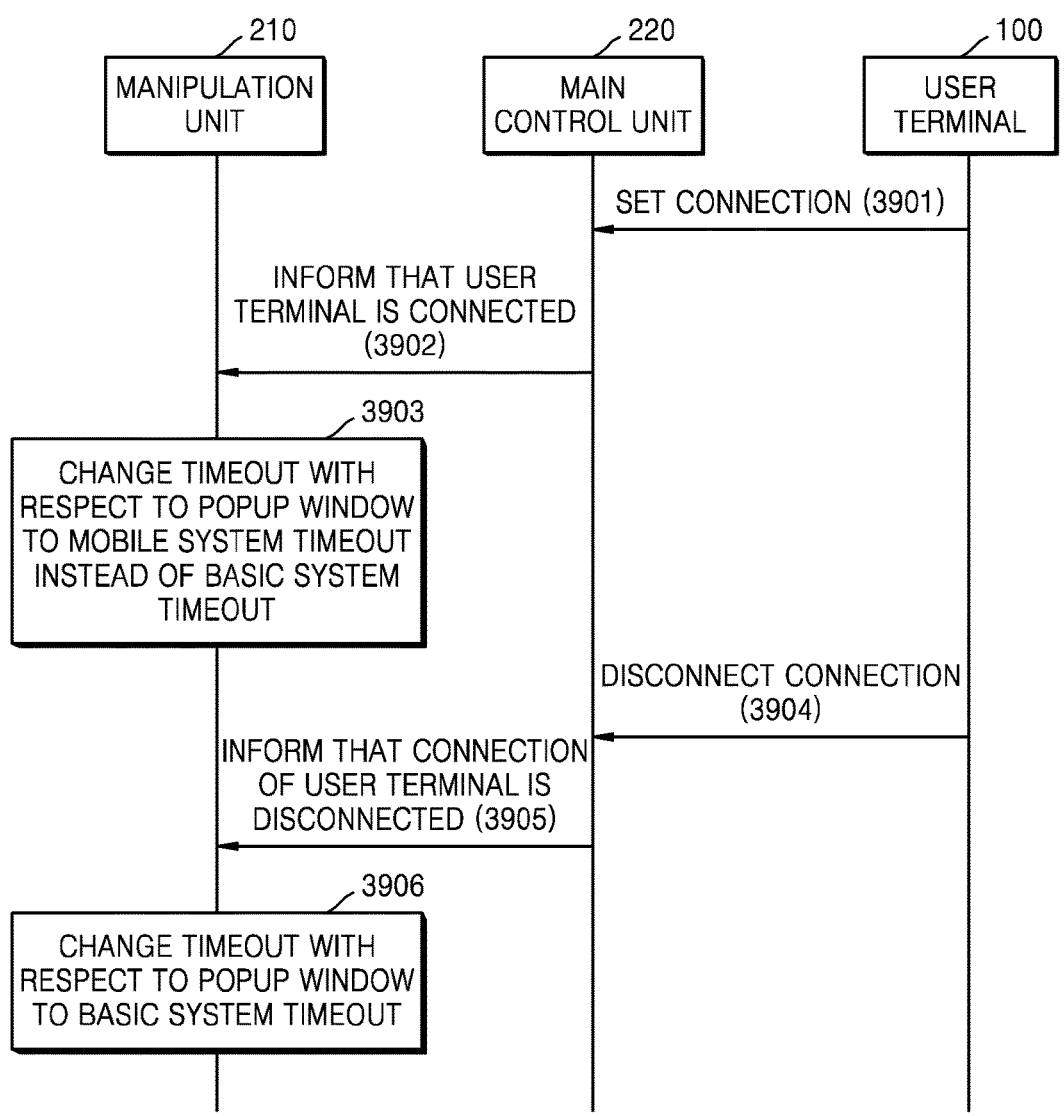
FIG. 39 is a flowchart for explaining a process of changing a timeout applied to a popup window according to connection and disconnection of the user terminal, in the method of controlling timeout of a popup window according to an exemplary embodiment.

FIG. 39 is a flowchart for explaining a process of changing a timeout applied to a popup window according to connection and disconnection of the user terminal, in the method of controlling timeout of a popup window according to an exemplary embodiment.

In a process of setting connection, in Operation 3901, when the user terminal 100 is connected to the main control unit 220 of the image forming apparatus 200 and, in Operation 3902, the main control unit 220 informs the manipulation unit 210 of the image forming apparatus 200 that the user terminal 100 is connected to the main control unit 220.

When receiving a notification that the user terminal 100 is connected, in Operation 3903, the manipulation unit 210 changes the timeout for the popup window to the mobile system timeout instead of the system timeout of the image forming apparatus 200. Accordingly, when an event occurs in the image forming apparatus 200 and a popup window is displayed on the manipulation unit 210 and the user terminal 100, the mobile system timeout is applied to the popup window.

Alternatively, in the process of disconnecting the connection, when the connection between the user terminal 100 and the main control unit 220 is disconnected in Operation 3904.

In Operation 3905, the main control unit 220 informs the manipulation unit 210 that the connection of the user terminal 100 is disconnected.

When receiving a notification that the connection of the user terminal 100 is disconnected, in Operation 3906, the manipulation unit 210 changes the timeout for the popup window to the system timeout of the image forming apparatus 200. Accordingly, when an event occurs in the image forming apparatus 200 and the popup window is displayed on the manipulation unit 210, the system timeout of the image forming apparatus 200 is applied to the popup window.

Figure 40:
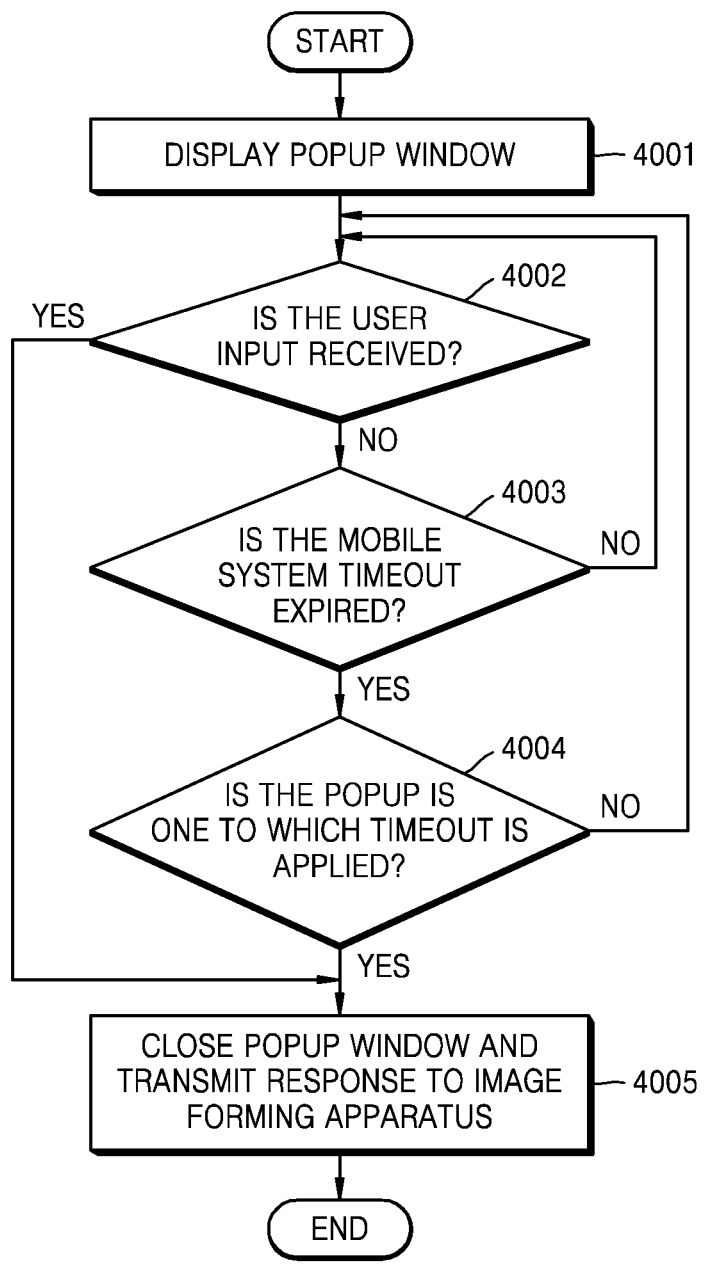
FIG. 40 is a flowchart for explaining an example of applying a timeout to a popup window displayed on the user terminal, in the method of controlling timeout of a popup window according to an exemplary embodiment.

FIG. 40 is a flowchart for explaining an example of applying a timeout to a popup window displayed on the user terminal, in the method of controlling timeout of a popup window according to an exemplary embodiment.

Referring to FIG. 40, in Operation 4001, a popup window is displayed on the screen of the user terminal 100.

In Operation 4002, the user terminal 100 determines whether a user input to the popup window is received. When the user input is received as a result of the determination, Operation 4005 is performed and thus the popup window is closed and a response corresponding to the user input is transmitted to the image forming apparatus 200.

In contrast, when the user input is not received as a result of the determination in Operation 4002, Operation 4003 is performed and thus the user terminal determines whether the mobile system timeout expires. When the mobile system timeout does not expire as a result of the determination, Operation 4002 is performed again.

In contrast, when the mobile system timeout expires as a result of the determination in Operation 4003, Operation 4004 is performed and thus it is determined whether the popup window displayed on the user terminal 100 is the popup window to which the timeout is applied. There may be a popup window that is not closed until the user input is received, rather than applying the timeout according to the type of a popup window. It is determined whether the popup window currently displayed on the user terminal corresponds to such a type of a popup window. The type of a popup window is described below in detail with reference to FIG. 41.

When the popup window displayed as a result of the determination in Operation 4004 is the popup window to which the timeout is applied, Operation 4005 is performed and thus the popup window is closed and a response is transmitted to the image forming apparatus 200. The response transmitted to the image forming apparatus may be a preset value to be transmitted when the popup window closes due to the expiration of the timeout.

In contrast, when popup window displayed as a result of the determination in Operation 4004 is not the popup window to which the timeout is applied, Operation 4002 is performed again.

FIG. 41 is a table showing whether to apply a timeout and a default value transmitted to the image forming apparatus when a popup window closes due to expiration of a timeout, according to a category of a popup window.

In the table of FIG. 41, a first column indicates a category of a popup window. In other words, the category to which an event of the popup window belongs is classified into four. A second column indicates a detailed category of a popup window.

A third column indicates whether a timeout is applied to the popup window. In other words, since the timeout is not applied to a popup window marked with "X", the popup window remains without closing regardless of the passage of time until a user input with respect to the popup window is made.

A fourth column indicates a default value of a response transmitted to the image forming apparatus when the popup window closes due to the expiration of a timeout. For "Caller ID popup" marked with "X" among the popup windows to which the timeout is applied, when the timeout expires, only the popup window closes and no response is transmitted to the image forming apparatus.

Figure 42:
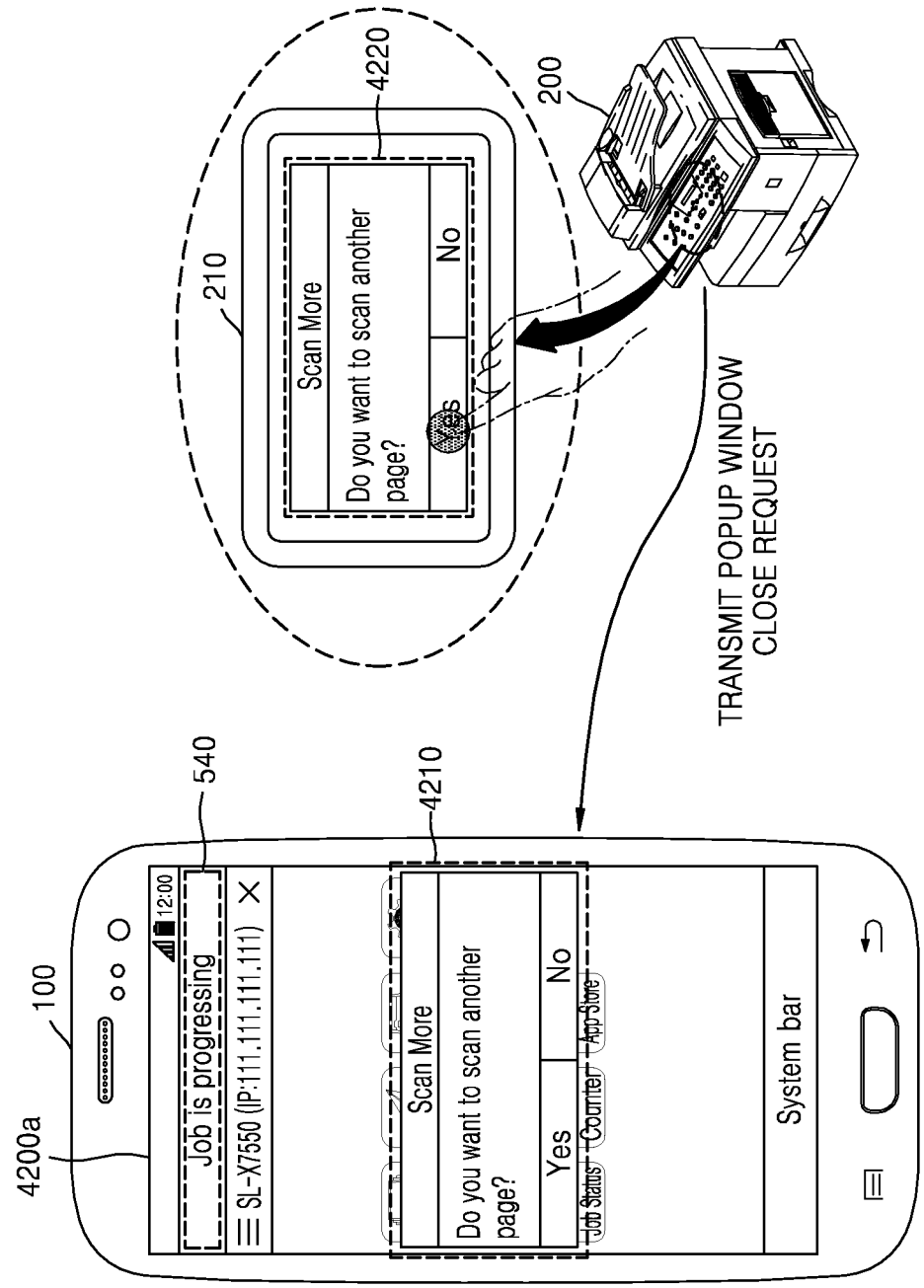
FIGS. 42 and 43 are view for explaining a method of controlling a popup window when any one of the image forming apparatus and the user terminal receives a user input about the popup window.
Figure 43:
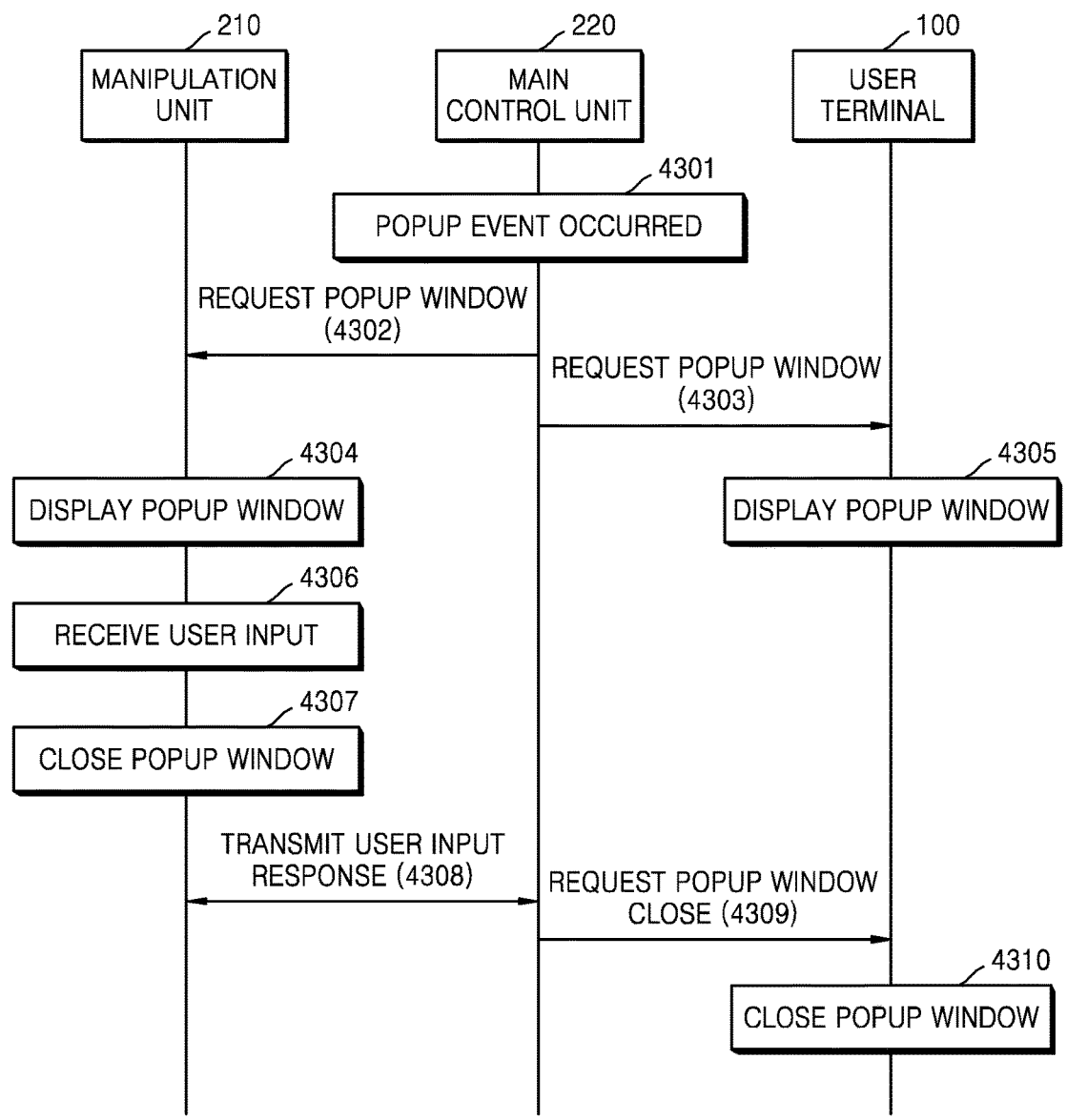

FIGS. 42 and 43 are view for explaining a method of controlling a popup window when any one of the image forming apparatus and the user terminal receives a user input about the popup window.

Referring to FIG. 42, on a screen 4200a of the user terminal 100, a notification that a job is currently performed is displayed on the notification bar 540 and a popup window 4210 asking whether to scan another page is displayed. Also, a popup window 4220 asking whether to scan another page is displayed on the screen of the manipulation unit 210 of the image forming apparatus 200. Accordingly, the user may respond to the popup window by selecting any one of the user terminal 100 and the manipulation unit 210 of the image forming apparatus 200.

In FIG. 42, the user selects "Yes" in the popup window 4220 displayed on the manipulation unit 210 of the image forming apparatus 200. Accordingly, as the popup window 4220 displayed on the manipulation unit 210 closes, the manipulation unit 210 transmits a response to the main control unit 220 of the image forming apparatus 200 to perform scanning of another page.

However, since a response to the event of the popup window is completed, the popup window 4210 displayed on the user terminal 100 does not need any longer. Accordingly, the image forming apparatus 200 transmits a request to close the popup window 4210 to the user terminal 100, and the user terminal 100 closes the popup window 4210 displayed on the screen.

Referring to FIG. 43, when an event occurs in the image forming apparatus 200 in Operation 4301, the main control unit 220 transmits a popup window request to the manipulation unit 210 in Operation 4302 and similarly to the user terminal 100 in Operation 4303. Accordingly, in Operation 4304, the manipulation unit 210 displays a popup window on the screen and, in Operation 4305, the user terminal 100 displays a popup window on the screen.

When the manipulation unit 210 receives a user input with respect to the popup window in Operation 4306, the manipulation unit 210 closes the popup window in Operation 4307 and transmits a user input response to the main control unit 220 in Operation 4308.

Since the response to the popup window is received, the main control unit 220 determines that the popup window does not need to be displayed further and transmits a popup window close request to the user terminal 100 in Operation 4309. Accordingly, in Operation 4310, the user terminal 100 closes the popup window displayed on the screen.

In addition, other embodiments of the present disclosure can also be implemented through computer readable code/instructions in/on a medium, e.g., a computer readable medium, to control at least one processing element to implement any above described embodiment. The medium can correspond to any medium/media permitting the storage and/or transmission of the computer readable code.

The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as Internet transmission media.

As described above, according to the one or more of the above embodiments of the present disclosure, according to the present exemplary embodiment, since a user may control the image forming apparatus by using a mobile terminal such as a smartphone or a tablet carried by the user, user convenience may be improved.

It should be understood that the exemplary embodiments described herein should be considered in a descriptive sense only and not for purposes of limitation. Descriptions of features or aspects within each embodiment should typically be considered as available for other similar features or aspects in other embodiments.

While one or more embodiments of the present disclosure have been described with reference to the figures, it will be understood by those of ordinary skill in the art that various changes in form and details may be made therein without departing from the spirit and scope of the present disclosure as defined by the following claims.

What is claimed is:

1. A method comprising:
   transmitting, by an image forming apparatus to a user terminal, information regarding an existing job requested by another user terminal that is waiting to be performed by the image forming apparatus or is being performed by the image forming apparatus;
   receiving, by the image forming apparatus from the user terminal, a job reservation request to reserve availability of the image forming apparatus in performing a job for the user terminal upon request by the user terminal;
   transmitting, by the image forming apparatus to the user terminal in response to the job reservation request being received by the image forming apparatus, a waiting number indicating when the image forming apparatus will be available to perform a job for the user terminal; and
   in response to completion, by the image forming apparatus, of the existing job requested by the another user terminal,
      transmitting, by the image forming apparatus to the user terminal, information indicating completion of the existing job requested by the another user terminal and current availability of the image forming apparatus in performing a job for the user terminal upon request by the user terminal, and
      assigning, by the image forming apparatus, a priority to the user terminal by placing the image forming apparatus on standby, during which the image forming apparatus maintains the availability of the image forming apparatus in performing a job for the user terminal upon request by the user terminal while refraining from performing any job requested by another terminal connected to the image forming apparatus, wherein
   while the image forming apparatus is on the standby, the image forming apparatus is configured to transmit job standby information to other user terminals in response to receiving a request from the other user terminals to transmit the job standby information, and
   the job standby information indicates that the image forming apparatus is currently reserved.

2. The method of claim 1, wherein the assigning places the image forming apparatus on the standby for a predetermined period from a point in time when the job completion notification is transmitted.

3. The method of claim 2, further comprising, after assigning the priority:
during the predetermined period of time, receiving a job request from the user terminal to perform the job requested by the user terminal; and
performing, by the image forming apparatus, the job requested by the user terminal.

4. The method of claim 1, wherein the information regarding the job that is waiting to be performed by the image forming apparatus or is being performed by the image forming apparatus includes a type of the job and identification of a user that requested the job.

5. The method of claim 1, wherein the waiting number is determined based on a number of jobs waiting to be performed by the image forming apparatus or being performed by the image forming apparatus.

6. The method of claim 1, further comprising:
receiving, by the image forming apparatus from the user terminal within a predetermined period of time from the transmitting of the job completion notification, a job request to perform a job,
wherein the assigning assigns the priority in response to the job request being received within the predetermined period of time.

7. A non-transitory computer readable medium storing computer readable instructions which, when executed by at least one processor included in an image forming apparatus, cause the image forming apparatus to perform:
transmitting, to a user terminal, information regarding an existing job requested by another user terminal that is waiting to be performed by the image forming apparatus or is being performed by the image forming apparatus;
receiving, from the user terminal, a job reservation request to reserve availability of the image forming apparatus in performing a job for the user terminal upon request by the user terminal;
transmitting, to the user terminal in response to the job reservation request being received by the image forming apparatus, a waiting number indicating when the image forming apparatus will be available to perform a job for the user terminal;
in response to completion, by the image forming apparatus, of the existing job requested by the another user terminal,
transmitting, to the user terminal, information indicating completion of the existing job and the availability of the image forming apparatus in performing a job for the user terminal upon request by the user terminal, and
assigning a priority to the user terminal by placing the image forming apparatus on standby, during which the image forming apparatus maintains the availability of the image forming apparatus in performing a job for the user terminal upon request by the user terminal while refraining from performing any job requested by another terminal connected to the image forming apparatus; and
while the image forming apparatus is on the standby, transmitting job standby information to other user terminals in response to the image forming apparatus receiving a request from the other user terminals to transmit the job standby information, the job standby information indicating that the image forming apparatus is currently reserved.

8. An image forming apparatus comprising:
at least one memory storing instructions; and
at least one processor that executes the instructions to cause the image forming apparatus to perform:
transmitting, to a user terminal, information regarding an existing job requested by another user terminal that is waiting to be performed by the image forming apparatus or is being performed by the image forming apparatus;
receiving, from the user terminal, a job reservation request to reserve availability of the image forming apparatus in performing a job for the user terminal upon request by the user terminal;
transmitting, to the user terminal in response to the job reservation request being received by the image forming apparatus, a waiting number indicating when the image forming apparatus will be available to perform a job for the user terminal;
in response to completion, by the image forming apparatus, of the existing job requested by the another user terminal,
transmitting, to the user terminal, information indicating completion of the existing job and the availability of the image forming apparatus in performing a job for the user terminal upon request by the user terminal, and
assigning a priority to the user terminal by placing the image forming apparatus on standby, during which the image forming apparatus maintains the availability of the image forming apparatus in performing a job for the user terminal upon request by the user terminal while refraining from performing any job requested by another terminal connected to the image forming apparatus; and
while the image forming apparatus is on the standby, transmitting job standby information to other user terminals in response to the image forming apparatus receiving a request from the other user terminals to transmit the job standby information, the job standby information indicating that the image forming apparatus is currently reserved.

9. The image forming apparatus of claim 8, wherein the assigning places the image forming apparatus on the standby for a predetermined period from a point in time when the job completion notification is transmitted.

10. The image forming apparatus of claim 9, wherein the instructions, when executed by the at least one processor, further cause the image forming apparatus to perform:
during the predetermined period of time, receiving a job request from the user terminal to perform the job requested by the user terminal, and
performing the job requested by the user terminal.

11. The image forming apparatus of claim 8, wherein the information regarding the job that is waiting to be performed by the image forming apparatus or is of being performed by the image forming apparatus includes a type of the job and identification of a user that requested the job.

12. The image forming apparatus of claim 8, wherein the instructions, when executed by the at least one processor, cause the image forming apparatus to determine the waiting number based on a number of jobs waiting to be performed by the image forming apparatus being performed by the image forming apparatus.

* * * * *